United States Patent [19]

Murdock

[11] Patent Number: 5,448,729
[45] Date of Patent: * Sep. 5, 1995

[54] OFFICE SYSTEM WITH AUDIT HISTORY

[75] Inventor: David M. Murdock, New Milford, N.J.

[73] Assignee: Cisgem Technologies, Inc., Simbsury, Conn.

[ * ] Notice: The portion of the term of this patent subsequent to May 31, 2011 has been disclaimed.

[21] Appl. No.: 249,883

[22] Filed: May 25, 1994

Related U.S. Application Data

[63] Continuation of Ser. No. 954,416, Sep. 30, 1992, Pat. No. 5,317,733, which is a continuation of Ser. No. 471,290, Jan. 26, 1990, abandoned.

[51] Int. Cl.$^6$ .............................................. G06F 17/30
[52] U.S. Cl. ................................... 395/600; 395/186; 364/225.1; 364/225.3; 364/225.4; 364/292.1; 364/283.1; 364/DIG. 1; 364/406
[58] Field of Search ............................... 395/575, 600; 364/225.1, 225.3, 225.4, 282.1, 283.1

[56] References Cited

U.S. PATENT DOCUMENTS

| | | | |
|---|---|---|---|
| 4,553,206 | 11/1985 | Smutek et al. | 364/200 |
| 4,633,430 | 12/1986 | Cooper | 364/900 |
| 4,646,229 | 2/1987 | Boyle | 364/200 |
| 4,809,170 | 2/1989 | Leblang et al. | 364/200 |
| 4,819,156 | 4/1989 | DeLorme et al. | 395/575 |
| 5,086,502 | 2/1992 | Malcolm | 395/575 |
| 5,159,669 | 10/1992 | Trigg et al. | 395/159 |
| 5,170,480 | 12/1992 | Mohan et al. | 395/600 |

OTHER PUBLICATIONS

Snodgrass et al., Temporal Databases, IEEE Computer, Sep. 1986, pp. 35–42.

Gadia, A Homogeneous Relational Model and Query Languages for Temporal Dtabases, Dec. 1988, pp. 418–448.

*Primary Examiner*—Kevin A. Kriess
*Assistant Examiner*—Dennis M. Butler
*Attorney, Agent, or Firm*—Elman Wilf & Fried

[57] ABSTRACT

A system is disclosed for the automation of virtually all clerical functions in an office, such as for example, an insurance agency. Virtually any document generated by the office may be printed without the need for pre-printed forms, as the system prints such forms on a laser printer near the worker requesting the form, using a page description language (PDL) appropriate to the printer. The clerical activity involved in maintaining, updating, retrieving, displaying and printing information relating to the functions of the office is supported.

A complete audit history of all activity to a specific database (DB) file record is maintained without saving the entire DB record in a historical file. The system also supports a worker when it is desired to interrupt a particular task and execute a different task, without losing information already entered for the first task, but without allowing the worker to exit the system without completing or accounting for the first task.

20 Claims, 65 Drawing Sheets

```
                    GEMINI II Agency Automation System
            Printed by David M. Murdock on 01/22/90, at 17:09:14.

Ref: CP.100$7.1         CISCO Demo Agency (Accrual)      Last Changed  DMM
                          Basic Client Information       01/20/90 10:50:33
Client Code: MURDOCK          BillTo: MURDOCK       Ref.Code:
Client Name: David M. Murdock                       Statuses: NBB :     :
Address #1 : 625 Duke Road                          Producer: DMM :     :
Address #2 : SUITE 202                              Servicer: DMM :     :
ZIP=City+St: 07646         New Milford           NJ Cr.Terms: 1    Net%: 15.00
Phone#1 Ext: 201 265-6206      #2: 201 265-6563     Fax No..:
Categories : CAL    :         :         :           Source..: DMM : 09/24/87
Commentary :
 L# Contact / Alternate Name      Salutation (no Dear) Typ Occup./Title Birthday
  1 Mr.David Murdock              Dave                  1                02/23/45
  2 Mrs. Eileen A. Murdock        Eileen                SP1              12/22/49
  3 Mr. Sean E. Murdock           Sean                  2
  3 No. of Contact Lines
 Policies        Written Premium         Annual           #Locations
 Comm. %         Commission Amt.         Annual           #Vehicles
 #Losses         Total Paid Amt.                          #Memos Due Total Balance   Current Balance   30-60 Balance  60-90 Balance  Over 90 Balance Doc  CERT            SCHI                        CALC              Revw
 Exit File Help Cmd?  POL LOSS MKT MEMO INV CERT NEW# Xref Disp Srch Menu Quit
```

FIG. 6

```
                        GEMINI II Agency Automation System
              Printed by David M. Murdock on 01/22/90, at 17:20:19.
┌─────────────────────────────────────────────────────────────────────────────┐
│Ref: CP.100$7.1         CISCO Demo Agency (Accrual)      Last Changed  CFH   │
│                          Basic Client Information        12/07/88 16:10:16  │
│Client Code: MURDOCK           BillTo: WHEATLY           Ref.Code:           │
│Client Name: David M. Murdock ZZ9Z                       Statuses: NBB :   : │
│Address #1 : 625 Duke Road                               Producer: EAM :   : │
│Address #2 : 1nd. Floor                                  Servicer: EAM :   : │
│ZIP=City+St: 07646         New Milford             NJ    Cr.Terms: 1  Net%: 15.00│
│Phone#1 Ext: 201 265-6206      #2: 201 265-6563          Fax No..:           │
│Categories : CAL   :       :       :       :             Source..: DMM : 09/24/87│
│Commentary :                                                                 │
│ L# Contact / Alternate Name    Salutation (no Dear) Typ Occup./Title Birthday│
│  1 Mr.David Murdock            Dave                                  02/23/45│
│  2                                                                          │
│  3                                                                          │
│  5 No. of Contact Lines                                                     │
│ Policies      Written Premium            Annual         #Locations          │
│ Comm. %       Commission Amt.            Annual         #Vehicles           │
│ #Losses       Total Paid Amt.                           #Memos Due          │
│                                                                             │
│ Total Balance  Current Balance  30-60 Balance  60-90 Balance  Over 90 Balance│
├─────────────────────────────────────────────────────────────────────────────┤
│      Doc CERT         SCHI                        CALC              Revw    │
│ Exit File Help Cmd?  POL LOSS MKT MEMO INV CERT NEW# Xref Disp Srch Menu Quit│
└─────────────────────────────────────────────────────────────────────────────┘
```

FIG. 7

GEMINI II Agency Automation System

Printed by David M. Murdock on 01/22/90, at 17:22:48.

```
Ref: CP.100$7.1          CISCO Demo Agency (Accrual)       Last Changed  DMM
                           Basic Client Information        10/11/88 13:10:26

Client Code: MURDOCK         BillTo: WHEATLEY        Ref.Code:
Client Name: David M. Murdock ZZ9Z                   Statuses: NBB :       :
Address #1 : 625 Duke Road                           Producer: EAM :       :
Address #2 : 2nd. Floor                              Servicer: EAM :       :
ZIP=City+St: 07646         New Milford           NJ  Cr.Terms: 1    Net%: 15.00
Phone#1 Ext: 201 265-6206       #2: 201 265-6563     Fax No..:
Categories : CAL    :       :       :                Source..: DMM : 09/24/87
Commentary :
  L# Contact / Alternate Name      Salutation (no Dear) Typ Occup./Title Birthday
   1 Mr. David Murdock             Dave                                  02/23/45
   2
   3
   5 No. of Contact Lines
  Policies      Written Premium            Annual           #Locations
  Comm. %       Commission Amt.            Annual           #Vehicles
  #Losses       Total Paid Amt.                             #Memos Due Total Balance  Current Balance  30-60 Balance  60-90 Balance  Over 90 Balance Doc  CERT           SCHI                         CALC              Revw
  Exit File Help Cmd?  POL LOSS MKT MEMO INV CERT NEW# Xref Disp Srch Menu Quit
```

FIG. 8

```
                    GEMINI II Agency Automation System
             Printed by David M. Murdock on 01/22/90, at 17:23:06.
Ref: CP.100$7.1          CISCO Demo Agency (Accrual)      Last Changed DMM
                           Basic Client Information       09/24/87 15:13:48
Client Code: MURDOCK          BillTo: MURDOCK         Ref.Cod
Client Name: David M. Murdock                         Statuses:    :     :
Address #1 : 625 Duke Road                            Producer: EAM :     :
Address #2 :                                          Servicer: EAM :     :
ZIP=City+St: 07646         New Milford           NJ   Cr.Terms: 1   Net%: 15.00
Phone#1 Ext: 201 265-6206       #2: 201 265-6563      Fax No..:
Categories :       :        :         :       :       Source..: DMM : 09/24/87
Commentary :
 L# Contact / Alternate Name        Salutation (no Dear) Typ Occup./Title Birthday
  1 Mr. David Murdock               Dave                                  02/23/45
  2
  3
  1 No. of Contact Lines
 Policies      Written Premium              Annual            #Locations
 Comm. %       Commission Amt.              Annual            #Vehicles
 #Losses       Total Paid Amt.                                #Memos Due Total Balance   Current Balance   30-60 Balance   60-90 Balance   Over 90 Balance

|Doc |CERT|        |SCHI|    |   |    |   |    |CALC|    |    |Revw
 Exit|File|Help|Cmd?| POL|LOSS| MKT|MEMO|INV|CERT|NEW#|Xref|Disp|Srch|Menu|Quit
```

FIG. 9

```
                        GEMINI II Agency Automation System
              Printed by David M. Murdock on 01/22/90, at 17:23:26.
Ref: CP.100$7.1           CISCO Demo Agency (Accrual)      Last Changed  DMM
                             Basic Client Information      01/20/90 10:50:33
Client Code: MURDOCK            BillTo: MURDOCK        Ref.Code:
Client Name: David M. Murdock                          Statuses: NBB  :       :
Address #1 : 625 Duke Road                             Producer: DMM  :       :
Address #2 : SUITE 202                                 Servicer: DMM  :       :
ZIP=City+St: 07646        New Milford            NJ    Cr.Terms: 1    Net%: 15.00
Phone#1 Ext: 201 265-6206       #2: 201 265-6563       Fax No..:
Categories : CAL     :        :        :               Source..: DMM  : 09/24/87
Commentary :
 L# Contact / Alternate Name     Salutation (no Dear) Typ Occup./Title Birthday
  1 Mr. David M. Murdock         Dave                  1                02/23/45
  2 Mrs. Eileen A. Murdock       Eileen                SP1              12/22/49
  3 Mr. Sean E. Murdock          Sean                  2
  3 No. of Contact Lines
 Policies       Written Premium           Annual           #Locations
 Comm. %        Commission Amt.           Annual           #Vehicles
 #Losses        Total Paid Amt.                            #Memos Due Total Balance  Current Balance   30-60 Balance  60-90 Balance  Over 90 Balance Doc CERT           SCHI                          CALC            Revw
    Exit File Help Cmd?  POL LOSS  MKT MEMO INV CERT NEW# Xref Disp Srch Menu Quit
```

FIG. 10

```
                    GEMINI II Agency Automation System
            Printed by David M. Murdock on 01/22/90, at 17:23:45.
Ref: CP.100$7.1         CISCO Demo Agency (Accrual)     Last Changed  DMM
                          Basic Client Information      01/20/90 10:50:06
Client Code: MURDOCK         BillTo: MURDOCK        Ref.Code:
Client Name: David M. Murdock                       Statuses: NBB  :      :
Address #1 : 625 Duke Road                          Producer: DMM  :      :
Address #2 : SUITE 202                              Servicer: DMM  :      :
ZIP=City+St: 07646        New Milford           NJ  Cr.Terms: 1    Net%: 15.00
Phone#1 Ext: 201 265-6206      #2: 201 265-6563     Fax No..:
Categories : CAL  :       :         :         :     Source..: DMM  : 09/24/87
Commentary :
 L# Contact / Alternate Name    Salutation (no Dear) Typ Occup./Title Birthday
  1 END David M. Murdock        Dave                  1                02/23/45
  2 Mrs. Eileen A. Murdock      Eileen               SP1               12/22/49
  3 Mr. Sean E. Murdock         Sean                  2
  5 No. of Contact Lines
 Policies       Written Premium              Annual         #Locations
 Comm. %        Commission Amt.              Annual         #Vehicles
 #Losses        Total Paid Amt.                             #Memos Due Total Balance  Current Balance  30-60 Balance  60-90 Balance  Over 90 Balance Doc  CERT           SCHI                            CALC           Revw
 Exit File Help Cmd?  POL LOSS MKT MEMO INV CERT NEW# Xref Disp Srch Menu Quit
```

FIG. 11

```
                   GEMINI II Agency Automation System
            Printed by David M. Murdock on 01/22/90, at 17:24:05.
Ref: CP.100$7.1          CISCO Demo Agency (Accrual)    Last Changed  DMM
                           Basic Client Information     12/08/89 13:17:48

Client Code: MURDOCK           BillTo: MURDOCK       Ref.Code:
Client Name: David M. Murdock                        Statuses: NBB  :       :
Address #1 : 625 Duke Road                           Producer: DMM  :       :
Address #2 : SUITE 202                               Servicer: DMM  :       :
ZIP=City+St: 07646         New Milford          NJ   Cr.Terms: 1    Net%: 15.00
Phone#1 Ext: 201 265-6206      #2: 201 265-6563      Fax No..:
Categories : CAL    :       :       :                Source..: DMM  : 09/24/87
Commentary :
 L# Contact / Alternate Name      Salutation (no Dear) Typ Occup./Title Birthday
  1 Mr. David M. Murdock          Dave                  1                02/23/45
  2 Mrs. Eileen A. Murdock        Eileen               SP1               12/22/49
  3 Mr. Sean E. Murdock           Sean                  2
  5 No. of Contact Lines
 Policies       Written Premium          Annual            #Locations
 Comm. %        Commission Amt.          Annual            #Vehicles
 #Losses        Total Paid Amt.                            #Memos Due Total Balance  Current Balance  30-60 Balance  60-90 Balance  Over 90 Balance Doc  CERT            SCHI                          CALC           Revw
 Exit|File|Help|Cmd?| POL |LOSS| MKT |MEMO|INV|CERT|NEW#|Xref|Disp|Srch|Menu|Quit
```

FIG. 12

GEMINI II Agency Automation System

Printed by David M. Murdock on 01/22/90, at 17:54:05.

```
01/22/90              The GEMINI II Insurance System              05:53:51PM
Menu: DMM
                          CISCO Demo Agency (Accrual)
                     1. Client Marketing & Servicing
                     2. Accounts Receivable Menu
                     3. Accounts Payable Menu
                     4. Financial Management Menu
                     5. Insurance Forms & Reports Menu
                     6. Insurance Codes & Lists Menu
                     7. Accounting Codes & Lists Menu
                     8. Nightly Sleep Save
                     9. Monthly Reports Menu
                    10. Memo & Word Processing Menu
                    11. System Coordinator's Menu
                    12. The CICSO Development Menu
                    13. The Report Builder Menu
                    14. Project Status Menu
                    15. The Interface Menu
                    16. Copyright Preparation Enter Selection #; (OFF); or <Return>:

Exit    Help  Cmd?                                         Disp          Quit
```

FIG. 18

```
                    GEMINI II Agency Automation System
             Printed by David M. Murdock on 01/22/90, at 17:54:36.
Ref: CP.100$7.1           CISCO Demo Agency (Accrual)        Last Changed
                            Basic Client Information
Client Code:              BillTo:                  Ref.Code:
Client Name:                                       Statuses:      :     :
Address #1 :                                       Producer:      :     :
Address #2 :                                       Servicer:      :     :
ZIP=City+St:                                       Cr.Terms:    Net%:
Phone#1 Ext:              #2:                      Fax No..:
Categories :    :      :      :      :             Source..:      :
Commentary :
 L# Contact / Alternate Name      Salutation (no Dear) Typ Occup./Title Birthday No. of Contact Lines
 Policies      Written Premium         Annual           #Locations
 Comm. %       Commission Amt.         Annual           #Vehicles
 #Losses       Total Paid Amt.                          #Memos Due Total Balance  Current Balance  30-60 Balance  60-90 Balance  Over 90 Balance

|Doc |CERT|        |SCHI|    |   |    |    |    |CALC|    |    |Revw|
 Exit|File|Help|Cmd?| POL|LOSS| MKT|MEMO|INV|CERT|NEW#|Xref|Disp|Srch|Menu|Quit
```

FIG. 19

```
                    GEMINI II Agency Automation System
              Printed by David M. Murdock on 01/22/90, at 17:55:06.
```

| Ref: CP.100$7.1 | CISCO Demo Agency (Accrual) | Last Changed DMM |
|---|---|---|
| | Basic Client Information | 01/20/90 10:50:33 |

```
Client Code: MURDOCK          BillTo: MURDOCK         Ref.Code:
Client Name: David M. Murdock                         Statuses: NBB :      :
Address #1 : 625 Duke Road                            Producer: DMM :      :
Address #2 : SUITE 202                                Servicer: DMM :      :
ZIP=City+St: 07646         New Milford            NJ  Cr.Terms: 1    Net%: 15.00
Phone#1 Ext: 201 265-6206       #2: 201 265-6563      Fax No..:
Categories : CAL   :            :            :        Source..: DMM : 09/24/87
Commentary :
  L# Contact / Alternate Name     Salutation (no Dear) Typ Occup./Title Birthday
   1 Mr. David M. Murdock         Dave                  1                02/23/45
   2 Mrs. Eileen A. Murdock       Eileen                SP1              12/22/49
   3 Mr. Sean E. Murdock          Sean                  2
   3 No. of Contact Lines
  Policies   8  Written Premium           0  Annual         #Locations    8
  Comm. %    0  Commission Amt.           0  Annual         #Vehicles    13
  #Losses    0  Total Paid Amt.           0                 #Memos Due   14

Total Balance  Current Balance  30-60 Balance  60-90 Balance  Over 90 Balance
        4,760                 0              0              0             4,760
```

|      | Doc  | CERT |      |     |      | SCHI |      |     |      |     |      | CALC |      |      | Revw |
|------|------|------|------|-----|------|------|------|-----|------|-----|------|------|------|------|------|
| Exit | File | Help | Cmd? | POL | LOSS | MKT  | MEMO | INV | CERT | NEW#| Xref | Disp | Srch | Menu | Quit |

FIG. 20

```
GEMINI II Agency Automation System
Printed by David M. Murdock on 01/22/90, at 17:57:09.
```

```
Ref: PI.100$6          CISCO Demo Agency (Accrual)
                         Policy Selection List
Client Code: MURDOCK       BillTo MURDOCK           Ref.Code
Client Name  David M. Murdock                       Statuses NBB
Address #1   625 Duke Road                          Producer DMM
 Ln#      -- Policy Number --  Ins Cov Eff.Date Exp.Date B -CNR Date-  Premium
   1      1DRIVER2VEHICLES     AET PA  01/01/90 01/01/91 A
   2      TESTING&PREFILL      AET PA  01/01/90 01/01/91 A
   3      BINDER2676           AET PA  01/01/90 01/01/91 A
   4      SAFARI1111111111111  AET PA  01/01/90 01/01/91 A
   5      128345045            AET PA  12/12/89 12/12/90 A
   6      APP644               AET PA  07/01/97 07/01/98 A
   7      APP2254              AET PA  12/01/89 12/01/90 A
   8      APP2202              AET PA  01/01/89 01/01/90 A R 01/01/90
   9      APP1983              GA  PA  01/01/91 01/01/92 A
  10      APP644               AET PA  07/01/96 07/01/97 A R 07/01/97
  11      APP644               AET PA  01/01/96 07/01/96 A R 07/01/96
  12      APP644               AET PA  01/01/95 01/01/96 A R 01/01/96
  13      APP644               AET PA  01/01/94 01/01/95 A R 01/01/95
  14      APP644               AET PA  01/01/93 01/01/94 A R 01/01/94
 38 Lines
Ln#: 1    Tran: COR (NEW/END/AUD/CAN/REI/REW/REN/NRW/COR/DIS) Eff.Date:
```

```
APP |BIND|    |CERT|LNOT|    |SCHI|    |    |AAID|CLPR|    |    |    |Copy|
Exit|File|Help|Cmd?|POL |LOSS|    |Memo|    |    |    |Xref|Disp|Srch|Menu|Quit
```

FIG. 21

```
                GEMINI II Agency Automation System
         Printed by David M. Murdock on 01/22/90, at 18:01:37.
Ref: PI.101$11         CISCO Demo Agency (Accrual)      Entry 01/22/90 DMM
                        Basic Policy Information     Effective 01/20/90  14

Policy Seq. #:   2810    Division No.: 1         Client Code: MURDOCK
Policy Number: 1DRIVER2VEHICLES        State: NJ BillTo Code: MURDOCK
Named Insured: David M. Murdock
Inurer Code:   AET Aetna Casualty & Surety Producer Code1: DMM   2:    3:
Coverage Code: PA Personal Automobile     Bill Meth. A/C:A Agency Bill
Term / Status: A / NEW                    Cancel Method :
Eff.Date/Time: 01/01/90  : 12:01AM        Premium Amount:
Exp.Date/Time: 01/01/91  : 12:01AM        Comm:         % $
Orig. Incept.: 01/01/90                                 Written    Annualized
Binder Effect:          :                 Premium $
Binder Expire:          :                 Agt.Comm$
Binder Reason:                            Prd.Comm$
Misc. Remarks:
:
 <LOC>    1 Location & Building Info. <INV>   1 Inv & Prem Trans   N Inst?
 <DRI>    2 Driver Information        <PHO>   0 Prior History & Other Ins.
 <VEH>    2 Vehicle Information       <REM>   0 Remarks & Attachments
 <SCH>    0 Scheduled Property Info.  <AOI>   0 Additional/Other Interests
 <COV>    2 Coverage Information      <URI>   4 Underwriting & Rating Info.

APP BIND CHNG CERT LNOT LOSS SCHI Memo EPI AIID CLPR SAFA Disp Next Copy Revw
 Exit File Help  LOC  DRI  VEH  SCH  COV INV  PHO  REM  AOI  URI Srch Menu Quit
```

FIG. 22

GEMINI II Agency Automation System

Printed by David M. Murdock on 01/22/90, at 17:58:09.

```
01/22/90            The GEMINI II Insurance System         05:57:53PM
Menu: DMM
                       CISCO Demo Agency (Accrual)
              1.  Client Marketing & Servicing
              2.  Accounts Receivable Menu
              3.  Accounts Payable Menu
              4.  Financial Management Menu
              5.  Insurance Forms & Reports Menu
              6.  Insurance Codes & Lists Menu
              7.  Accounting Codes & Lists Menu
              8.  Nightly Sleep Save
              9.  Monthly Reports Menu
             10.  Memo & Word Processing Menu
             11.  System Coordinator's Menu
             12.  The CICSO Development Menu
             13.  The Report Builder Menu
             14.  Project Status Menu
             15.  The Interface Menu
             16.  Copyright Preparation Enter Selection #; (OFF); or <Return>:

Exit    Help Cmd?                                  Disp         Quit
```

FIG. 23

GEMINI II Agency Automation System
Printed by David M. Murdock on 01/22/90, at 17:58:24.

```
01/22/90            CISCO Demo Agency (Accrual)            05:58:12PM
Menu: AR.000
                      Accounts Receivable Menu 1. Preliminary Invoice Register
             2. Invoice Print & Update
             3. Invoice Correction Screen
             4. Cash Receipts Entry Screen
             5. Cash Receipts Report & Update
             6. Check Disbursements Entry Screen
             7. Check Disbursements Print& Update
             8. Accounts Receivable Adjustments
             9. Adjustments Report & Update
            10. Direct Bill Insurance Receipts
            11. Direct Bill Ins Receipts Prt & Upd Enter Selection #; (OFF); or <Return>:

Exit     Help Cmd?                              Disp        Quit
```

Fig. 24

GEMINI II Agency Automation System

Printed by David M. Murdock on 01/22/90, at 18:00:45.

```
Ref: AR.105$6            CISCO Demo Agency (Accrual)
                             Cash Receipts
Division No. :   1       CISCO Demo Agency (Accrual)
Reference No.:    1394
Bank Code    : HFT       Bank of Hartford
Deposit Date : 01/22/90  Period End Date: 01/31/90
Client Code  : JONES     JOE JONES              Balance      2,890.00
G/L Acct. No.: 1.1100.00 Accounts Receivable
Check Number : 12345                      Remains to Post       0.00
Check Amount :       100.00
Check Comment: ON ACCOUNT CASH RECEIPT
 Ln#  Inv.# Inv.Date Trn Policy No Cov Eff.Date Inv. Balance  Post Amounts
   1 OA1394 01/22/90 COA                                 *         100.00
   2   4323 12/15/89 NEW              01/01/90    2,222.00 B
   3   4323 12/15/89 NEW              01/01/90    2,222.00 B
   4   4327 12/15/89 FEE              12/11/89    2,990.00 *
   5
   6
   7
   8
   9
  10

Doc
 Exit File Help Cmd?                            Xref Disp Srch Menu Quit
```

FIG. 25

GEMINI II Agency Automation System

Printed by David M. Murdock on 01/22/90, at 18:01:03.

```
01/22/90                CISCO Demo Agency (Accrual)              06:00:51PM
Menu: AR.000
                           Accounts Receivable Menu 1. Preliminary Invoice Register
                  2. Invoice Print & Update
                  3. Invoice Correction Screen
                  4. Cash Receipts Entry Screen
                  5. Cash Receipts Report & Update
                  6. Check Disbursements Entry Screen
                  7. Check Disbursements Print & Update
                  8. Accounts Receivable Adjustments
                  9. Adjustments Report & Update
                 10. Direct Bill Insurance Receipts
                 11. Direct Bill Ins Receipts Prt & Upd Enter Selection #; (OFF); or <Return>:

Exit    Help Cmd?                                    Disp         Quit
```

Fig. 26

GEMINI II Agency Automation System

Printed by David M. Murdock on 01/22/90, at 18:01:17.

```
01/22/90              The GEMINI II Insurance System           06:01:05PM
Menu: DMM
                          CISCO Demo Agency (Accrual)
                  1. Client Marketing & Servicing
                  2. Accounts Receivable Menu
                  3. Accounts Payable Menu
                  4. Financial Management Menu
                  5. Insurance Forms & Reports Menu
                  6. Insurance Codes & Lists Menu
                  7. Accounting Codes & Lists Menu
                  8. Nightly Sleep Save
                  9. Monthly Reports Menu
                 10. Memo & Word Processing Menu
                 11. System Coordinator's Menu
                 12. The CICSO Development Menu
                 13. The Report Builder Menu
                 14. Project Status Menu
                 15. The Interface Menu
                 16. Copyright Preparation Enter Selection #; (OFF); or <Return>:

|Exit|    |Help|Cmd?|    |    |    |    |    |    |    |Disp|    |    |Quit|
```

FIG. 27

```
                    GEMINI II Agency Automation System
            Printed by David M. Murdock on 01/22/90, at 18:01:37.
Ref: PI.101$11          CISCO Demo Agency (Accrual)        Entry 01/22/90 DMM
                          Basic Policy Information       Effective 01/20/90 14

Policy Seq. #:  2810    Division No.: 1        Client Code: MURDOCK
Policy Number: 1DRIVER2VEHICLES         State: NJ BillTo Code: MURDOCK
Named Insured: David M. Murdock
Inurer Code:   AET Aetna Casualty & Surety Producer Code1: DMM   2:     3:
Coverage Code: PA Personal Automobile      Bill Meth. A/C: A Agency Bill
Term / Status: A / NEW                     Cancel Method :
Eff.Date/Time: 01/01/90   : 12:01AM        Premium Amount:
Exp.Date/Time: 01/01/91   : 12:01AM        Comm:         % $
Orig. Incept.: 01/01/90                                  Written    Annualized
Binder Effect:            :                Premium $
Binder Expire:            :                Agt.Comm$
Binder Reason:                             Prd.Comm$
Misc. Remarks:
:
   <LOC>    1 Location & Building Info.  <INV>   1 Inv & Prem Trans    N Inst?
   <DRI>    2 Driver Information         <PHO>   0 Prior History & Other Ins.
   <VEH>    2 Vehicle Information        <REM>   0 Remarks & Attachments
   <SCH>    0 Scheduled Property Info.   <AOI>   0 Additional/Other Interests
   <COV>    2 Coverage Information       <URI>   4 Underwriting & Rating Info.

APP BIND CHNG CERT LNOT LOSS SCHI Memo EPI AIID CLPR SAFA Disp Next Copy Revw
 Exit File Help  LOC  DRI  VEH  SCH  COV INV PHO  REM  AOI  URI Srch Menu Quit
```

FIG. 28

| | LINES |
|---|---|
| | 639-710 |
| | 712-728 |
| | 733-736 |

GEMINI II Agency Automation System

Printed by David M. Murdock on 01/22/90, at 18:11:39.

```
Ref: ACRD.FRMS$2.1         CISCO Demo Agency (Accrual)
                       ACORD Forms Generation Parameters                    P/L
ACORD Form #: 1     Description: ACORD 1 Property Loss Notice p. 1           P
-------------------------------Lines and Boxes-------------------------------
Line Horiz Vert  Height  Width  Wt T Patt ----- Comments -------------------
 1    1.00  2.00  63.50  81.00  10 0
 2   66.00  4.50   1.00  16.00   1 0
 3   32.00  6.50   1.00  50.00   1 0
 4   32.00  8.50   1.00  50.00   1 0
 5   32.00  9.50   1.00  50.00   1 0
 - Check Off Boxes-     ------------------Printing Offsets ------------------
   1   67.00     4.00 ------- Background --------    --------Foreground -------
   2                  Horiz:        Vert:   1.50 Horiz:        Vert:  -1.75
------Horiz---Vert-O-Pt-Wt----- Background Text -----------------------------
   1   3.00   3.10 H 16 B ACORD
   2  13.50   3.25 H 18 B PROPERTY LOSS NOTICE
   3  67.00   2.50 H  6 B DATE
   4  70.00   2.50 H  6 M (MM/DD/YY)
   5   2.00   4.55 H  6 B PRODUCER
   6  33.00   4.55 H  6 B PRODUCER PHONE
   7  42.00   4.55 H  6 B (A/C, No., Ext.)
   8  51.00   4.55 H  6 B MISCELLANEOUS INFORMATION Exit File Help Cmd?                                          Srch Menu Quit
```

FIG. 36

ACORD PROPERTY LOSS NOTICE

| PRODUCER | PRODUCER PHONE (A/C, No., Ext.) | MISCELLANEOUS INFORMATION (Site & Location Code) | DATE (MM/DD/YY) |
|---|---|---|---|

| | COMPANY | POLICY NUMBER | CAT.# |
|---|---|---|---|

| CODE | SUB CODE | POLICY EFF. DATE (MM/DD/YY) | POLICY EXP. DATE (MM/DD/YY) | DATE (MM/DD/YY) & TIME OF LOSS A.M. P.M. | PREVIOUSLY REPORTED YES NO |
|---|---|---|---|---|---|

INSURED

| NAME AND ADDRESS | INSURED'S RESIDENCE PHONE (A/C, No.) | INSURED'S BUSINESS PHONE (A/C, No., Ext.) |
|---|---|---|
| | PERSON TO CONTACT | WHERE TO CONTACT / WHEN |
| | CONTACT'S RESIDENCE PHONE (A/C, No.) | CONTACT'S BUSINESS PHONE (A/C, No., Ext.) |

LOSS

| LOCATION OF LOSS | POLICE OR FIRE DEPT. TO WHICH REPORTED |
|---|---|
| KIND OF LOSS (Fire, Wind, Explosion, Etc.) | PROBABLE AMOUNT ENTIRE LOSS |

DESCRIPTION OF LOSS & DAMAGE (Use additional pages, if necessary)

POLICY INFORMATION

MORTGAGEE (If none so indicate)

HOMEOWNER POLICIES SECTION 1 ONLY (Complete for coverages A, B, C, D & additional coverages. For Homeowners Section II Liability Losses, use ACORD 3.)

| COVERAGE A | COVERAGE B | COVERAGE C | COVERAGE D | DESCRIBE ADDITIONAL COVERAGES PROVIDED |
|---|---|---|---|---|
| DWELLING | APPURTENANT PRIVATE STRUCTURES | UNSCHEDULED PERSONAL PROPERTY | ADDITIONAL LIVING EXPENSES | ON |
| | | | | ON |

| SUBJECT TO FORMS. (Insert form nos. & edition dates, special deductibles) | DEDUCTIBLES |
|---|---|

FIRES, ALLIED LINES & MULTI-PERIL POLICIES (Complete only those items involved in loss)

| ITEM | AMOUNT | BLDG. | CONTENTS | OTHER | %COINS | DEDUCTIBLE | COVERAGE AND / OR DESCRIPTION OF PROPERTY INSURED |
|---|---|---|---|---|---|---|---|
| | | | | | | | |
| | | | | | | | |
| | | | | | | | |

SUBJECT TO FORMS. (Insert form nos. & edition dates, special deductibles)

MISCELLANEOUS INFORMATION

OTHER INSURANCE (List companies, policy numbers, coverages & policy amounts)

REMARKS

| ADJUSTER ASSIGNED | DATE ASSIGNED (MM/DD/YY) |
|---|---|
| REPORTED BY | REPORTED TO | SIGNATURE OF PRODUCER OR INSURED |

ACORD 1 (2/88) 1 of    NOTE: IMPORTANT STATE INFORMATION ON NEXT PAGE    © ACORD CORPORATION 1988

FIG. 37

| ACORD. | PROPERTY LOSS NOTICE | | DATE (MM/DD/YY) 07/22/89 |
|---|---|---|---|
| PRODUCER GEMINI II Demo Agency 95 Grand Avenue P.O. Box 1000 CODE 4564161  SUB CODE | PRODUCER PHONE (A/C, No., Ext.) 5167981000 | MISCELLANEOUS INFORMATION (Site & Location Code) | |
| | COMPANY Aetna Casualty & Surety | POLICY NUMBER 1234567890 | CAT.# |
| | POLICY EFF. DATE (MM/DD/YY) 01/01/89 | POLICY EXP. DATE (MM/DD/YY) 01/01/90 | DATE (MM/DD/YY) & TIME OF LOSS 07/19/89  A.M. P.M. | PREVIOUSLY REPORTED YES NO |

INSURED

| NAME AND ADDRESS David M. Murdock 625 Duke Road SUITE 1 New Milford, NJ 07646 | INSURED'S RESIDENCE PHONE (A/C, No.) 201|265-6206 | INSURED'S BUSINESS PHONE (A/C, No., Ext.) 201|265-6563 |
|---|---|---|
| | PERSON TO CONTACT Mr. David M. Murdock | WHERE TO CONTACT |
| | | WHEN |
| | CONTACT'S RESIDENCE PHONE (A/C, No.) 201|265-6206 | CONTACT'S BUSINESS PHONE (A/C, No., Ext.) 201|265-6563 |

LOSS

LOCATION OF LOSS See Remarks for Location of Loss    POLICE OR FIRE DEPT. TO WHICH REPORTED KIND OF LOSS (Fire, Wind, Explosion, Etc.)
Property                                             PROBABLE AMOUNT ENTIRE LOSS DESCRIPTION OF LOSS & DAMAGE (Use additional pages, if necessary)
WIND BLEW DOWN A TREE BRANCH ON THE HOUSE

POLICY INFORMATION
MORTGAGEE (If none so indicate)

HOMEOWNER POLICIES SECTION I ONLY (Complete for coverages A, B, C, D & additional coverages. For Homeowners Section II Liability Losses, use ACORD 3.)

| COVERAGE A DWELLING | COVERAGE B APPURTENANT PRIVATE STRUCTURES | COVERAGE C UNSCHEDULED PERSONAL PROPERTY | COVERAGE D ADDITIONAL LIVING EXPENSES | DESCRIBE ADDITIONAL COVERAGES PROVIDED |
|---|---|---|---|---|
| | | | | ON |
| | | | | ON |

SUBJECT TO FORMS. (Insert form nos. & edition dates, special deductibles)    DEDUCTIBLES FIRES, ALLIED LINES & MULTI-PERIL POLICIES (Complete only those items involved in loss)

| ITEM | AMOUNT | BLDG. | CONTENTS | OTHER | %COINS | DEDUCTIBLE | COVERAGE AND/OR DESCRIPTION OF PROPERTY INSURED |
|---|---|---|---|---|---|---|---|
| 1 | 15000000 SeeRemarks | See> XXXX | | | 50 | 1000 | Blanket #: 5 |
| 2 | 25000 SeeRemarks | | | See-----> XXXX | | 5000 | Blanket #: 5 Trees, Shrubs & Plants |
| 3 | 150000 | | XXXX | XXXX | 90 | 500 | |

SUBJECT TO FORMS. (Insert form nos. & edition dates, special deductibles)

MISCELLANEOUS INFORMATION
OTHER INSURANCE (List companies, policy numbers, coverages & policy amounts)

REMARKS ---------- Location of Loss ----------
625 Duke Road; SUITE 1
New Milford, NJ 07646
(Continued on additional Remarks page.)

| ADJUSTER ASSIGNED | | DATE ASSIGNED (MM/DD/YY) |
|---|---|---|
| REPORTED BY | REPORTED TO David M. Murdock | SIGNATURE OF PRODUCER OR INSURED |

ACORD 1 (2/86) 1 of 3   # 260    NOTE: IMPORTANT STATE INFORMATION ON NEXT PAGE    © ACORD CORPORATION 1986

FIG. 38

```
                    GEMINI II Agency Automation System
          Printed by David M. Murdock on 01/26/90, at 15:12:13.
┌─────────────────────────────────────────────────────────────────────────┐
│Ref: BANKS$3            CISCO Demo Agency (Accrual)    Last Changed:MCB  │
│                         Add/Change Bank Codes         08/12/88 11:23:09 │
│                                                                         │
│Bank Code: CHP                                                           │
│Bank Name: Chase Manhattan Bank                                          │
│Bank G/L#: 1.1021.00              PREMIUM TRUST - CHASE                  │
│1st Chk #: 50000                                                         │
│Last Chk#: 50171                                                         │
│Address  : Main Street                                                   │
│Zip Code : 11743        City: Huntington              State: NY          │
│Routing Code                  : 01-216/212                               │
│Print Checks on Printer (Y/N): Y                                         │
│Print Check Stubs (Y/N)       : N                                        │
│Adjustment G/L Number         : 1.6080.00                                │
│Bank Transit Number           :        02800024                          │
│Account Number                : 343 1 101215                             │
│Spaces in MICR Line (Y/N)     :                                          │
│                                                                         │
│Order of (C)heck#-(T)ransit#-(A)ccount# MICR Output (e.g., TCA):         │
│                                                                         │
│                                                                         │
│         Doc                                                             │
│ Exit File Help Cmd?                           Disp Srch Menu Quit       │
└─────────────────────────────────────────────────────────────────────────┘
```

FIG. 39

OFFICE SYSTEM WITH AUDIT HISTORY

This is a continuation of application Ser. No. 07/954,416 filed Sep. 30, 1992, now U.S. Pat. No. 5,317,733 issued May 31, 1994, which is a continuation of application Ser. No. 07/471,290 filed on Jan. 26, 1990, now abandoned.

A portion of the disclosure of this patent document contains material which is subject to copyright protection. The copyright owner has no objection to the facsimile reproduction by anyone of the patent disclosure, as it appears in the PTO patent file or records, but otherwise reserves all copyright rights whatsoever.

BACKGROUND OF THE INVENTION

1. Field of the Invention

The present invention relates to office automation and specifically to the automation of virtually all clerical functions in an office, such as for example, an insurance agency. It involves means for the creation of virtually any document generated by the office without the need for preprinted forms and the automation of clerical activity involved in maintaining, updating, retrieving, displaying and printing information relating to the functions of the office.

One feature of this invention relates to means for storing a complete audit history of all activity to a specific database (DB) file record without saving the entire DB record in a historical file.

Another feature of this invention relates to means for permitting a worker to interrupt a particular task and execute a different task, without losing information already entered for the first task, and without being permitted to exit the system without completing or accounting for the first task.

A further feature of the present invention relates to a method of generating printed forms on a laser or equivalent printer without the user needing to learn the specific Page Description Language (PDL) of a particular brand of laser printer.

2. State of the Art

Although there has been much publicity given to the idea that widespread use of computers would usher in an age of the "paperless office" or "electronic office," for the most part such predictions are yet to be realized. The present inventor believes that certain inadequacies of current computer technology prevent available systems from achieving this potential. By addressing and overcoming these inadequacies, the present invention permits the implementation of computer systems which can truly be said to achieve the primary goals of office automation.

When a body of information is to be shared and accessed in common by more than one worker in an office, a system with greater power than a conventional personal computer is needed. The present invention involves a system including a multiterminal business computer with the ability to create and access a common database while maintaining an audit history of all additions and changes, with the ability to produce filled-in forms on an as-needed basis, and with the ability to permit the operator to interrupt a current task in favor of a more urgent one, without losing data and the ability to return where the first task was left off.

As the body of information in a database (DB) is created, added to, and changed as new and corrected data is entered, it is important to be able to determine when and under what circumstances each entry was made. The purpose of such a feature is to be able to isolate any errors, either systematic errors or inadvertent errors, that may have been made in the data, so that they may be corrected; a further advantage of such a feature is to be able to determine what the state of facts was at any time in the past. For accounting systems, and more generally for DBs that maintain such information, a trail of entries modifying a particular record is generally known as an "audit trail," and in general the information comprising the history of a given DB or portion of a DB is known as an "audit history."

It has been customary in the past to maintain an audit history of a DB file by saving complete copies of each DB record in a historical file. As time passes, and the number of changes made to any specific record increases, enormous amounts of disk storage are required to maintain the audit history of the DB files. This causes the system designer to make several compromises. The number of DB files for which history will be maintained is severely limited, or there must be a periodical compression of the history images to conserve disk space, with the consequence that detail of audit information is lost. The ability to maintain audit history on a wide range of DB files without the necessity of compressing out the detail would be a valuable tool to any system designer.

One of the primary failures of many multi-user office automation systems is that the programs do not operate in the same way an employee would operate manually. Specifically, workers are constantly being interrupted by requests for information by other employees or by outside clients.

Using past systems, when a worker is involved in a computer-related function (e.g. adding a new client or customer to the database) and is interrupted by a phone call from an existing client who has a question about last month's statement, the employee would have to choose from among the following alternatives:

1. Take down some basic information from the client, offer to call the client back once the information has been found, finish up the computer operation currently in progress, and then call up the necessary programs to answer the client's inquiry. In that event, the client would have to wait for a callback.

2. Throw away the work done so far by aborting the current computer operation and then call up the programs necessary to answer the client's inquiry. Later, the work thrown away would have to be reentered.

3. Place the client on hold, get up from the workstation, find another workstation where the terminal is free, ask the employee sitting there to move, and then use that terminal to call up the programs to answer the client's question. The worker and possibly one other employee are displaced while the question is being answered, and the worker is away from any notes or other information that may also help respond to the client.

Each of the choices described above has undesirable consequences. And even though this problem has been addressed on some graphics-based operating environments, e.g. on Macintosh personal computers as well as Microsoft Windows and IBM OS/2, they remain as serious problems on multi-user computer systems that utilize ASCII terminals as their primary input device.

Modern laser printers are delivered to the end user with a command language built in. While the Page Description Language (PDL) may differ from one manufacture to another, each of the PDLs provided will allow the end user to perform various tasks such as to draw a line or draw a circle. The languages differ in capability and style, but all PDLs provide a basic graphics capability to the end user. However, in general these PDLs are difficult to learn and use. The commands tend to be very difficult to specify, and often the user needs many trials and errors before achieving the desired result on the page.

There are several products currently on the market that will allow an end user to graphically build an image of the desired form on the monitor and then generate that image on a printer. However, these products build "bit-mapped" images, which require large amounts of disk space for storage and take a long time to print. Moreover these products are based on personal computers and require a bit-mapped monitor to use. Because the products do not utilize the PDL that is provided with the printer to generate the documents, very substantial amounts of printing time are consumed for each page that is printed, so much so that such products are not well suited for generating filled-in forms on an as-needed basis in a busy office.

SUMMARY OF THE INVENTION

The present invention involves an integrated system providing a workstation having access to a common database of information for each of a plurality of office workers (operators). The system supports workstations that are capable of displaying on demand whatever information is needed or requested by the operator. The operator also updates information in the database by entering it into the workstation. A feature of the present invention is that the system has the capability of recreating and displaying the information as it existed in the database at any time in the past, utilizing audit history data, and optionally of displaying the information as it is expected to be at some future date.

The system is especially useful for information-intensive service businesses, for example an insurance agency, an accounting firm, or a law office, as well as nonprofit organizations, e.g. a hospital, and governmental agencies, e.g. a taxing authority. For many such functions, inquiries and new information may arrive on an unpredictable basis, such as by telephone or walk-in, and it is desirable that any system serving that office be capable of responding immediately to an inquiry and that any task of more than one step be susceptible of being interrupted in favor of a more urgent task.

The system has the capability of producing printouts, e.g. forms, documents, correspondence, and checks, close to the time they are requested and in most instances at a location in proximity to the operator requesting the printout, because the amount of pre-printed material can be limited and most forms can be generated on an as-needed-and-used basis, with all information already filled in.

Desirably each workstation is a terminal of a multiterminal general purpose business computer, for example a microcomputer serving from two to eight or nine terminals, and preferably a minicomputer serving up to about 120 ASCII terminals or the like. The system of the present invention could also be incorporated in a mainframe computer, such as one serving hundreds of terminals, if desired. Each terminal comprises a conventional keyboard and display screen, with the capability of displaying conventional ASCII characters. An advantage of the present invention is that the features are implemented without the need for graphics display capabilities which could require more expensive communication links and terminal hardware.

Audit History Feature

In accordance with the audit history feature of the present invention, all programs that are written or generated that utilize a file that maintains history, will call a particular program. This program will compare the record as it resides on disk and the record as it is about to be written back to disk, and create one audit history record that records all of the changes that have transpired. One record is created each time that the record is written to disk. These records become the audit trail for the record. In the preferred embodiment of the invention described in greater detail below, this program is named STD.HISTORY.SUB.

If the operator wishes to examine the history for a record, a command is entered that will call the STD.HISTORY.SUB program. The operator is prompted for information about how the audit history is to be displayed. The program will then utilize the audit records created earlier to recreate the record as of the date desired. The display logic of the program will then display the version to the operator, with all changes displayed in a special graphical format such as reverse video or some other highlighting technique. The operator may then examine other versions of the historical record by entering various commands.

There are two variations to displaying record history as follows:

1. Strictly in the order that they were made based on the date and time of original entry.

2. Sorted and displayed in an alternate order that the developer may designate. In a preferred embodiment of the system (i.e. for insurance agency management), the alternate order is by the Effective Date of the change. For example, changes may be entered into the system to be effective in the past or the future. Changes effective in the future anticipate certain events, such as the date a student will be leaving for college and going off the policy. Changes made in the past record events that have happened but which, for one reason or another, are not recorded until some later date, such as the purchase of an additional family car.

Interrupt Feature

This feature of the present invention provides the operator with the ability to temporarily suspend the current operation and initiate an entirely new operation. The software allows the operator to be "interrupt-driven" as required by the working environment. A preferred embodiment of this feature will allow the operator to perform the interruption process up to twelve times before the system requires the operator to conclude a previously interrupted task. The system prevents the operator from logging off for the day without resolving each of the suspended sessions. Various pieces of information are passed from level to level by the program, thus allowing for seamless operation of multi-level tasks.

Utilizing this feature in the example mentioned in the State of the Art section above, the operator enters the (M)enu command regardless of where the focus of activity (i.e. the curser) happens to be in any screen. The system will thereupon perform the following steps:

1. Suspend the current operation (adding the new client).

2. Initiate a new computer task.

3. Execute the Menu Program, which permits the operator to perform any computer operation necessary to satisfy the client's question.

Once finished with the new task, the operator enters (E)xit from the menu program and the system will:

4. Re-establish the original program.

5. Re-display the original program background and data.

6. Place the operator back into the field from which the interruption was initiated.

Forms Builder Feature

The forms builder feature of the present invention permits an unskilled operator to design a form without ever having to learn the PDL of the device being used to print the forms. This feature of the invention does not require the use of a bitmapped monitor and generates a printer-compatible series of commands in the PDL of the printer. Armed with nothing more than a standard forms ruler, the developer can enter in all of the necessary information to allow the Forms Builder to build the form.

Two steps are required to generate each form. The operator enters the image specifics into a database record via a screen entry program. Once complete, the system interprets the "Source" information and generates the printer-compatible "Object" commands.

Because of the virtually universal acceptance of the Hewlett-Packard PDL throughout the laser printer industry, this PDL is implemented as the language of choice in the preferred embodiment of this invention.

BRIEF DESCRIPTION OF THE DRAWINGS

FIG. 6 to FIG. 12 are screen images depicting the various historical data presentations generated by the audit history program.

FIG. 18 to FIG. 28 are a series of screen images that illustrate the interruption function.

FIG. 36 is a screen image of the Forms Generation Parameter entry screen. A portion of the information necessary to generate a form is also displayed.

FIG. 37 is the actual form created by the Forms Generator as a result of the information entered and depicted in FIG. 36.

FIG. 38 is an example of the form of FIG. 37 combined with actual data and printed.

FIG. 39 is a screen image produced by the program BANKS$3.MAIN.

BRIEF DESCRIPTION OF THE APPENDICES

APPENDIX A. STD.HISTORY.SUB$8 (Version 8): Source Code Listing. Used to maintain and display audit history.

APPENDIX B.
1) BANKS$3.MAIN (Version 3): Generated Source Code Listing. Typical program that maintains and displays history.
2) BANKS$3.BGFG (Version 3): Generated Source Code Listing. Display routines used by BANKS$3-.MAIN to display Background (static data), Foreground (DB record data), and Historical information (both visual presentation data and history data).

APPENDIX C. STD.MESSAGE$17 (Version 17): Source Code Listing. This program is used by all applications programs to prompt the operator with a message, and then capture the operator's response.

APPENDIX D. STD.INPUT$18 (Version 18): Source Code Listing. This program is used by all applications programs to accept data from the operator. This program differs from STD.MESSAGE in that there is no prompt involved and the resulting data is validated and placed into a data record.

APPENDIX E. STD.EXECUTE$4 (Version 4): Source Code Listing. Used by all applications programs to freeze the current level and initiate the next higher level.

APPENDIX F. PROGRAM.MAIN$4 (Version 4): Source Code Listing. Used by all applications programs to perform various house-keeping tasks and to communicate between levels.

APPENDIX G. STD.FORMS.BUILDER$2 (Version 2): Source Code Listing. Used to compile the printer understandable (Object Code) necessary to create a laser printed document.

APPENDIX H.
1) ACORD.FORMS$2.MAIN (Version 2): Source Code Listing. Used to enter document image parameters. Creates and maintains the Image Source information.

2) ACORD.FORMS$2.BGFG (Version 2): Source Code Listing. The display routines for the above entry program.

DETAILED DESCRIPTION OF A PREFERRED EMBODIMENT

Figure 1:
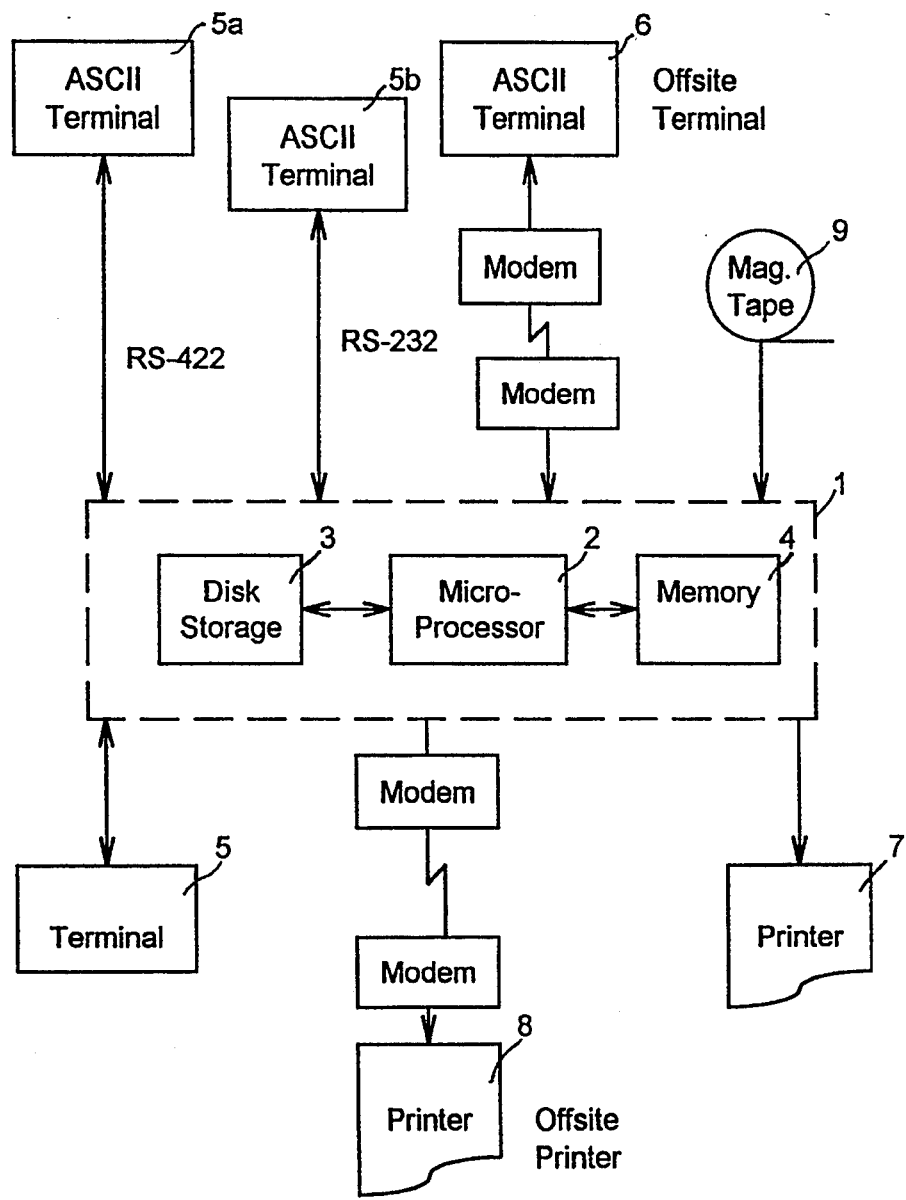
FIG. 1 shows a typical computer hardware configuration that could utilize this invention.

FIG. 1 shows diagrammatically a typical computer hardware configuration that would be appropriate for the system of the present invention. The host computer 1 generally comprises a microprocessor 2 in communication with disk storage 3 and high-speed memory 4. A plurality of terminals, here schematically represented by 5, 5a, and 5b, are in communication with the host computer 1 through any one or more of various forms of cabling.

Any of the various conventional techniques of connecting terminals to a host computer may be used in the system of the present invention. As an illustrative example and not by way of limitation, terminal 5 represents one or more terminals coupled to the host computer through coaxial cable; terminal 5a represents optionally one or more terminals communicating through an RS-422 link; and terminal 5b represents one or more terminals communicating through an RS-232 link. Terminals 5, 5a, and 5b are all within the distance of effective cable runs from the host computer 1.

Terminal 6, shown as being connected to the host computer 1 through telecommunications link by modem, represents optionally one or more terminals that may be beyond the effective distance of direct cabling to the host computer 1 and may operate anywhere that electromagnetic signals may be communicated, including via the public switched telephone network and cellular phone communication. As mentioned previously, the terminals should be capable of displaying conventional ASCII characters but do not require graphics capabilities, even though the printers used in connection with the present system are capable of generating the graphics of a variety of forms.

Printer 7, shown as connected by cabling to the host computer 1, represents one or more printers within the distance of effective cable runs of the host computer. Desirably a plurality of printers having graphics capability, which are preferably laser or similar high-speed, high quality printers but alternatively may be conventional dot-matrix printers, are provided at spaced-apart locations in the office that are generally in proximity to the various terminals 5, 5a, and 5b.

Printer 8, shown as connected via modem to the host computer 1, represents one or more printers that are off site, and desirably in general proximity to the off-site terminals 6.

Bulk memory is provided by one or more magnetic tape drives 9, which also communicate with the host computer 1.

Audit History Feature

The implementation of the audit history feature is facilitated by the generation of various parts of the software in a strictly uniform format. Each calling program would set up the initial conditions, accept and process the commands the same, and contain a display routine that would display the visual image record and the historical image record simultaneously on the screen to properly represent each image to the operator.

In producing the software for the office automation system of the present invention, it is quite helpful to employ a Computer-Aided Software Engineering (CASE) program generator to create all data input programs. Once the concepts of audit history have been programmed into the CASE tool, every program generated would then include all of the necessary code to properly process audit history. An example of one of the generated programs illustrates the necessary steps:

Program Name BANK.MAIN (Version 3). See APPENDIX B for listing.

FIG. 39. Screen 1/26/90-15:12:13: Screen dump of how the Bank File Maintenance program appears to the screen (including typical bank information; in this instance Chase Manhattan Bank).

APPENDIX B, pages 1-16. Program Listing BANKS$3.MAIN: This is the code generated by the CASE tool and contains the main logic portion of the program.

APPENDIX B, pages 17-19. Program Listing BANKS$3.BGFG: This is the code generated in concert with the ".MAIN" program above that contains all of the data display routines (including the audit history display). The pertinent sections of this program are as follows:

| Lines | Box | Description |
| --- | --- | --- |
| 37-57 | | Display the static background text |
| 58-83 | | Display the current Data Base record |
| 109-134 | 696 | Display the visual and historical image records |
| | 720 | |

Figure 2A:
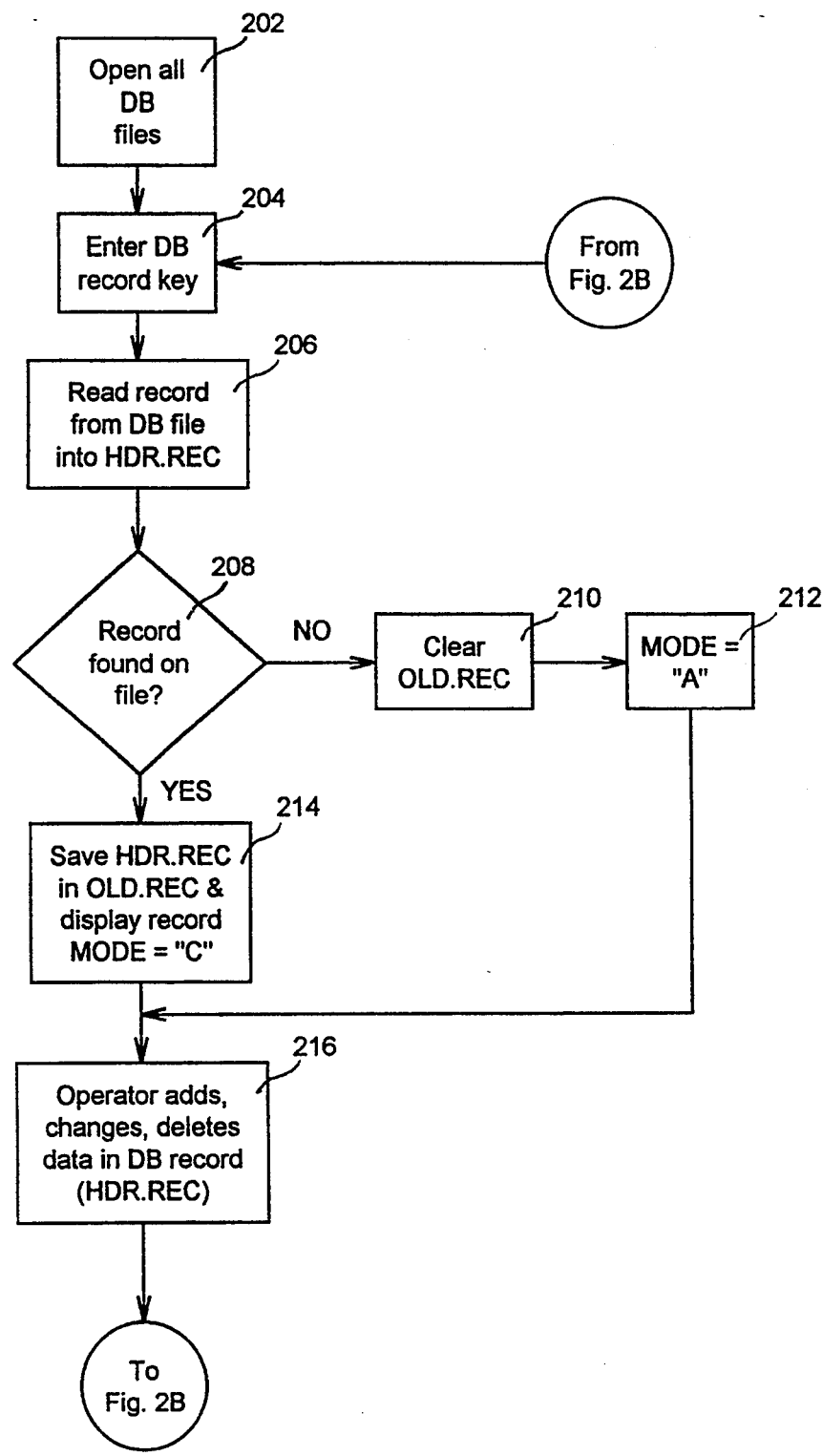
FIGS. 2A and 2B are a block diagram of a typical program that would maintain and display audit history.
Figure 2B:
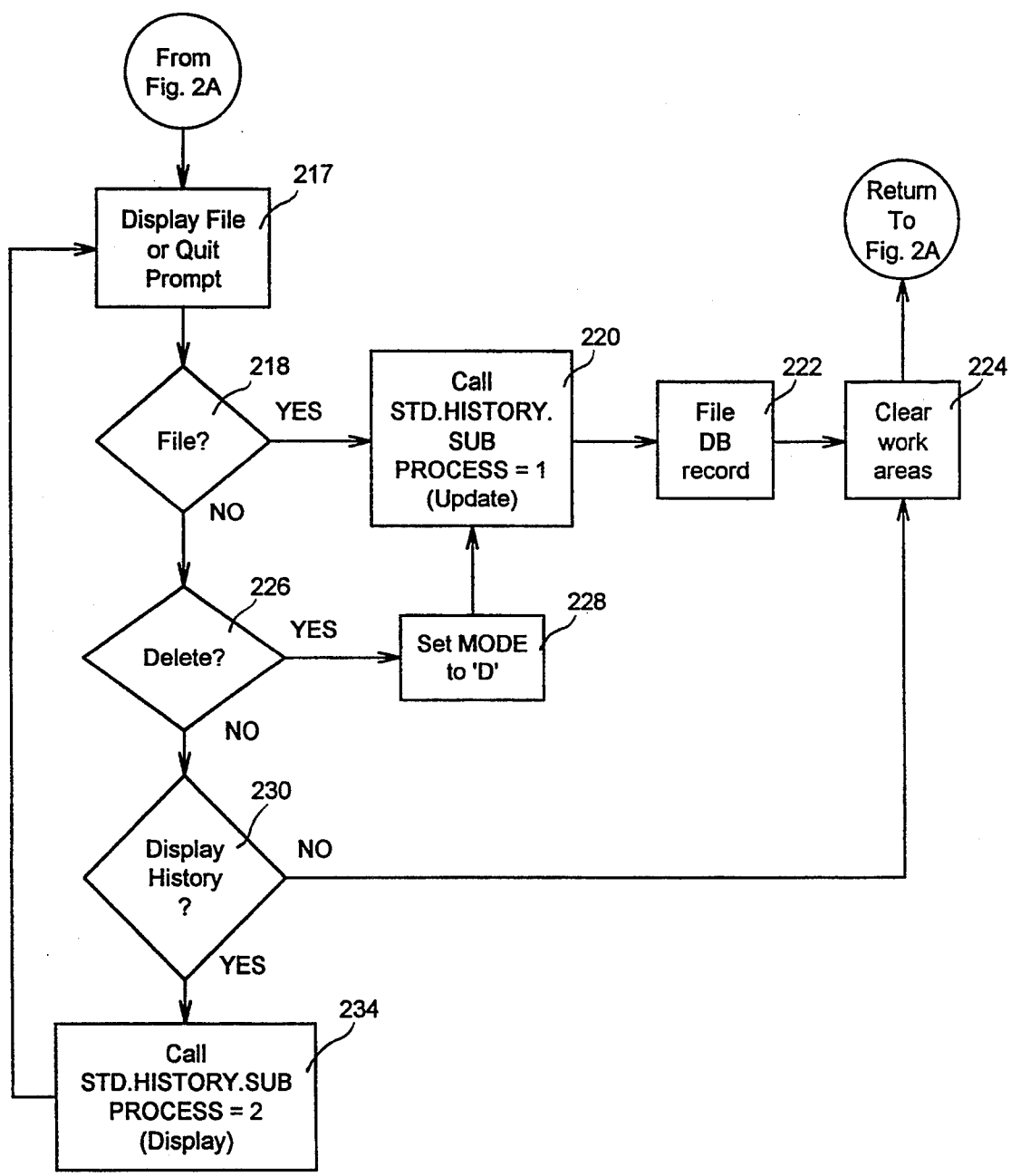
Figure 3:
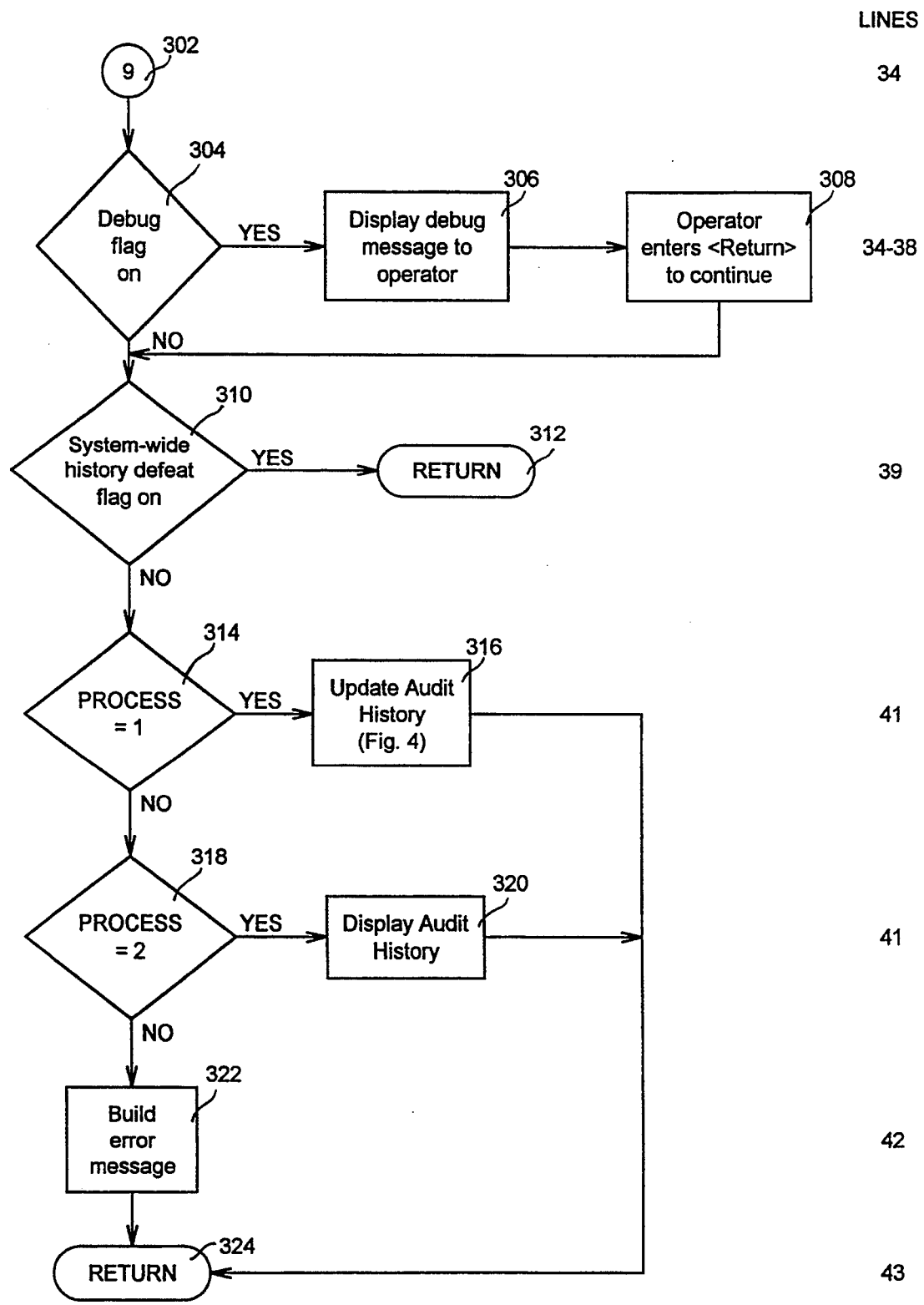
FIG. 3 shows the overall logic flow of the audit history program (STD.HISTORY.SUB) of a preferred embodiment of the present invention.

Please refer to FIGS. 2A and 2B and program listing BANKS$3.MAIN, APP. B.

| Lines | Box | Description |
| --- | --- | --- |
| 41-47 | 202 | Data Base files are opened (including BANKS.HISTORY FILE (line 43) |
| 84-95 | 204 | Operator enters Data Base record key |
| 107-115 | 206 | Program attempts to read DB record from disk |
| 112-115 | 212 | MODE set to "A" |
| 109-111 | 214 | DB record saved in OLD.REC, DB record displayed to the operator, and MODE set to "C" |
| 127-325 | 216 | Operator may enter/change data fields in the DB record. |
| 326-343 | 217 | Operator is prompted for (F)ile, (Q)uit, (R)eview, and various other commands |
| 345-382 | 218 | Operator selects (F)ile. |
| 512 | 220 | File routine calls STD.HISTORY.SUB to update the history file. |
| 513-514 | 222 | DB record is filed to disk |
| 518-546 | 224 | Work areas are cleared to prepare for a new DB key to be entered |
| 394-426 | 226 | Operator selects to delete the DB record |
| 401 | 228 | MODE is set to "D" |
| 402 | 220 | STD.HISTORY.SUB routine is called to update the history file. |

Note: Due to various program efficiency reasons, the recognition of the (R)eview command takes place in another program. This program is used to prompt the operator and return to the calling program the operator's response. The program name is STD.MESSAGE, and a complete program listing is APPENDIX C. The following line numbers refer to line numbers in STD.MESSAGE.

| 129 | 230 | The operator requests that audit history be displayed. |
| --- | --- | --- |
| 426-432 | 234 | The STD.HISTORY.SUB program is |

| | -continued |
|---|---|
| | called after setting PROCESS to 2 to signify that the display routine is to be executed. |
| 433 | The original screen Background (static text) and Foreground (record data) are displayed. |

FILES REQUIRED:

Each file that is to have history recorded must have a database file to store the current active record and a history file to store the audit history records. In the system of the preferred embodiment, the history file is named XXX.HISTORY where XXX is the name of the database file.

| Data File | History File |
|---|---|
| CLIENTS | CLIENTS.HISTORY |
| POLICIES | POLICIES.HISTORY |
| DRIVERS | DRIVERS.HISTORY |

RECORD LAYOUTS:

Database Record

The layout of the database record has no bearing on the creation of audit history with the following restriction: A field must be designated to hold the Audit Information in the database record. This field will hold the following information:

1. The Initials of the operator who made the change.
2. The System Date that the change was made.
3. The System Time that the change was made.
4. The Audit History Change Number.
5. The Mode of the program:
A—Adding a new record
C—Changing an existing record
D—Deleting a record
6. The name of the program making the change.
7. Any other optional piece of information that the system designer wishes to use as an alternate display sequence.

The database file record will hold the above-described information for the last change entered. Each time a new history record is created, the Audit History information is replaced with new information recording the conditions of the latest change.

Audit History Record

The key to each Audit History record is composed of the key to the database file record and the Audit History Change Number.

Attribute (Field) #1—This field contains the same audit history information as contained in the database file record.

The next two attributes will record the fact that an individual field in the database record was changed as follows:

First Attribute: The specific data field location that has been changed. The operating system that a preferred embodiment of this Audit History is implemented on (the Pick Operating System) has Fields (Attributes), Sub-Fields (Values), and Sub-Sub-Fields (Sub-Values). Each of these is identified by the Attribute Mark Count (AMC), Value Mark Count (VMC), or Sub-Value Mark Count (SVMC). This first attribute will contain the AMC, VMC, and SVMC of the field changed.

Second Attribute: The second attribute of each pair will contain the old contents of the field changed. The new contents are in the database record. If the old contents of the field were Null (empty), then a Delete Mark (ASCII 127) is stored.

Each field changed in the database record will require a pair of attributes in the history record. Additional pairs of fields are added to the history record as necessary to record multiple changes.

When records are added to the database file, the only information recorded is the information in the attribute #1.

When records are deleted from the database file, the audit history record will contain all of the information in the database record just prior to deletion.

The following examples will demonstrate the file layout of a typical Audit History transaction:

| AMC DB RECORD FIELD CONTENTS (BEFORE) | |
|---|---|
| Key | MURDO23MA |
| 1 | DMM\8900\14123\C\4\CP.100 |
| 2 | Megan M. Murdock |
| 3 | 123 Main St. |
| 4 | Anywhere |
| 5 | New Jersey |
| 6 | 07003 |
| 7 | 201-429-7733 |

Three changes will be made to this record.

1. Expand the middle initial to the complete middle name
2. Change "Anywhere" to "Bloomfield"
3. Remove the telephone number

| AMC DB RECORD FIELD CONTENTS (AFTER) | |
|---|---|
| Key | MURDO23MA |
| 1 | DMM\8935\16274\C\5\CP.100 |
| 2 | Megan Maria Murdock |
| 3 | 123 Main St. |
| 4 | Bloomfield |
| 5 | New Jersey |
| 6 | 07003 |
| 7 | (empty) |

The Audit History record created to record this transaction will be as follows:

| AMC AUDIT HISTORY FIELD CONTENTS | |
|---|---|
| Key | MURDO23MA*5 |
| 1 | DMM\8935\16274\C\5\CP.100 |
| 2 | 2 |
| 3 | Megan M. Murdock |
| 4 | 4 |
| 5 | Anywhere |
| 6 | 7 |
| 7 | |
| 8 | 201-429-7733 |

Notes: Attribute 1 of the Audit History record is identical to the Audit History Attribute in the database record (Attribute 1 in this case). Each attribute changed in the database record requires two attributes in the Audit History record. One records the Attribute Mark Count (field number) and one records the old contents of the field. The key to this history record is composed of the key to the database record and the Audit History Change Number.

INITIAL CONDITIONS IN CALLING PROGRAM

Any program that is to call the history routine (STD.HISTORY.SUB) must initialize the following variables:

| | |
|---|---|
| HDR.REC | This is an array that contains the record as it has been changed by the program. |
| OLD.REC | This is an array that contains the record as it existed just after this program read the data record. |
| MODE | This is the Program Mode as specified above (A)dd, (C)hange, or (D)elete. |
| HIST.FILE | This is the internal file name (opened). |
| INT.HDR.KEY | This is the key of the database record. |
| MAX.AUDIT | This is the highest Attribute number (Field number) to be processed by the audit history routine. All fields above this limit are cleared and ignored. |
| ADDL.HIST. DATA | This is the optional additional information that the developer may designate as additional auditing information to be included. |
| PROCESS | This flag is set by the program depending on which function the program is to perform. If set to one (1), the program will perform the audit history update function. If set to two (2), the program will display any audit history that exists for the record as specified by INT.HDR.KEY. |
| CHANGE.HIST | This indicator is set to the Attribute Number of the DB record that will hold the audit history information. |

CALLING PROGRAM NARRATIVE

The process starts with the calling program (FIGS. 2A and 2B). This program will open all necessary database and history files 202. The operator will be prompted for and enter the key to a DB record 204. The program will store the response in INT.HDR.KEY and attempt to read the record from the DB file. If the record is not found in the file 208, the program will clear OLD.REC 210 and set the program MODE to "A" 212. If the record is found, the program will save the initial image of the DB record in OLD.REC 214.

At this point the operator has the ability to enter new information (Add Mode) or change existing information (Change Mode) 216. Once all additions or changes have been made, the program will prompt the operator to (F)ile the record, (D)elete the record, (Q)uit without saving any changes made, or (R)eview the audit history 217. If the operator responds (F)ile 218, the program will set the PROCESS flag to 1 (Update) and call STD.HISTORY.SUB 220, write the DB record back to disk 222, clear the work areas 224 and return to prompt the operator for another DB record key 204. If the operator responds (D)elete 9-26, the program will change the program mode from (A)dd to (D)elete 228 and then call STD.HISTORY.SUB to update 220. If the operator responds (R)eview 230, the program will set the PROCESS flag to 2 and call STD.HISTORY.-SUB 234 to display the audit history for the record and then return to the (F)ile, (D)elete, (R)eview prompt 217.

STD.HISTORY.SUB MAIN LOGIC NARRATIVE (FIG. 3)

If the programmer is debugging the calling program and has set the DEBUG.FLAG on, the program will halt and allow the operator (programmer) to set debug points in the program 304–308. If the system-wide history defeat flag has been set 310, then this installation of the Office Automation System is not maintaining history on any files, and the program will return to the calling program with no further processing 312. If the calling program has set the PROCESS flag to one (1) 314, then the program will execute the audit history update routine 316 and return to the calling program 324. If the calling program has set the PROCESS flag to two (2) 318, then the program will execute the audit history display routine 320 and return to the calling program 324. If the PROCESS flag is not set to either one or two, the program will return to the calling program 324 after setting an error condition 322.

Figure 4A:
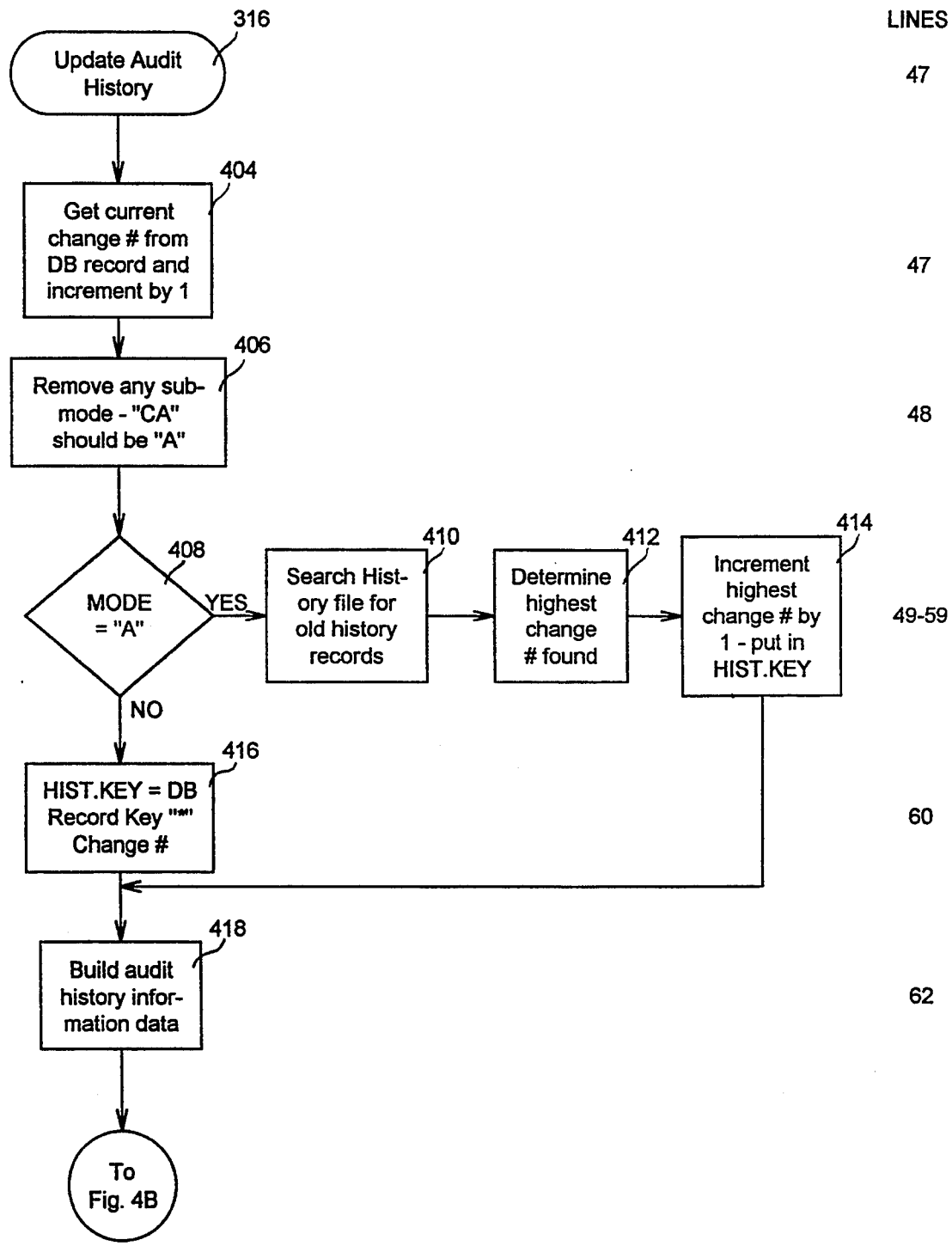
FIGS. 4A to 4I are a logic diagram of the updating portion of the audit history program.
Figure 4B:
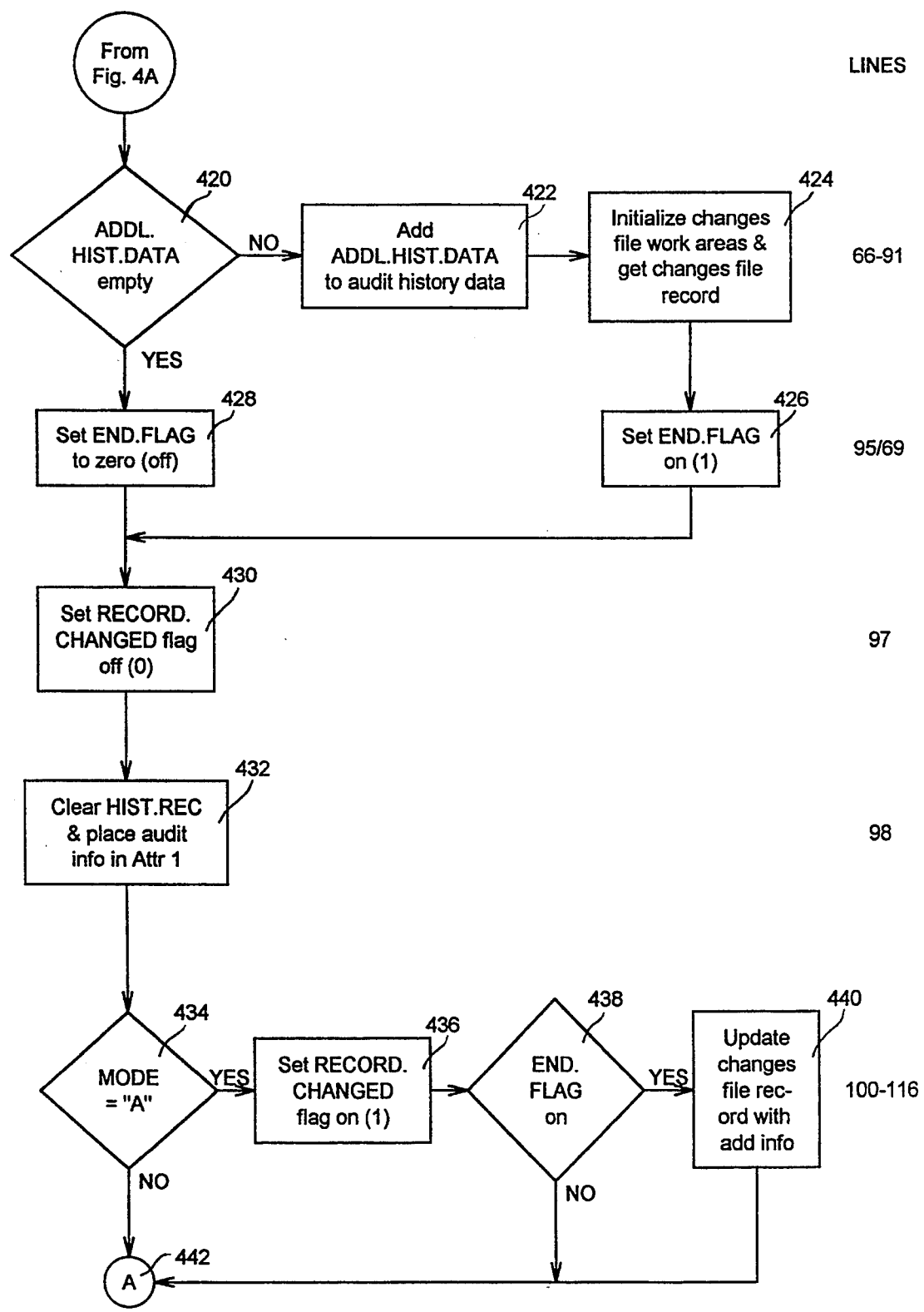

STD.HISTORY.SUB UPDATE LOGIC NARRATIVE (FIGS. 4A and 4B)

The program will determine the CHANGE.NO of the new audit history record (if any is ultimately created) by retrieving the last change number from the DB record's audit information and incrementing it by one 404. The program then will resolve any sub-Mode changes that might have taken place in the calling program 406. If the program mode is (A)dd 408, then the program will search the history file to see if this record had been deleted from the file at an earlier point 410, determine the highest change number found on the old record 412, and increment it and save the result in CHANGE.NO 414. The program will then specify the key of this audit history record 416 by constructing the history key as INT.HDR.KEY*CHANGE.NO as determined by step 404 or steps 410–414.

Next, the program will build the new audit history information string that will ultimately be stored in the DB record and in Attribute 1 of the audit history record 418. If the developer of the calling program has specified any additional information to be included 420, the program will add the contents of ADDL.HIST.DATA to the audit history data string 422, and initialize the Changes file to prepare to accept history information 424 and 426. At this point the program initializes various flags and work areas 430, and loads the audit information into the new audit history record 432.

If the program MODE was (A)dd 434, then there is no need to examine each data field. It is given that all fields are new. The program will set the RECORD.-CHANGED flag on 436, and if the END.FLAG (set in step 424) is on 438, updates the changes file with information about the record being added 440. The program will then continue with step 540 (See FIG. 4I).

Figure 4C:
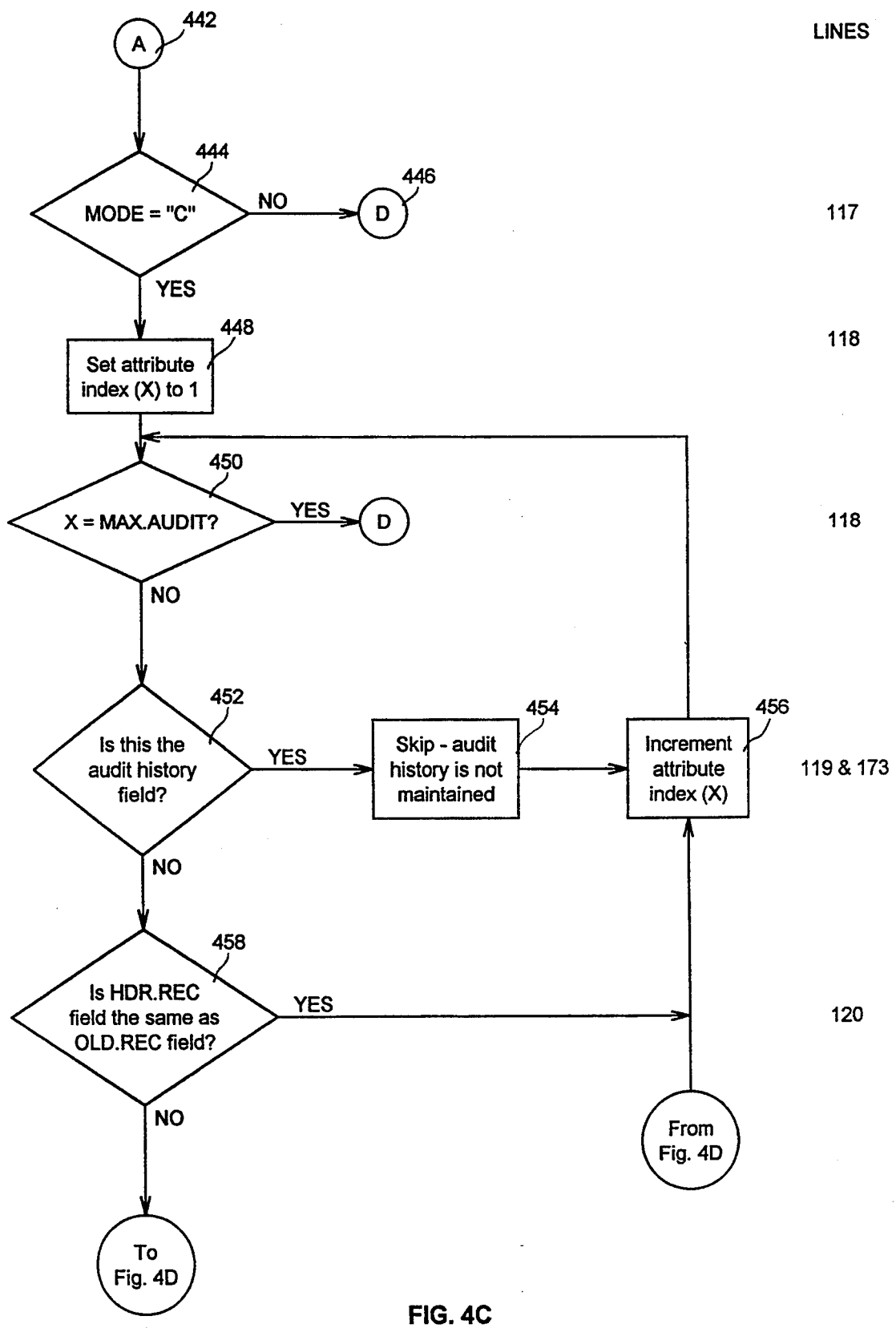
Figure 4D:
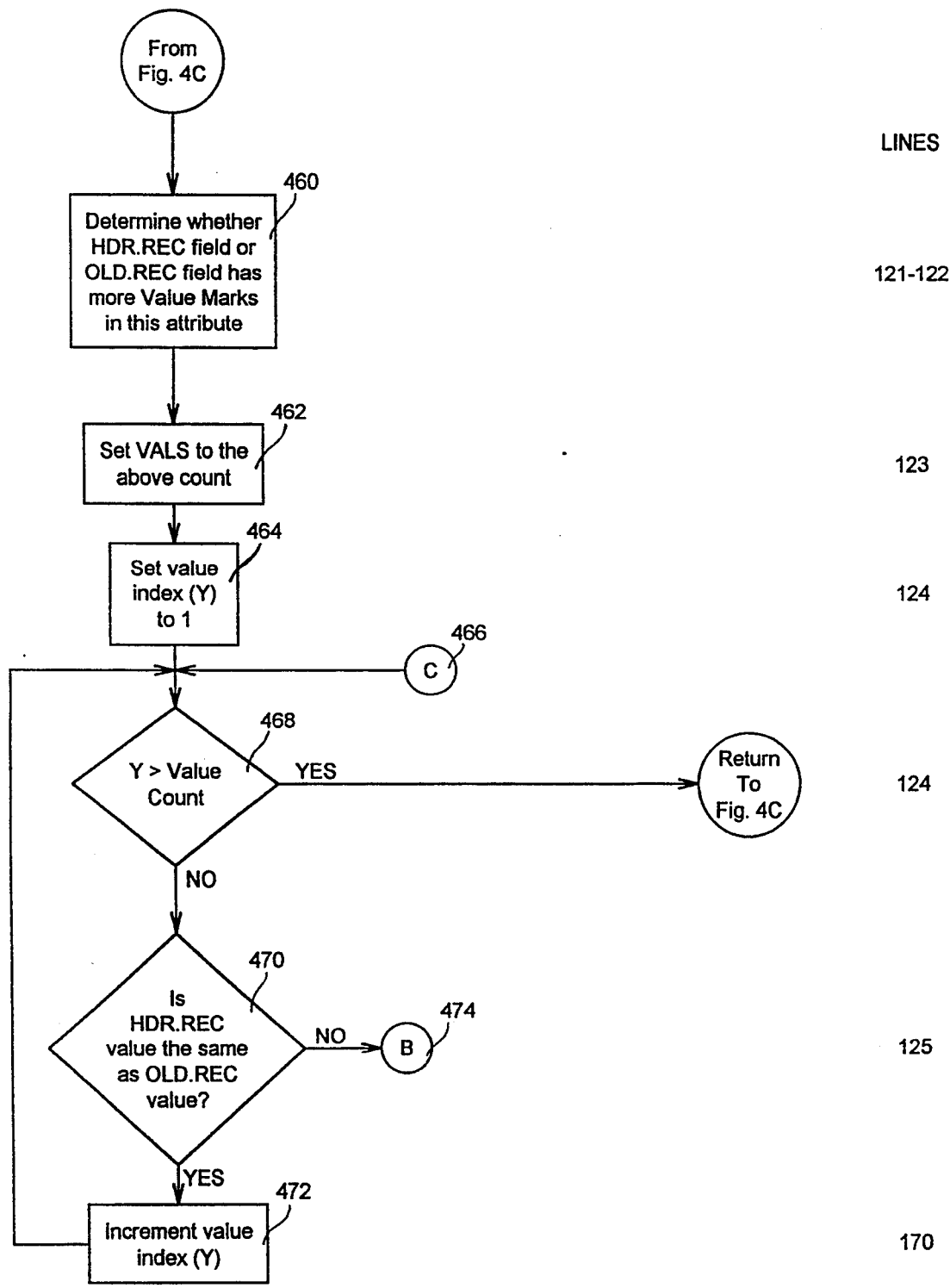

Refer to FIGS. 4C and 4D.

If the program MODE is (C)hange 444, then each Attribute (Field), Value (Sub-Field), and Sub-Value (field within a Sub-Field) must be examined individually to determine if any changes have been made by the operator to this record. This is accomplished as follows:

The Attribute Index (X) is initialized to one (1) 448, and utilizing a programming "FOR-NEXT" loop, each Attribute is examined individually. If the loop logic has reached the last field to be processed 450, then the program will continue with step 540 (See FIG. 4.5). The program is also designed to skip over the field that holds the audit history information in the DB record 452-456. Each Attribute is examined as a whole 458 to see if there are any differences between OLD.REC (the record as it existed when first read by the calling program 214) and HDR.REC (the record as it exists after the operator made any changes). If the are no differences 458 then no further checking is needed for this Attribute and the next Attribute may be examined 456. If there are differences, then additional checking is required at a Value level. The program will determine whether this Attribute is broken down into Values by counting the number of Value Marks (ASCII 253) that separate the Values 460. If none are found, the program will treat this Attribute as having one Value. This value count is then used by another "FOR-NEXT" loop to examine each Value within the Attribute 462-468. Each Value is examined individually. The Value in OLD.REC is compared to the Value in HDR.REC and if they are the same 470, then no additional checking must be performed on this Value and the next Value may checked 472.

Figure 4E:
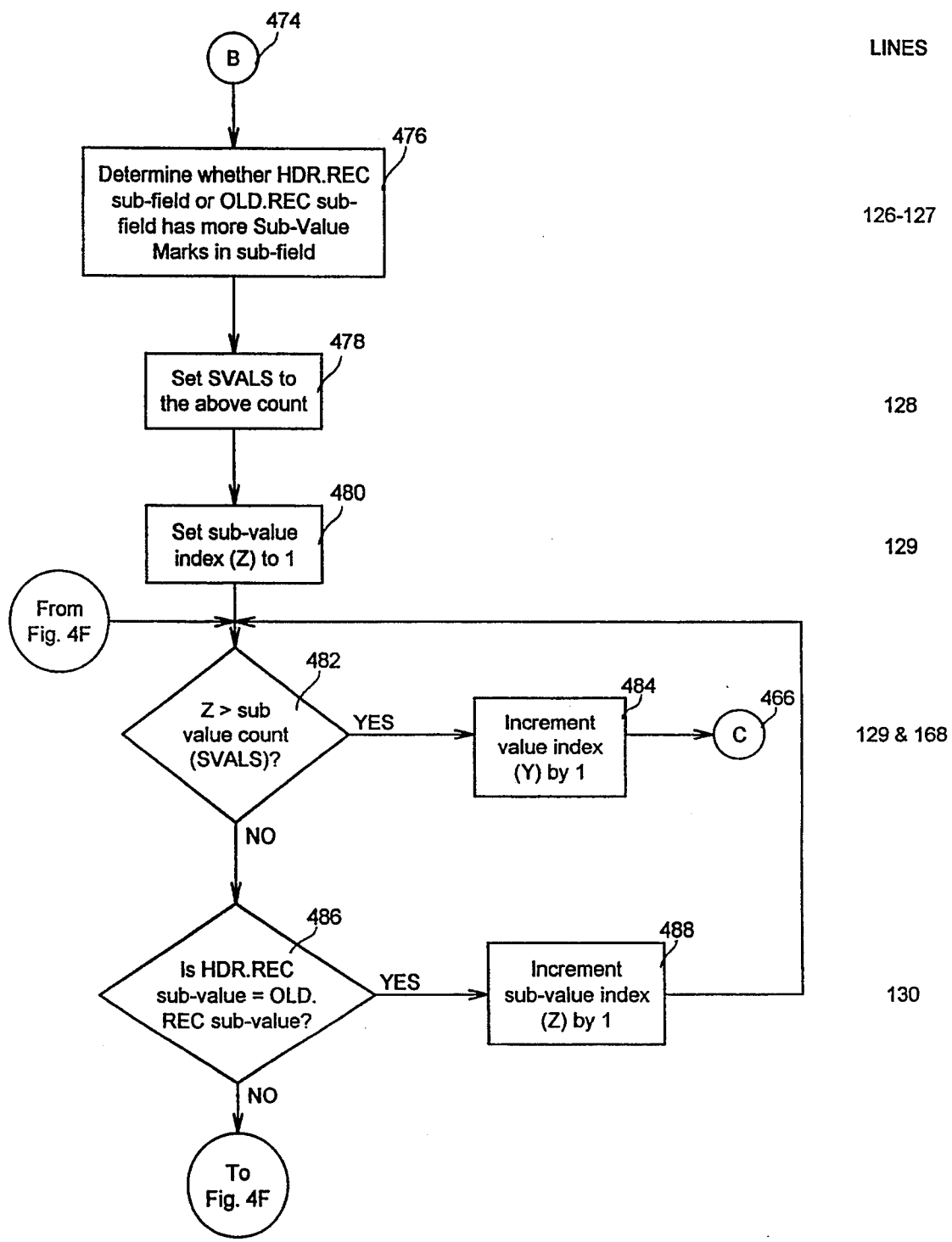
Figure 4F:
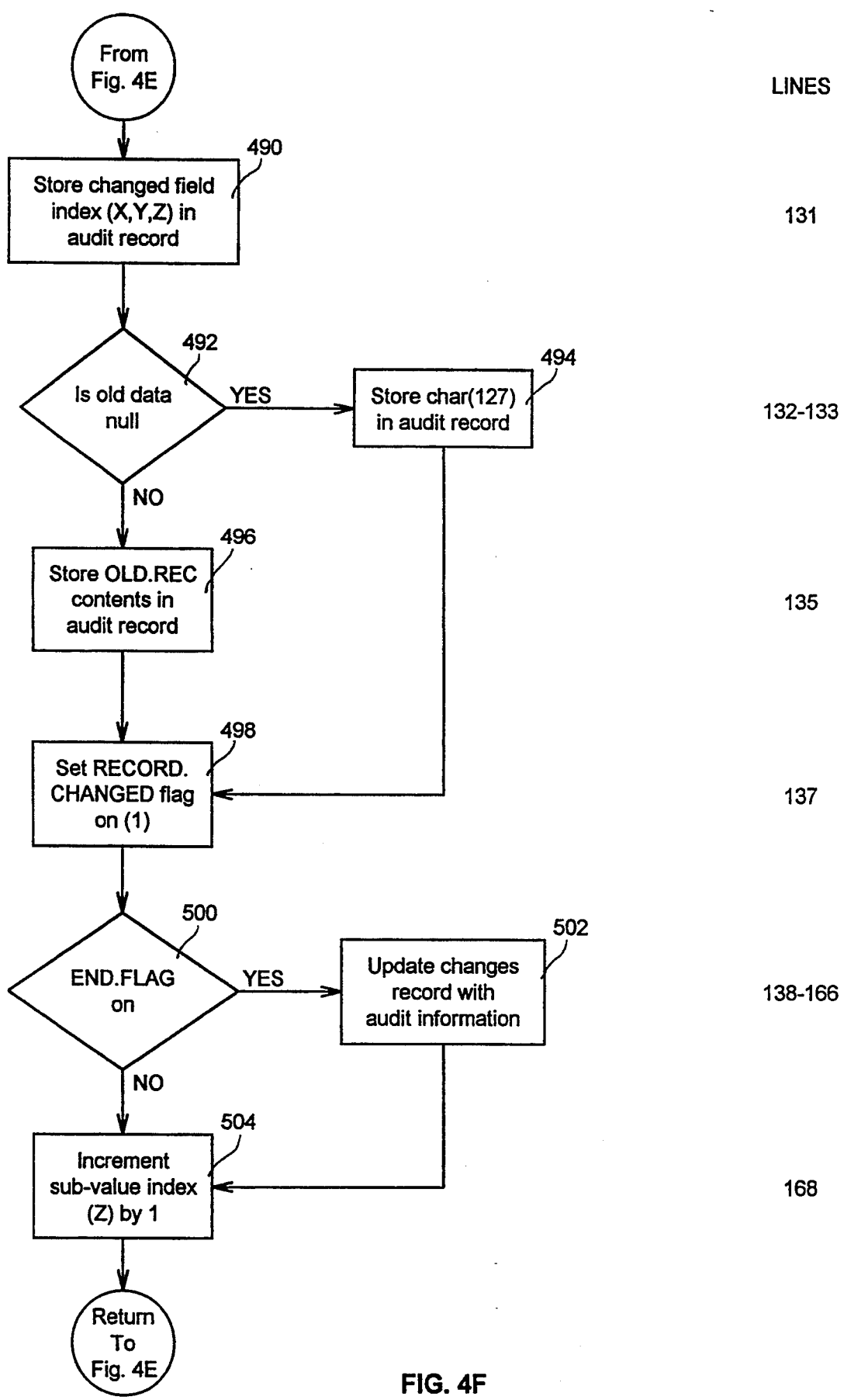

Refer to FIGS. 4E and 4F.

If there are differences, then additional checking is required at a Sub-Value level. The program will determine whether this Value is broken down into Sub-Values by counting the number of Sub-Value Marks (ASCII 252) that separate the Sub-Values 476. If none are found, the program will treat this Value as having one Sub-Value. This value count is then used by the third and last "FOR-NEXT" loop to examine each Sub-Value within the Value 478-482. Each Sub-Value is examined individually. The Sub-Value in OLD.REC is compared to the Sub-Value in HDR.REC and if they are the same 486, then the next Sub-Value is examined. If they are different, then the location of the changed data (Attribute Mark Count (AMC), Value Mark Count (VMC), and Sub-Value Mark Count (SVMC) is stored in the next available Attribute in the Audit History record 490. If the data field in OLD.REC is Null (empty), then an ASCII 127 is stored in the Audit History record. Otherwise the actual contents of the field in OLD.REC is stored in the Audit History record 496. In either event, the RECORD.CHANGED flag is set on 498 and the program continues on to check the remaining Attributes, Values, and Sub-Values for additional changes. Once again, if the END.FLAG is "no" 500, the Changes file is updated with a history information. Once all of the Attributes have been examined, the program will continue with step 540 (See FIG. 4I).

Figure 4G:
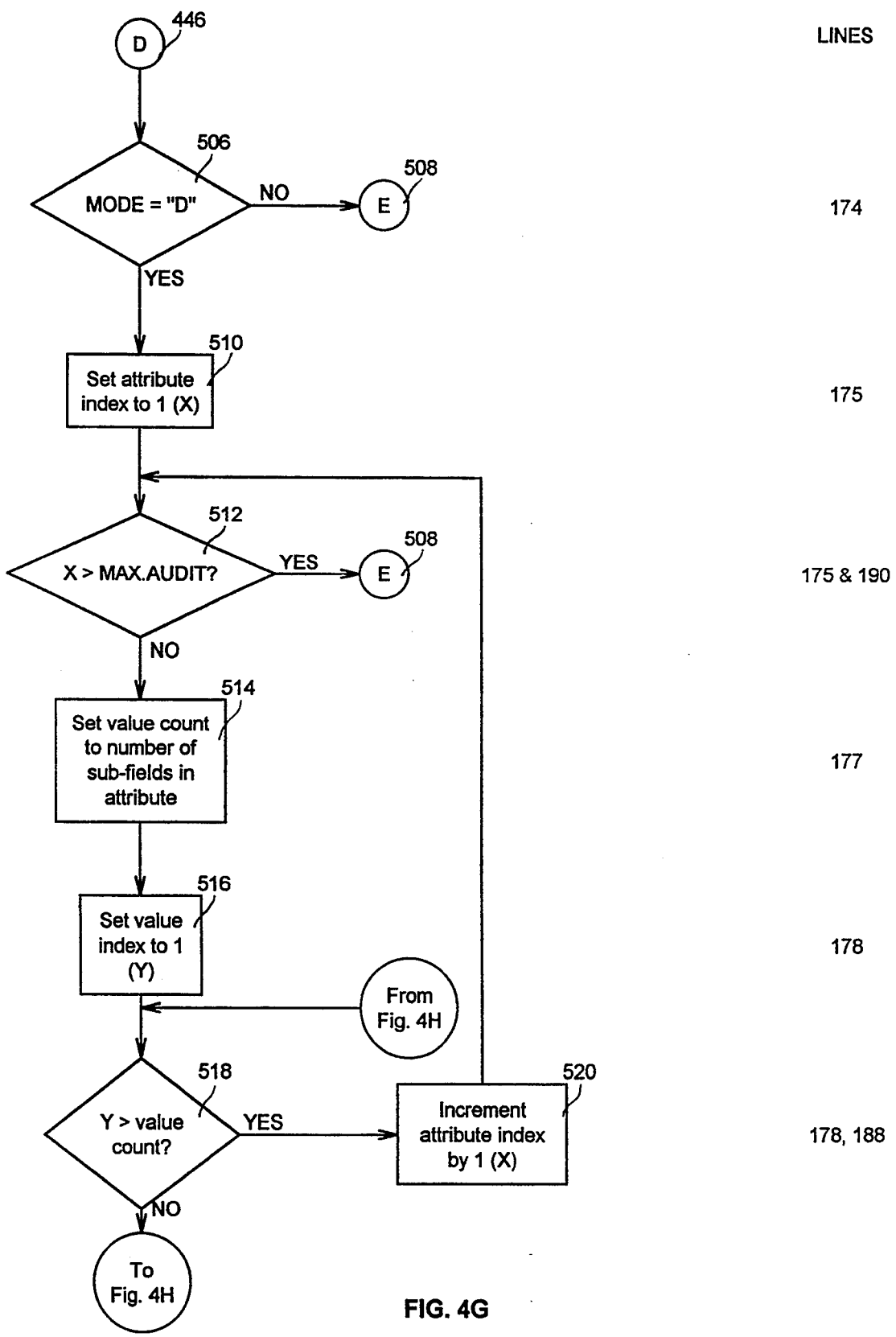
Figure 4H:
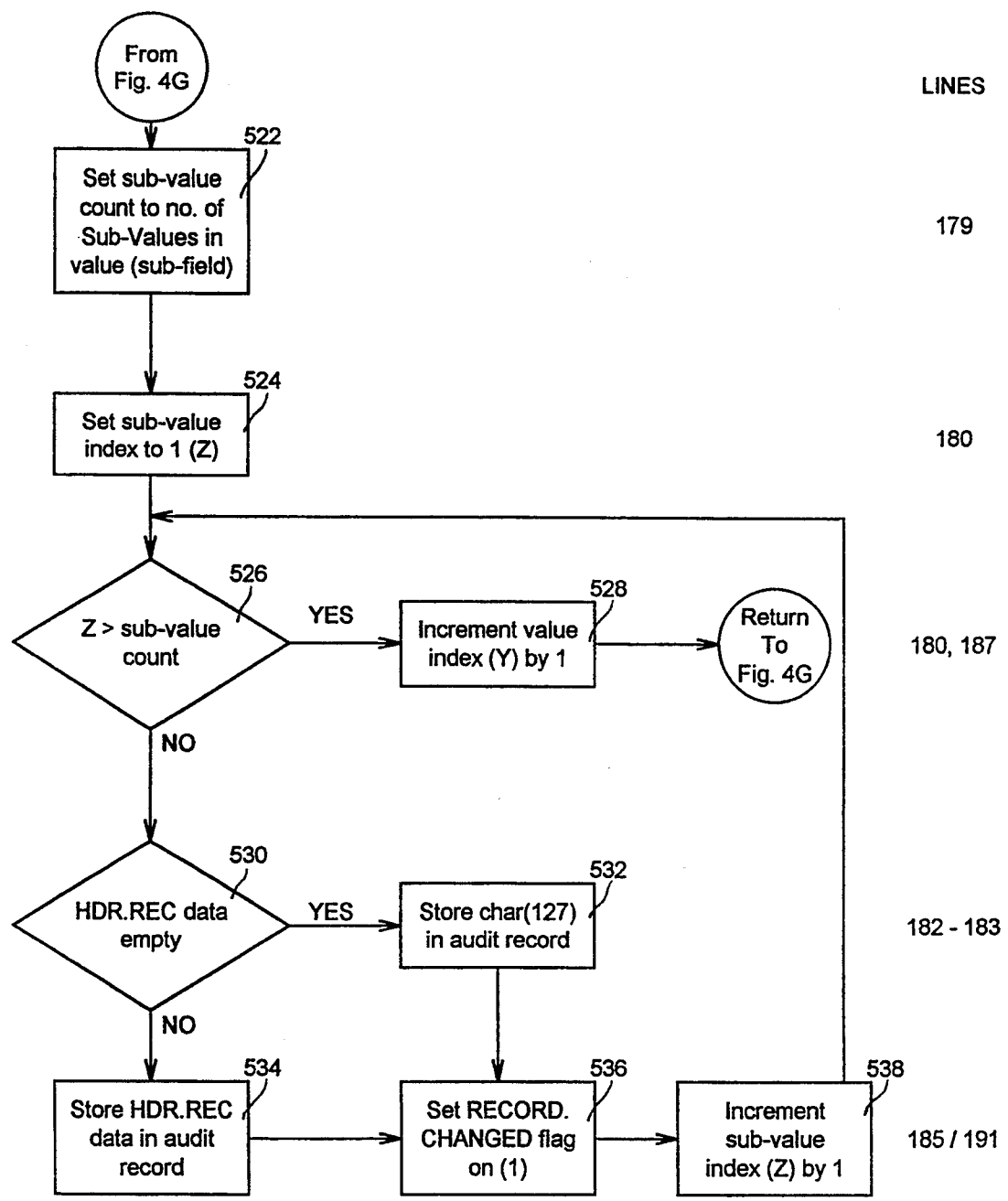
Figure 4I:
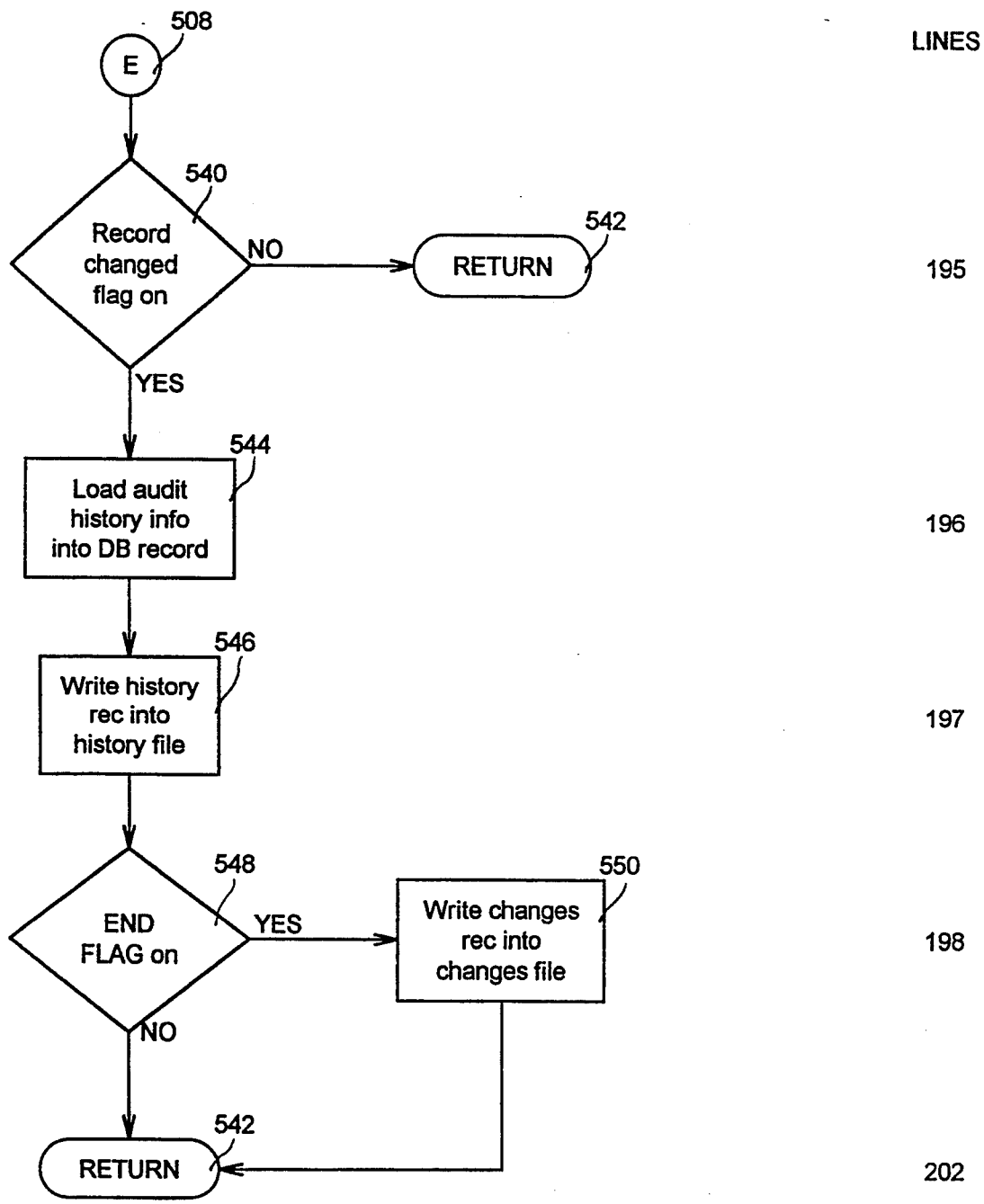

Refer to FIGS. 4G and 4H.

If the calling program MODE is (D)elete 506, then each Attribute, Value, and Sub-Value is examined and a complete Audit History record is built of all of the contents found 506-538. The examination method is very similar to the examination as described above and so need not be described in detail.

Refer to FIG. 4.5.

If, after all of the aforesaid checking, no changes have been uncovered 540, the program will return to the calling program with no further processing 542. If changes have been found, then the Audit History Data String (created in step 418-422) is stored in the audit history attribute in the DB record 544 and the Audit History record is written to the History file 546. If the END.FLAG is on 548, then the Changes file record is also written out to the Changes file 550.

Update processing is now complete, and the program returns to the calling program 542.

Figure 5A:
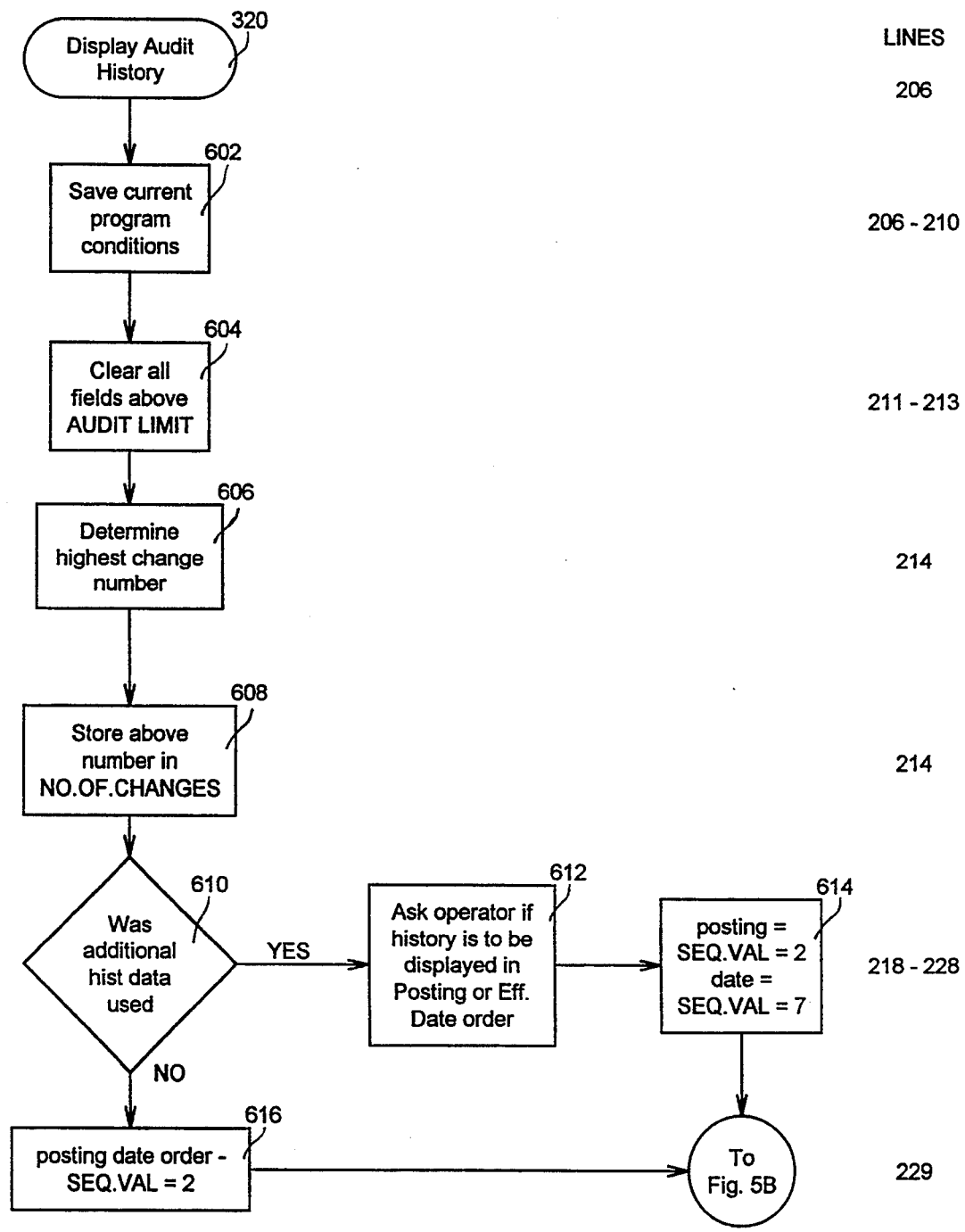
FIGS. 5A to 5K are a logic diagram of the display portion of the audit history program.
Figure 5B:
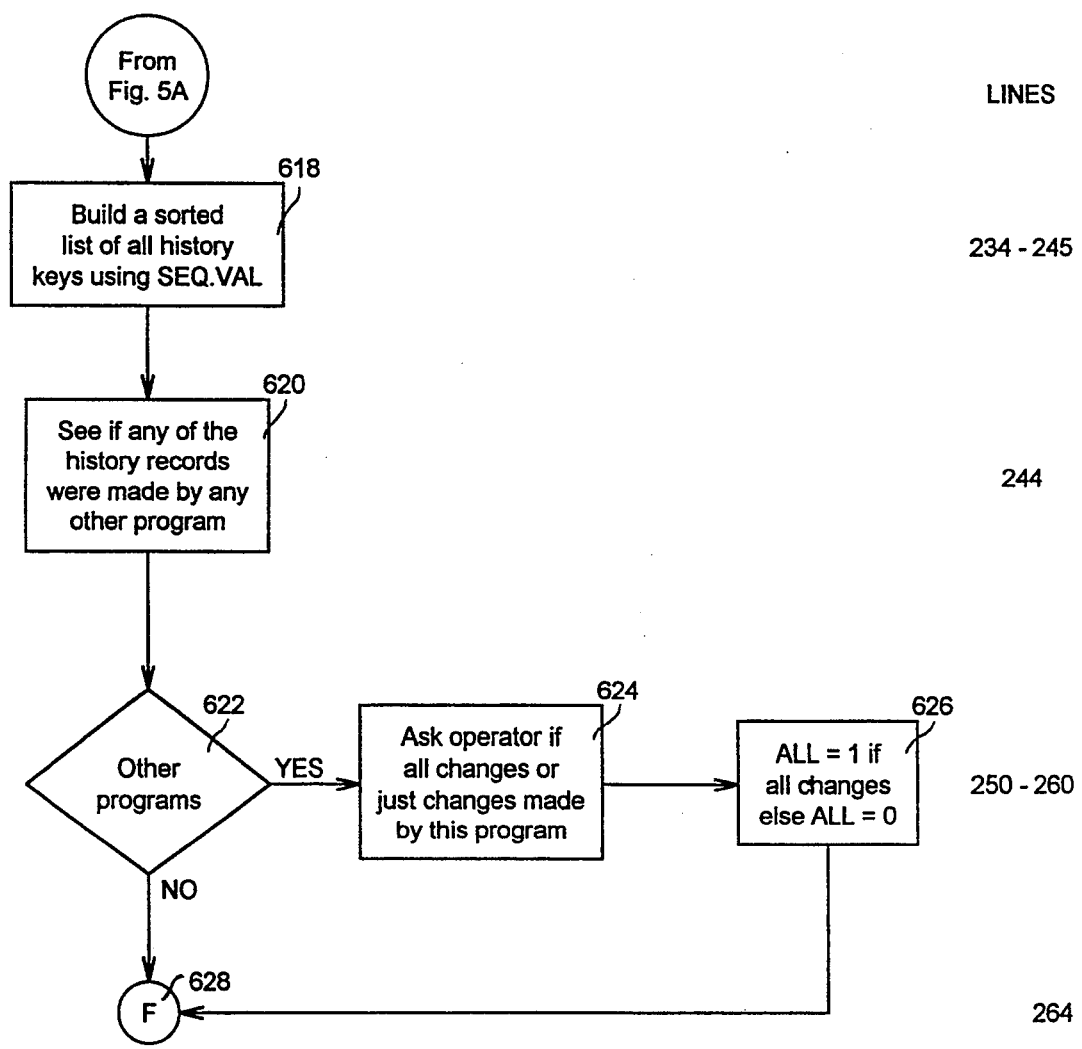

STD.HISTORY.SUB DISPLAY LOGIC NARRATIVE (FIGS. 5A and 5B)

Figure 5C:
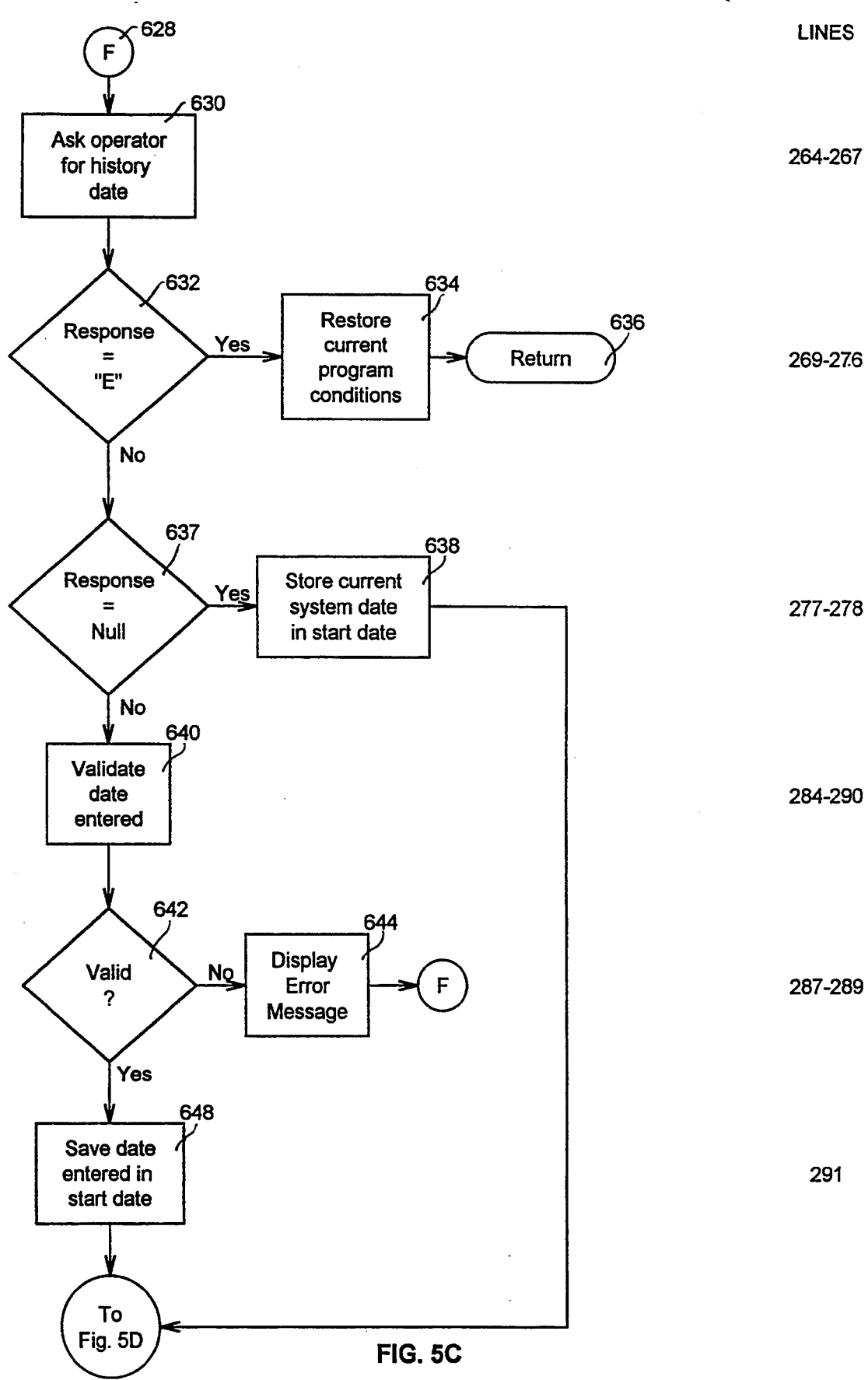
Figure 5D:
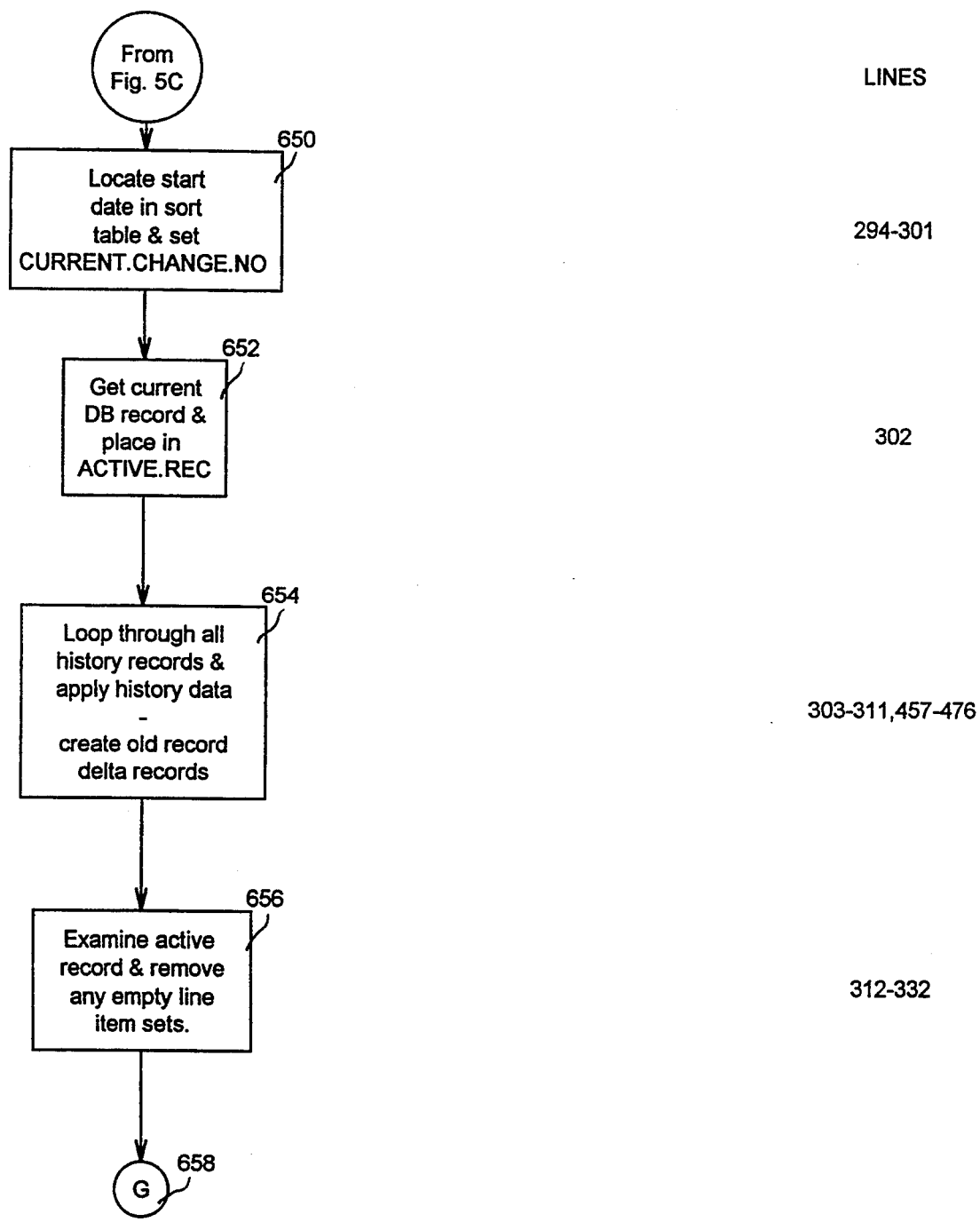

The first step is to save the current program conditions 602, clear all DB record Attributes above the audit limit 604, and determine the last (also the highest) Change Number for this DB record 606. This number is saved in NO.OF.CHANGES 608. If there is Additional History Information stored in the audit history data string 610, the program will request the operator as to the order that the history is to be displayed: in Posting order, or sorted by the Additional History Data supplied 612. If the operator selects posting order, then the sorted key table (built in step 618) will be sorted by Posting Date & Change Number. If the operator selects the alternate order, then the sorted key table will be sorted by the Additional History Data (e.g. the Effective Date of the change). The sorted key table is built 618, and while it is being built, a flag will be set if any other programs other than the calling program have history records 620. If there are history records built by other programs 622, then the operator is asked to indicate if all changes (regardless of which program created then) are to be displayed, or only the changes made by this program Refer to FIGS. 5C and 5D.

Next, the operator is requested to enter the date for which the first history image is to be displayed 630. If the response is (E)xit 632, then the program restores the current program conditions 634 and returns to the calling program 636. If the response is Null (Return key only is pressed) 637, then the program will store today's date (the system date as maintained by the computer) 638 as the starting date. If a date is entered, it is validated for accuracy 640 and saved as the start date 648. The correct entry in the sorted key table is located using the start date as determined above 650.

At this point, the current active DB record is read from disk and saved in ACTIVE.REC 652. Since the Audit History records store the old contents of any changed field, new temporary history records need to be created which contain the new changed data 654. These delta records are identical in format to the Audit History records except that the data saved is the NEW contents instead of the OLD contents. As these delta records are being built, the program is regressing the ACTIVE.REC to its original state by re-applying all of the old data contents saved in the history records to the ACTIVE.REC. Once all history records have been applied, ACTIVE.REC now looks exactly as it did the day it was added to the DB file. The original ACTIVE.REC is examined and all empty Line Item Set values are removed. These can cause a false display when changes are contained in a Line Item Set 656.

Figure 5E:
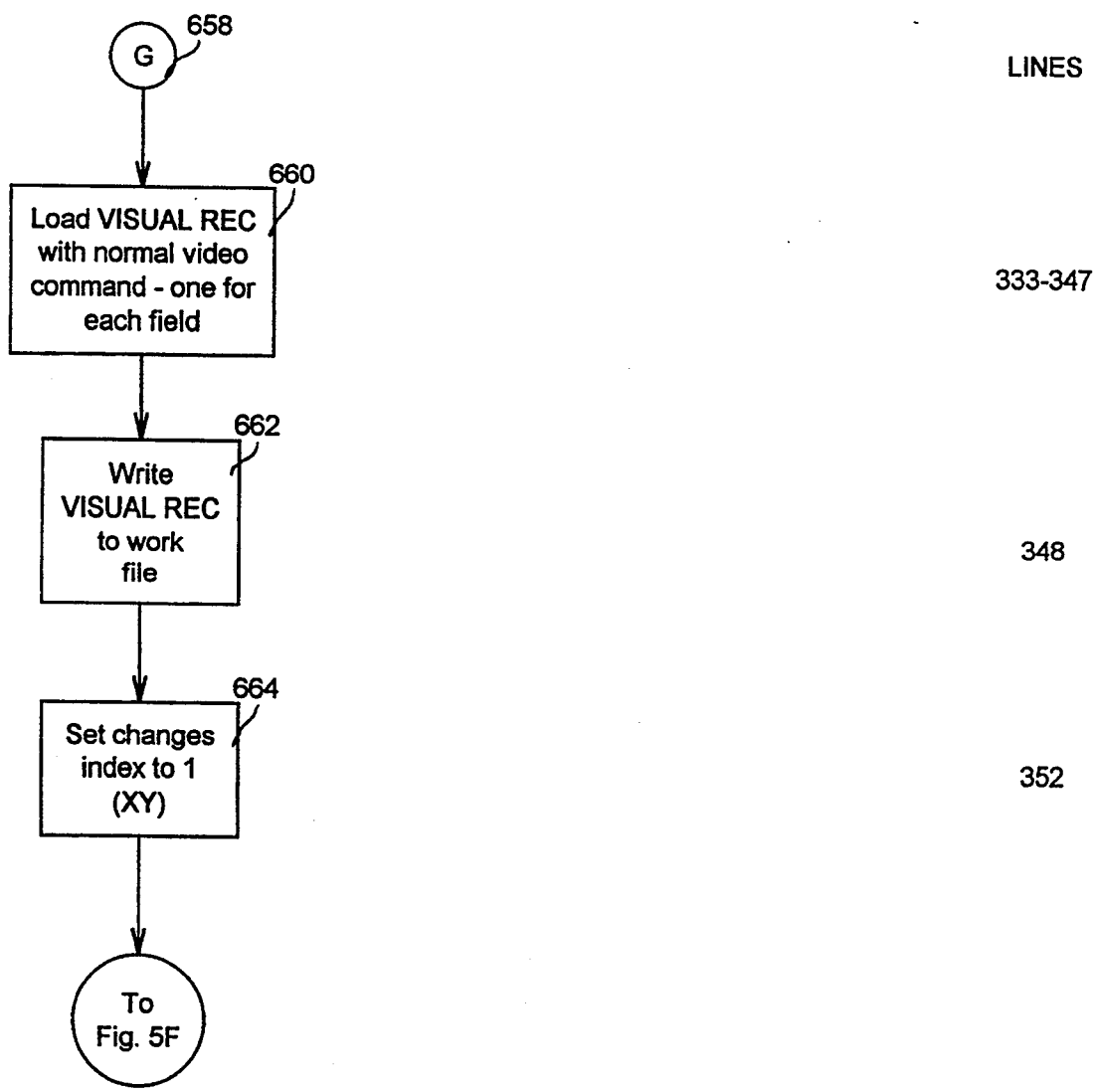
Figure 5F:
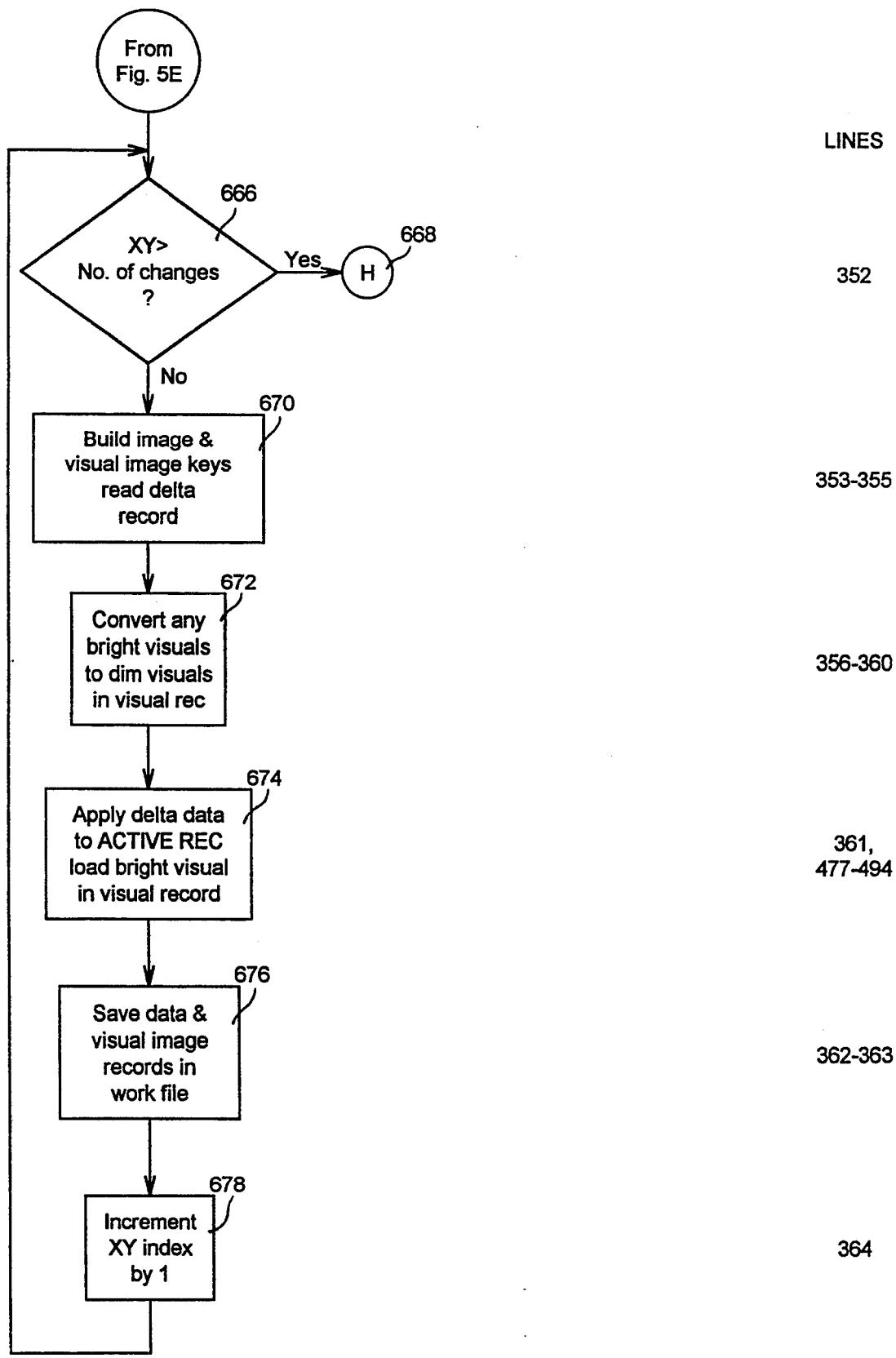

Refer to FIGS. 5E and 5F.

The audit history display uses two visual attributes to display the historical images. All changes made to the record are shown in reverse video with the specific change shown in bright reverse video. For example, if the only field changed during one session was the name of a client, then when that specific change is displayed, all of the fields that have changed since the record was created will be shown in reverse video and the client's name will be shown in bright reverse video. See FIG. 6 to FIG. 12, wherein reverse video is represented by one form of shading (darker shade) and bright reverse is represented by another form of shading (lighter shade).

In order to display these two different visual attributes, whenever a historical image record is made using the audit history records, a corresponding visual record is also built to display it properly. The system starts the process by building a visual record using normal video display attributes 660. That visual record is written to a work file 662 as the basic model from which all future visual records will be built. This is the original visual record that will be displayed along with the original ACTIVE.REC built in step 654. To build each historical image, the delta records are processed one at a time and the NEW data is applied to the older record 670-672 and the Visual record is updated in the same corresponding fields 674. This pair (ACTIVE.REC containing the data and VISUAL.REC containing the visual display attributes) is saved in the work file 676. Once completed, there will be two records in the work file for each image of the record. If there had been thirty-two changes to a particular record, there would be thirty-two data image records and thirty-two visual image records at this point.

Figure 5G:
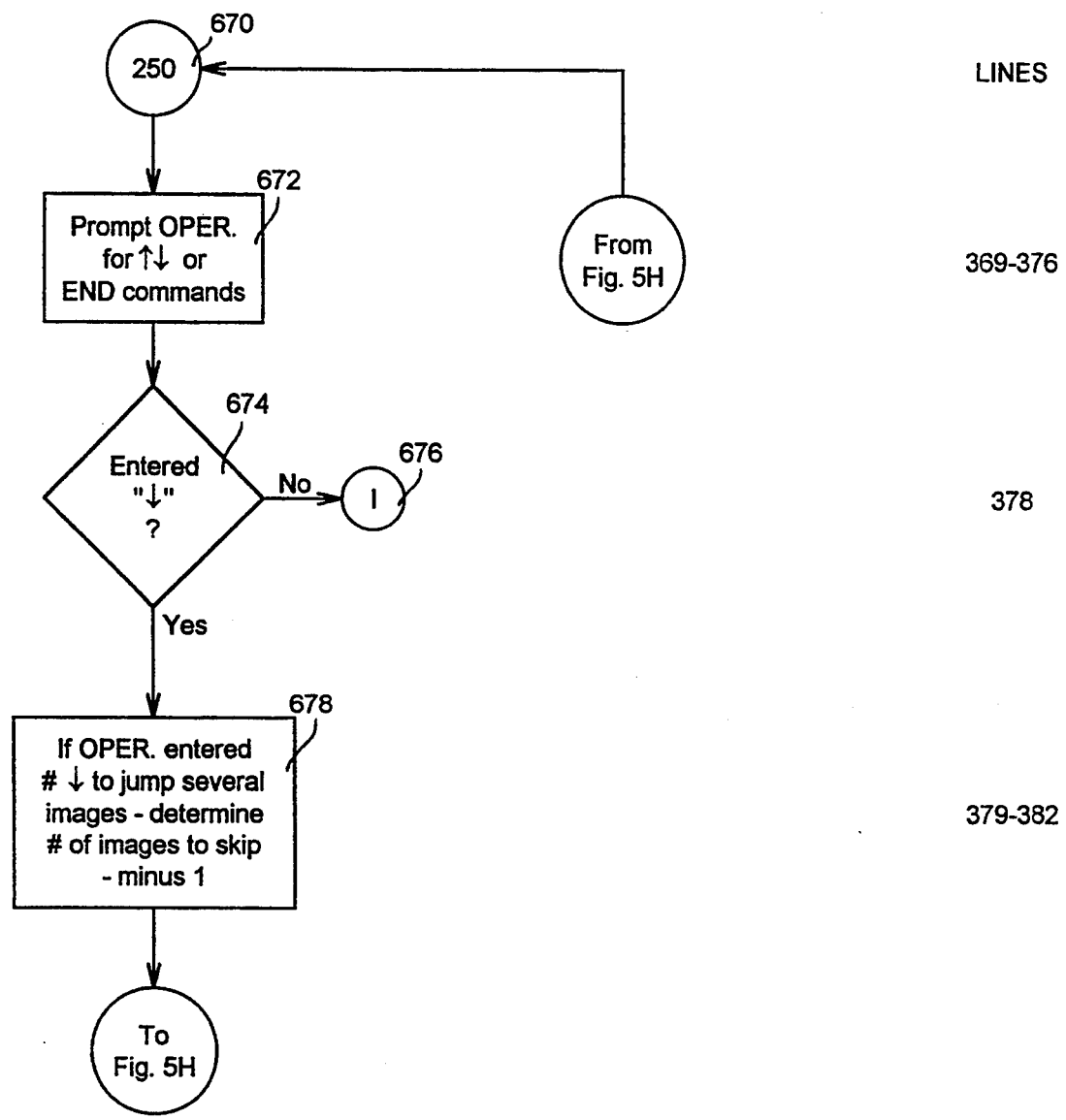
Figure 5H:
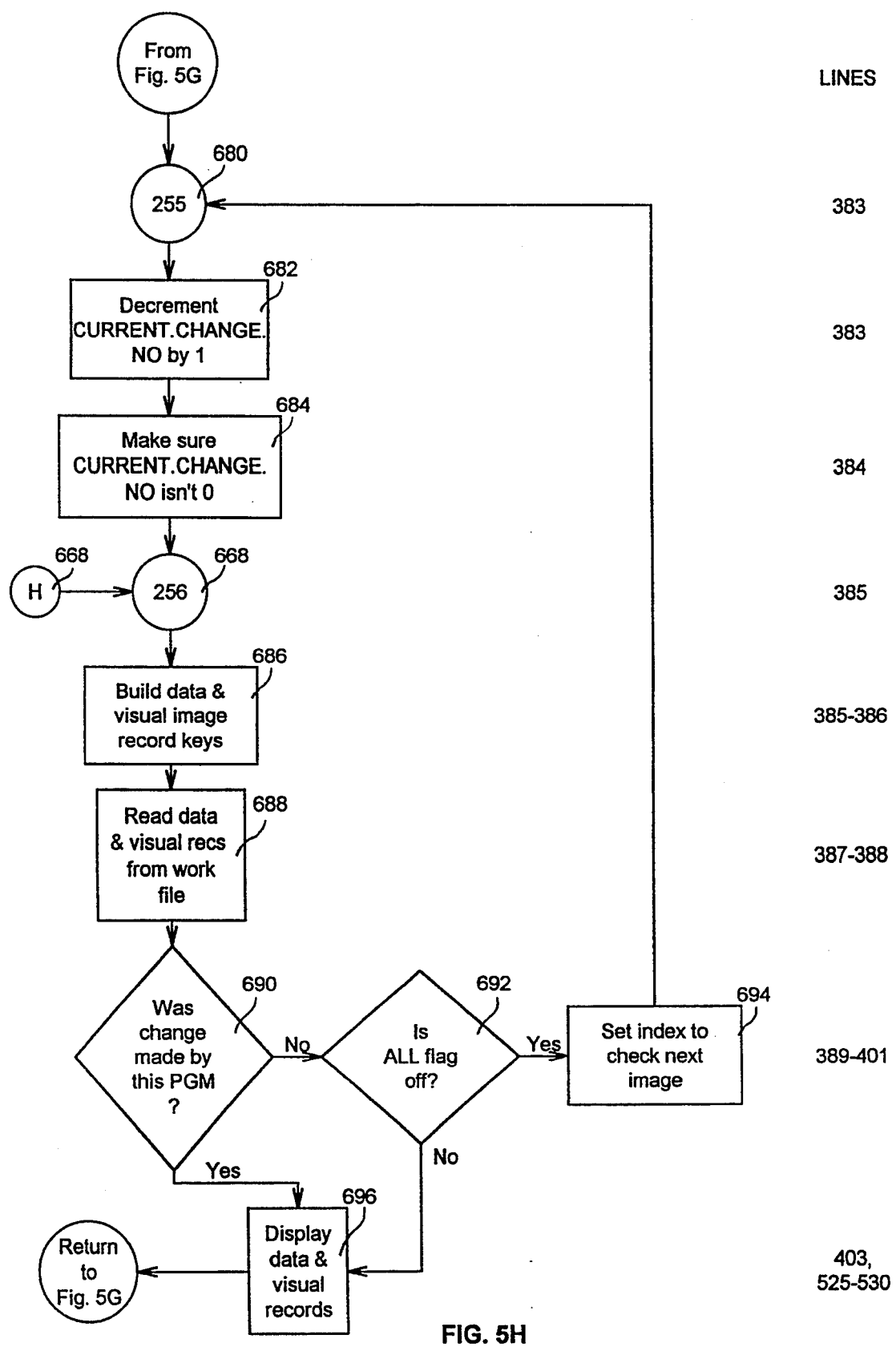

Refer to FIGS. 5G and 5H.

Using the starting date entered by the operator in step 630, the correct image is selected from the sorted key table and the calling program's audit history display routine is called to display the data image and its associated visual image 696. If the operator has requested that only changes created by this calling program be displayed, and the image about to be displayed was created by another program 690, then the next sequential image created by this program will be found and displayed 694.

Each calling program that is going to display audit history requires a specific display routine that will display the historical data image and its associated visual image. Preferably when the principles of such a display routine are built into a CASE (Computer Aided Software Engineering) program generator, so that the correct display routines for each calling program are generated automatically.

Once the historical slice has been displayed, the operator is prompted for the next display command 672. If the operator enters a (down arrow) 674 either as a single character or in the format of #(down arrow), the program will regress the images back in time 678-696. In the aforesaid entry, if the operator enters 5(down arrow), then the program will regress back five (5) images. If no number is entered, then the regression will take place one image at a time.

Figure 5I:
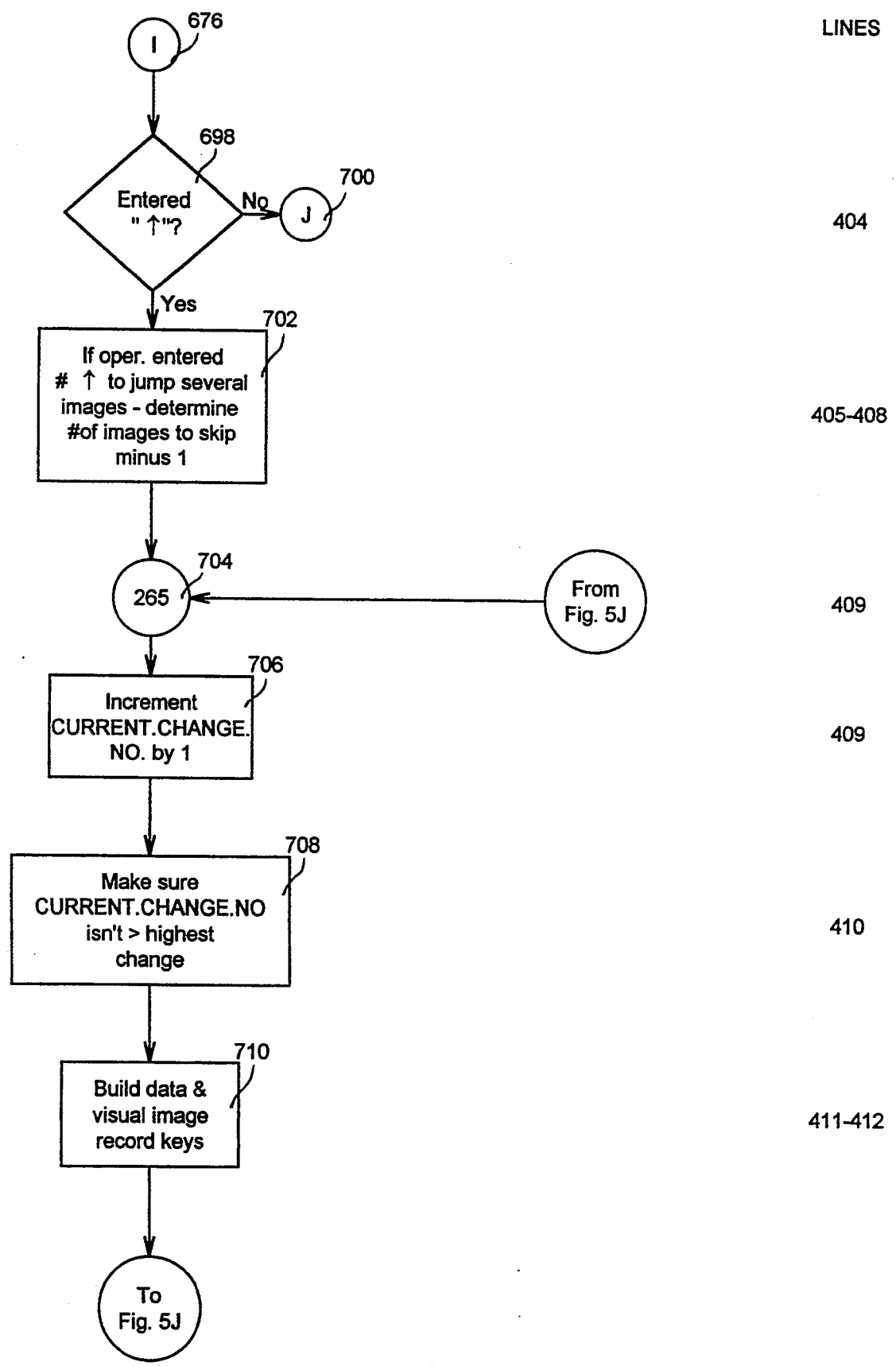
Figure 5J:
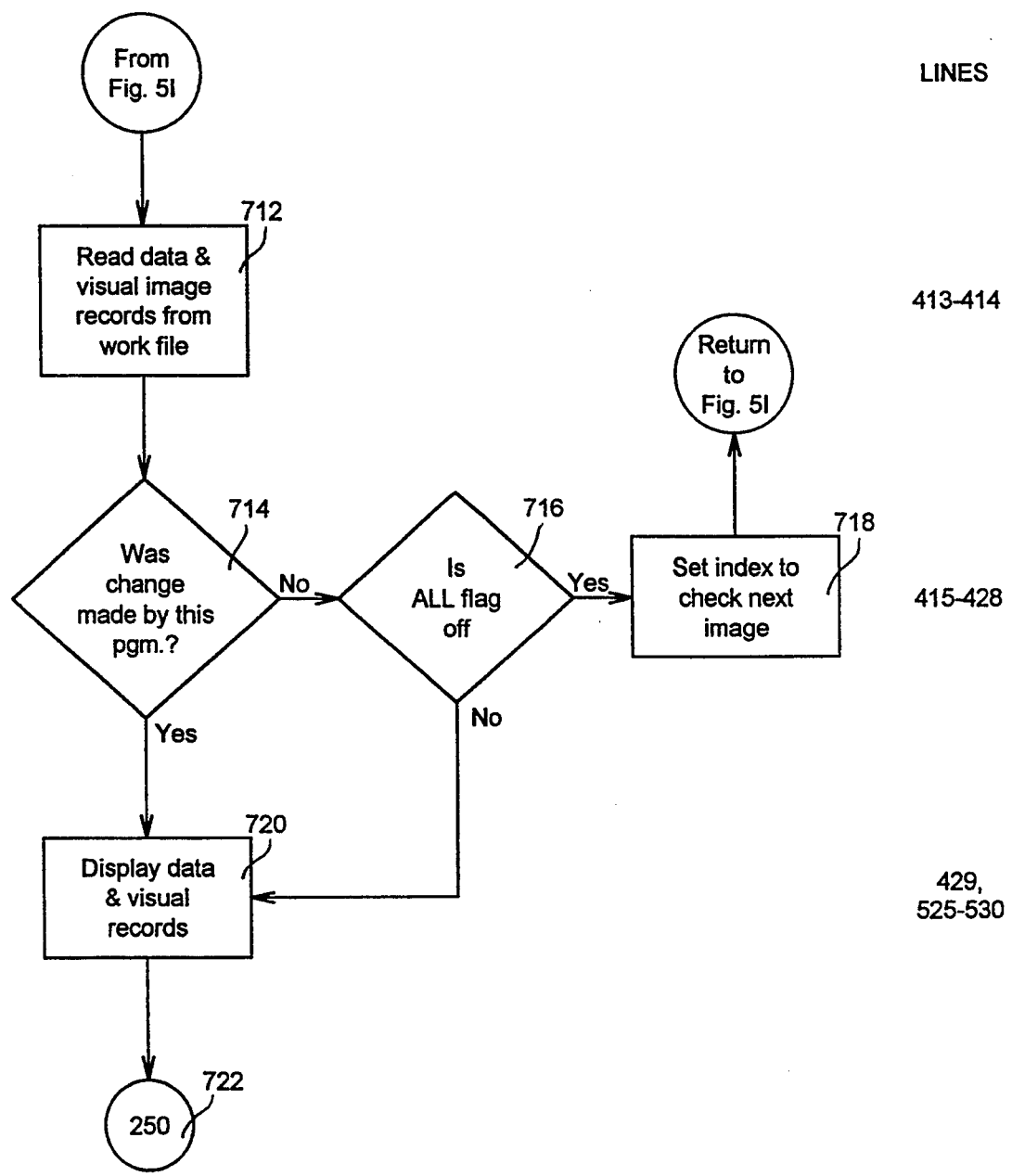

Refer to FIGS. 5I and 5J.

If the operator enters an (up arrow) 698 either as a single character or in the format of #(up arrow), the program will progress the images forward in time 702-722.

Figure 5K:
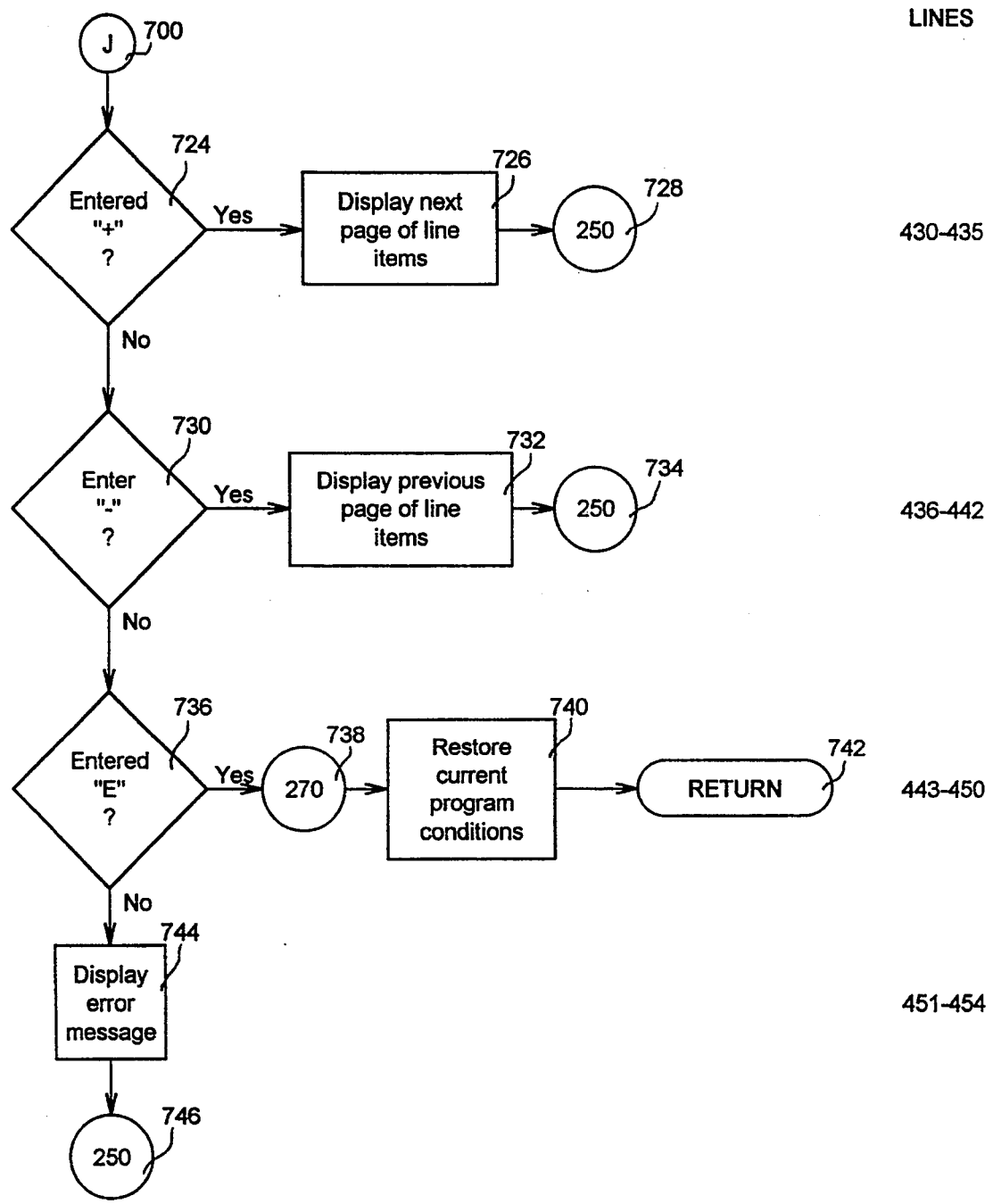

Refer to FIGS. 5K.

If the DB record contains Line Item Sets, then the operator may display other pages of items by entering either a (+) command 724-728 to see the next page or a (−) command 730-734 to see the previous page. In any case, if the operator enters (E)xit, the program will restore the current calling program's conditions and return 742.

AN EXAMPLE OF AUDIT HISTORY DISPLAY

The example screens that follow will demonstrate the various display images as outlined above.

FIG. 6. Screen 1/22/90 - 17:09:14: This is the initial screen as it would appear after the operator has entered the key to the DB record 204 and the calling program (CP.100 Version 7.1) has displayed the record 214. The last change made is displayed in the upper right hand corner of the screen (Last Changed by DMM on 1/20/90 at 10:50:33). The operator selects the review function by entering "R" at the screen acceptance prompt 217 & 230. The calling program calls STD.HISTORY.SUB which has prompted the operator for the starting information (612, 624, and 630) and the operator has selected to see the historical image of the record on 1/1/89 and to see only those changes made by this program.

FIG. 7. Screen 1/22/90 - 17:20:19: This is the historical image of how the record looked on 1/1/89. The last change was made by CFH on 12/7/88 at 16:10:16 and the field changed was Address #2. This is change 32 of 49. Note that the following fields have been changed since the record was created:

| | |
|---|---|
| BillTo | WHEATLEY |
| Client Name | David M. Murdock ZZ9Z |
| Address #1 | 625 Duke Road |
| Statuses | NBB |
| Categories | CAL |
| Contact Line Item Set #2 | (Empty fields) |
| Contact Line Item Set #3 | (Empty fields) |

The above fields are displayed in reverse video.

The following fields are displayed in bright reverse video:

| | |
|---|---|
| Last Changed By | CFH |
| Last Changed Date | 12/07/88 |
| Last Changed Time | 16:10:16 |
| Address #2 | 1nd. Floor |

The operator enters (down arrow) to see the next older record image (change 32 of 49) 672.

FIG. 8. Screen 1/22/90 - 17:22:48: This screen shows the old Address #2 field contents (2nd. Floor). Address #2 field is also displayed in bright reverse video which indicates that change 31 was applied to this field as well.

The operator enters 99(down arrow) to see the original record image 672.

FIG. 9. Screen 1/22/90 - 17:23:06: This screen shows the record as it was added (Change 1 of 49) to the database file by DMM on 9/24/87 at 15:13:48. None of the fields are shown in reverse video since no fields have been changed yet.

The operator enters 99(up arrow) to see the current record image 672.

FIG. 10. Screen 1/22/90 - 17:23:26: This screen shows the current image (Change 49 of 49) but all of the fields that have been changed since it was added are shown in reverse video:

| Field Name | Changed Data |
|---|---|
| Last Changed By | DMM |
| Client Code | MURDOCK |
| BillTo | MURDOCK |
| Client Name | David M. Murdock |
| Address #1 | 625 Duke Road |
| Address #2 | Suite 202 |
| Categories | CAL |
| Statuses | NBB |
| Producer | DMM |
| Servicer | DMM |
| Contact Type (Line 1) | 1 |
| Contact/Alternate Name (Line 2) | Mrs. Eileen A. Murdock |
| Contact Salutation (Line 2) | Eileen |
| Contact Type (Line 2) | SP1 |
| Contact/Alternate Name (Line 3) | Mr. Sean E. Murdock |
| Contact Salutation (Line 3) | Sean |
| Contact Type (Line 3) | 2 |

The fields displayed in bright reverse video to indicate that they were the last fields changed are:

| | |
|---|---|
| Last Changed Time | 10:50:33 |
| Contact/Alternate Name (Line 1) | Mr. David M. Murdock |

The operator enters (down arrow) to see change number forty-eight (48) 672.

FIG. 11. Screen 1/22/90 - 17:23:45: This screen (change 48 of 49) indicates that one field was changed.

Contact/Alternate Name (Line 1) END David M. Murdock

The operator enters (down arrow) to see change number forty-seven (47) 672.

FIG. 12. Screen 1/22/90 - 17:24:05: This screen (change 47 of 49) indicates that three fields were changed.

| | |
|---|---|
| Client Name | David M. Murdock |
| Address #1 | 625 Duke Road |
| Address #2 | Suite 202 |

The operator enters "E" to exit history review 672. The original active record is re-displayed and the operator is prompted for (F)ile or (Q)uit

OPERATING ENVIRONMENT

The operating environment necessary to support this feature of the invention is any operating system (OS) that will support variable length database records containing variable length data fields. The preferred embodiment of the invention, as described herein, has been implemented under the Pick Operating System, which supports such a file structure. For further reference to this operating system, refer to publications of the Spectrum Manufacturers Association, San Diego, Calif., as well as to Pick Systems, Inc. and other implementers of the PICK operating system.

DESCRIPTION OF TERMINALS

The terminals appropriate for use in the system of the present invention would need to support at least three visual attributes, for example:

| | |
|---|---|
| Protected Background | Display static background text |
| Reverse Video | Display net record changes |
| Bright Reverse Video | Display last change |

Currently, the following computer terminals have been used successfully to display audit history in systems embodying the present invention:

Wyse 30; Wyse 50; Wyse 50+; Wyse 60; and IBM 3151 (with Wyse 60 personality card)

If bright reverse video is unavailable on a proposed terminal, but the machine is able to implement flashing reverse video instead, such a terminal could be used alternatively.

Interrupt Feature

FILES REQUIRED:

The only file required for this feature of the invention is the TERMINAL file. There is a record in that file for each port (terminal) in the system. There are two fields that are used in each Terminal File record:

Attribute 14: This field is used to hold all communications between levels. The field is broken down into Values as follows:

| Value | Description |
|---|---|
| 1 | Program Name - The Calling Program. |
| 2 | DEBUG.FLAG - (0 = Off; 1 = On) Used by developers to halt the programs at certain milestones. |
| 3 | THIS.RETURNING.KEY - If the level is interrupted while there is an active record in a program, this variable will contain the key of that active record. If no record is active, then this variable will contain the last DB record key filed. |
| 4 | CURRENT.CLIENT - If a program was running in the level being interrupted that relates to a client, then this variable will contain the key to the CLIENTS file record for that client. |
| 5 | CURRENT.POLICY - If a program was running in the level being interrupted that relates to a policy, then this variable will contain the key to the POLICIES file record for that policy. |
| 6 | CURRENT.LOSS - If a program was running in the level being interrupted that relates to a loss, then this variable will contain the key to the LOSSES file record for that loss. |
| 7 | CURRENT.EFF.DATE - If a program was running in the level being interrupted that relates to a policy, then this variable will contain the Effective Date of the specific transaction being processed against that policy. |
| 8 | CURRENT.END.NO - If a program was running in the level being interrupted that relates to a policy, then this variable will contain the key to the CHANGES file record that refers to that transaction. |
| 9 | CURRENT.TRAN - If a program was running in the level being interrupted that relates to a policy, then this variable will contain the Transaction Code selected by the operator when the policy was accessed. |
| 10 | NEXT.COM.AREA - Into this variable, the programmer may specify any additional information that may be required by the next higher level. |

Attribute 15: This attribute contains the current level being utilized.

INITIAL CONDITIONS IN CALLING PROGRAM

There are no pre-conditions that are necessary to effect a level interruption. All conditions that existed in the interrupted program will be restored.

CALLING PROGRAM NARRATIVE

Figure 13:
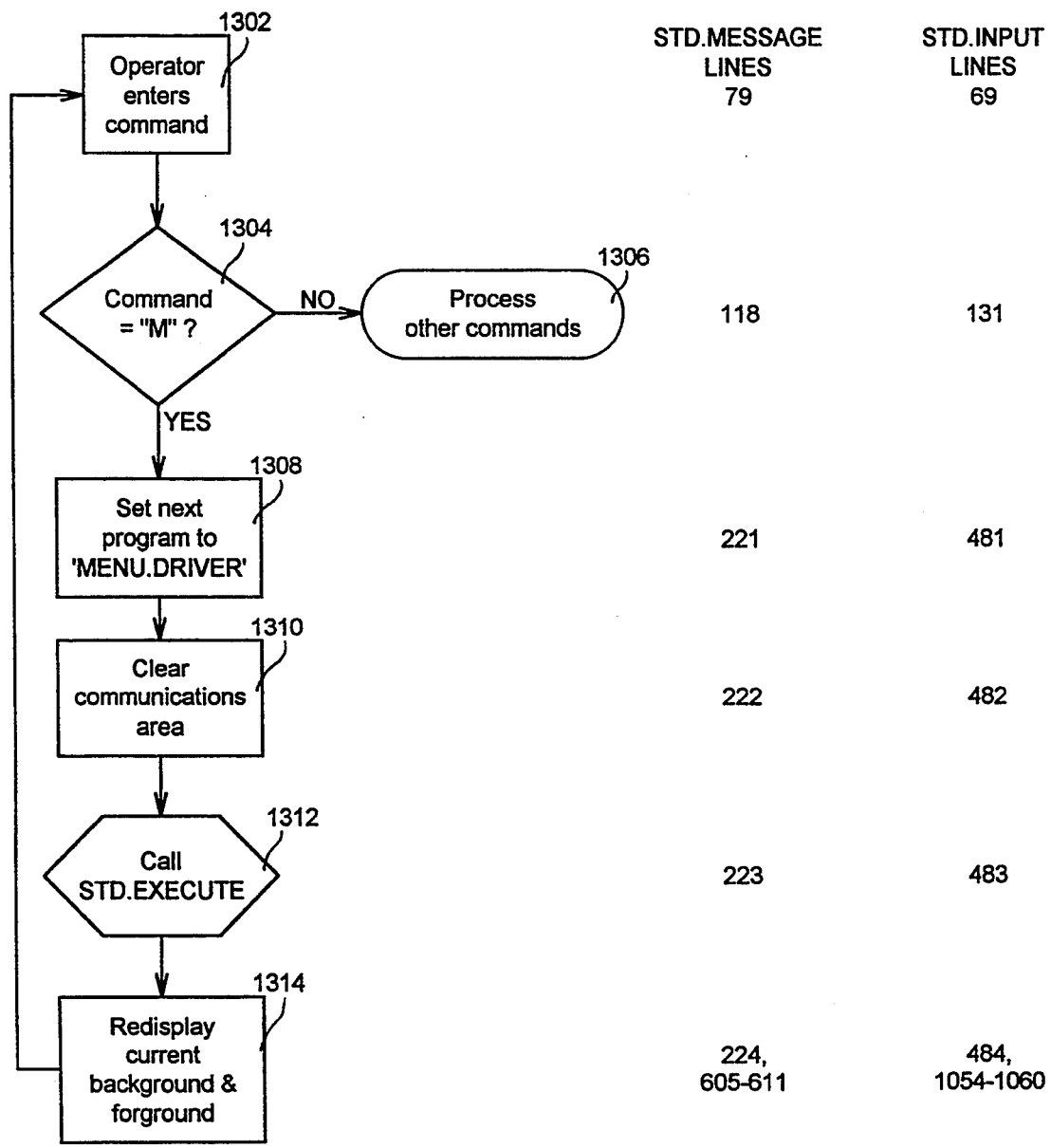
FIG. 13 is a logic flow diagram describing how the calling program initiates a request for a new session.

Refer to FIG. 13:

The calling program. Each calling program utilizes two programs to get all operator input.

| | |
|---|---|
| STD.INPUT | This program is used to get data from the operator that will ultimately become database record information. The data is validated based on parameters set forth in the calling program. For example: If the data being entered is to be stored in the DB record as a date, then this program will insure that a valid date has been entered. If the data being entered is to be stored in the record as a dollar amount, then this program will insure that no letters (A–Z) or any special characters (!@# etc.) have been entered and will format the data with two decimal places. |
| STD.MESSAGE | This program is used to prompt the operator with a question and get a response. The responses are not validated in any way (but all responses are converted to upper case). It is the duty of the calling program to perform any validation necessary. |

Both of these programs are programmed with a command recognition logic. This way the operator may select a function from any field regardless of whether it is a data field input (STD.INPUT) or a question response (STD.MESSAGE). The logic flow diagram, FIG. 13, refers to lines in both programs since the flow is identical.

The operator enters a command 1302. One of the commands being tested for in the input string is the (M)enu command. If found 1304, the program will select the program to be executed at the next level to be "MENU.DRIVER". This is the program that processes all of the menu records and will permit the operator to select any other task to be executed during this interruption. The program clears the NEXT.COM.AREA 1310 since the system does not pass any input to the next level and calls the STD.EXECUTE program 1312 to initiate the next level.

STD.EXECUTE PROGRAM NARRATIVE

Figure 14A:
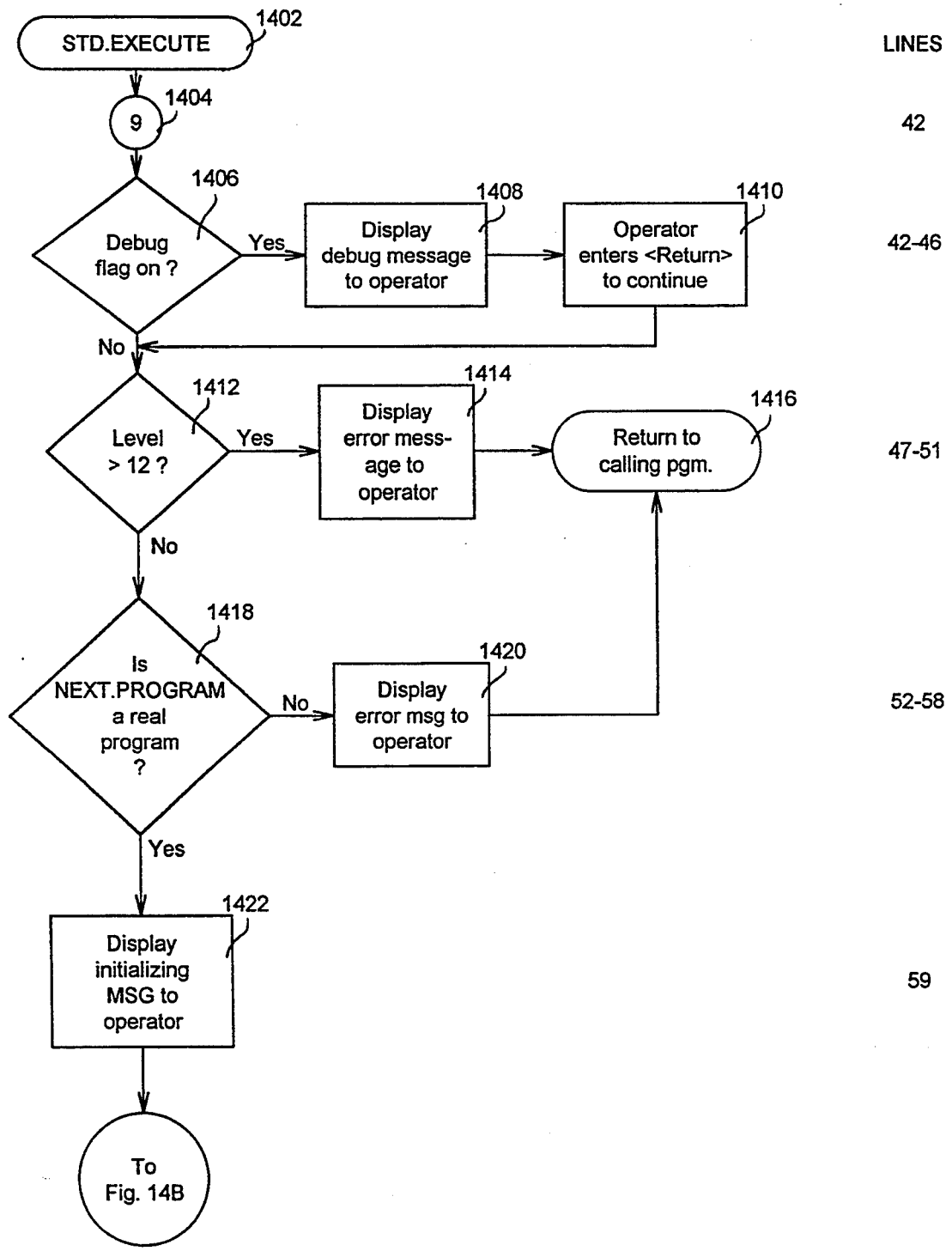
FIGS. 14A to 14C are a logic flow diagram describing how STD.EXECUTE suspends the current task, stores any communications for the next higher level, and initiates the new task.
Figure 14B:
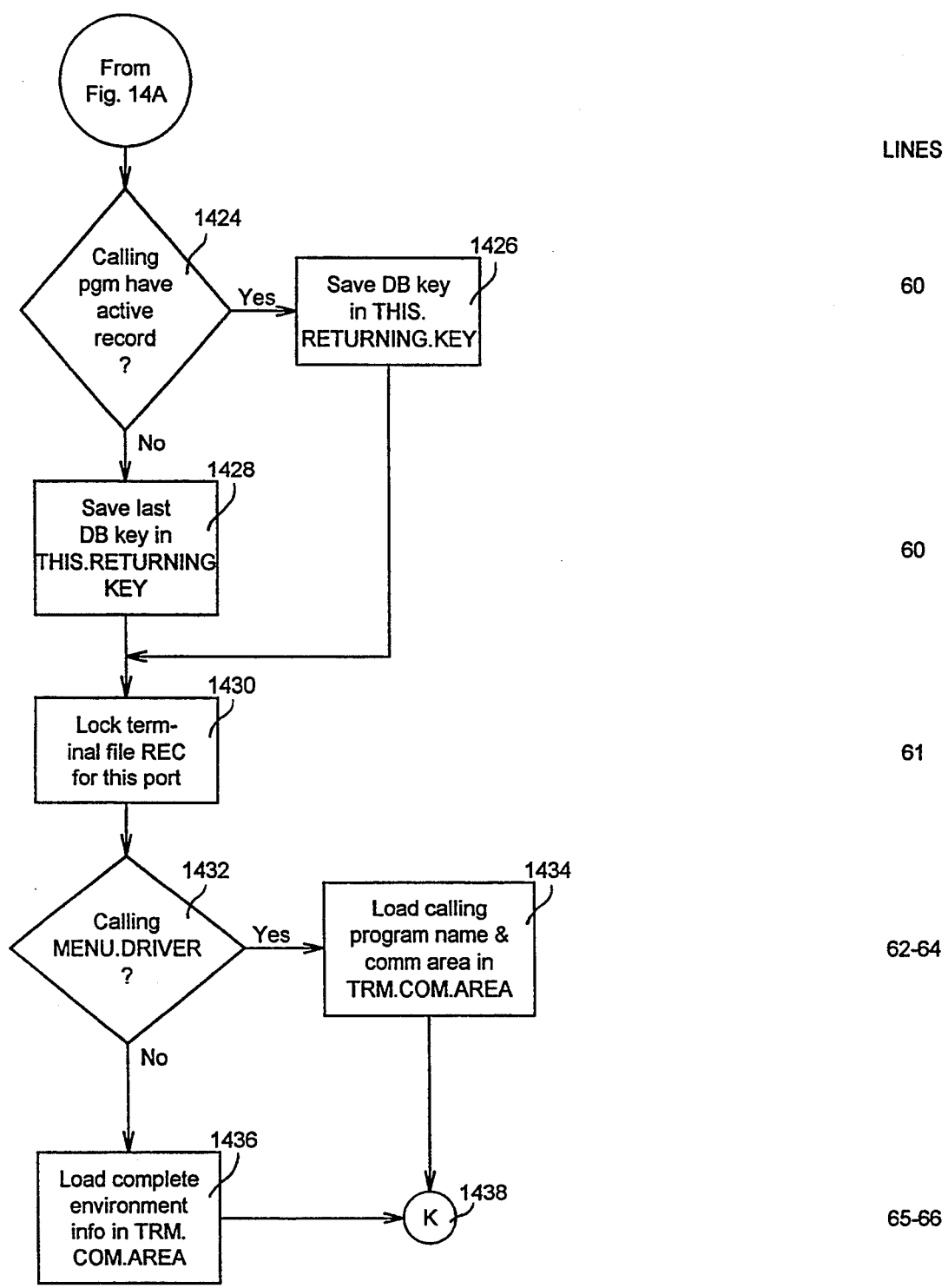
Figure 14C:
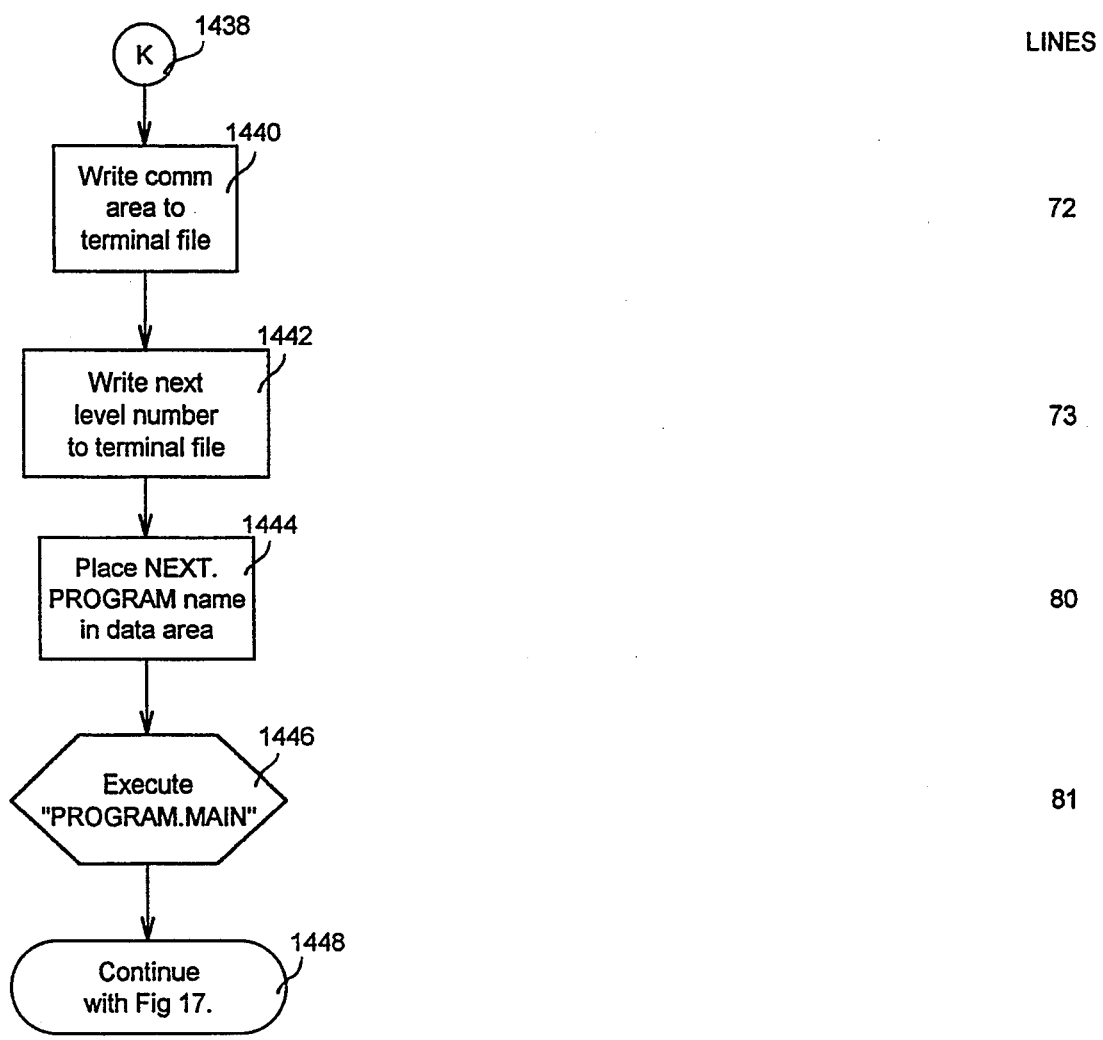

Refer to FIGS. 14A and 14B. STD.EXECUTE (before the EXECUTE)

If the program is under development, the programmer has the opportunity to stop at various places by setting the DEBUG.FLAG on. If it is on 1406, then the program will display a message to the programmer and wait for a response. The first thing to be checked is the current level. If it is greater than twelve (12) 1412, then the program will display an error message 1414 and return to the calling program 1416. The program will check to insure that the program being called is a validly cataloged program 1418. If not, then the program will display an error message 1420 and return to the calling program 1416. Once past these checks, the program displays a message to the operator that the next level is being initiated 1422. The program then checks the MODE variable. If it contains data ("A", "C" etc) 1424, then there was a DB record active when the operator requested the interrupt and the key to that record is saved in THIS.RETURNING.KEY 1426. If MODE is null (empty) then the calling program is between active records and the last DB record key filed is saved in THIS.RETURNING.KEY 1428. Because the system is about to write to the TERMINAL file, the record being updated is locked to prevent simultaneous updates from other users 1430.

There are two basic kinds of interruptions. A planned interruption where the program is designed to call another program in a job stream and pass information to it; and an unplanned interruption (initiated by the operator) where the next level program being executed is the MENU.DRIVER program and no information is to be passed. If the operator requests an interruption to run the menu program 1432, then none of the standard system common fields (listed above) need to be loaded 1434. If the system is not going to run the menu program, then the complete complement of standard system common information is loaded into the TRM.COM.AREA field in the Terminal file record for this port 1436.

Refer to FIG. 4.2. STD.EXECUTE (continued)

The updated TRM.COM.AREA field is written to the Terminal file into Attribute 14 of the record for this port 1440, and the level that is about to be initiated is written to Attribute 15 of the record for this port 1442. The name of the program to be run at the next level (in this case MENU.DRIVER) is placed into the system input area via the "DATA" statement 1444 and PROGRAM.MAIN is executed via the "EXECUTE" statement.

PROGRAM.MAIN PROGRAM NARRATIVE

Figure 15A:
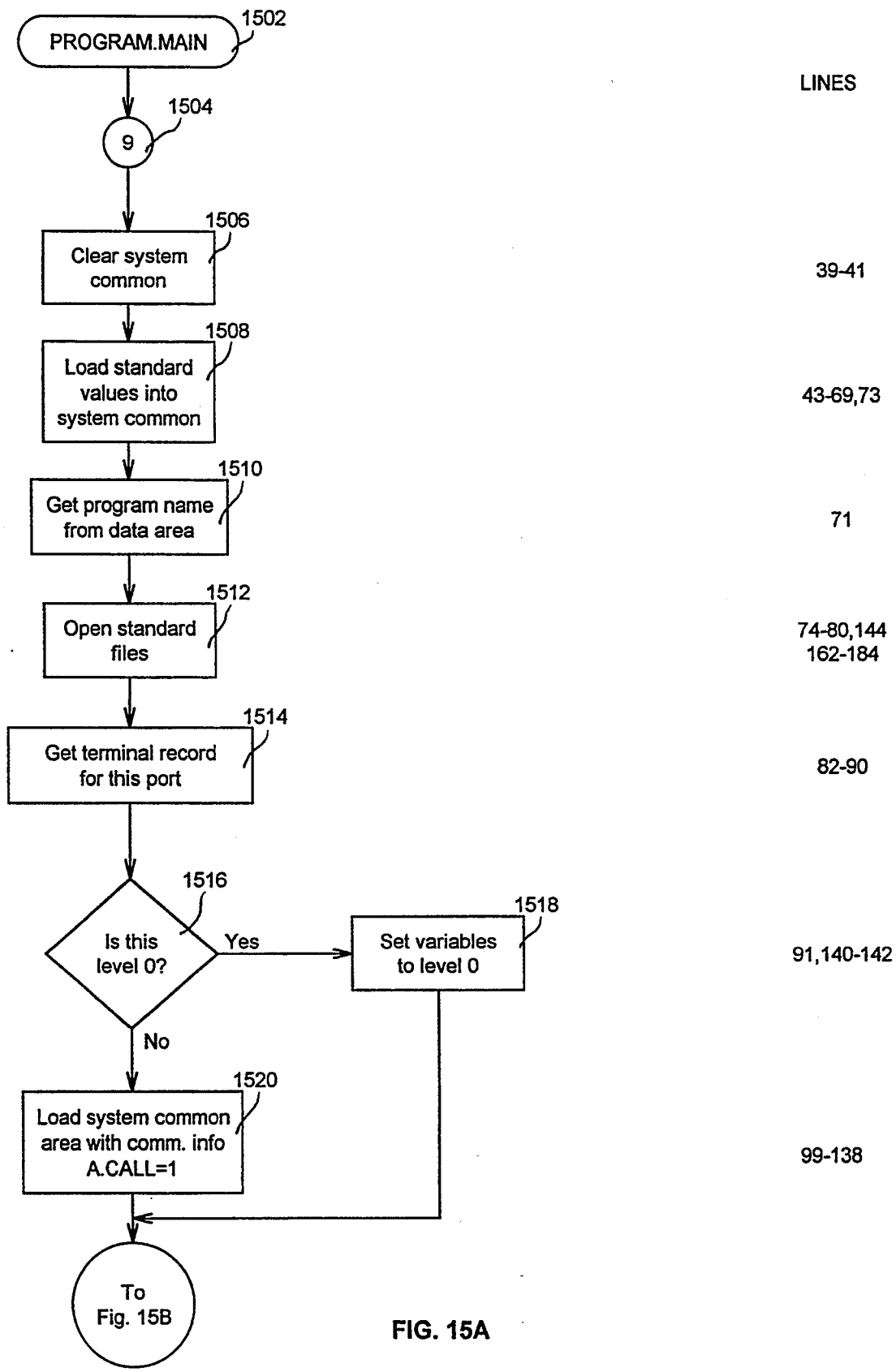
FIGS. 15A and 15B are a logic flow diagram describing how PROGRAM.MAIN processes the new task request and sets up any communications from the lower level.
Figure 15B:
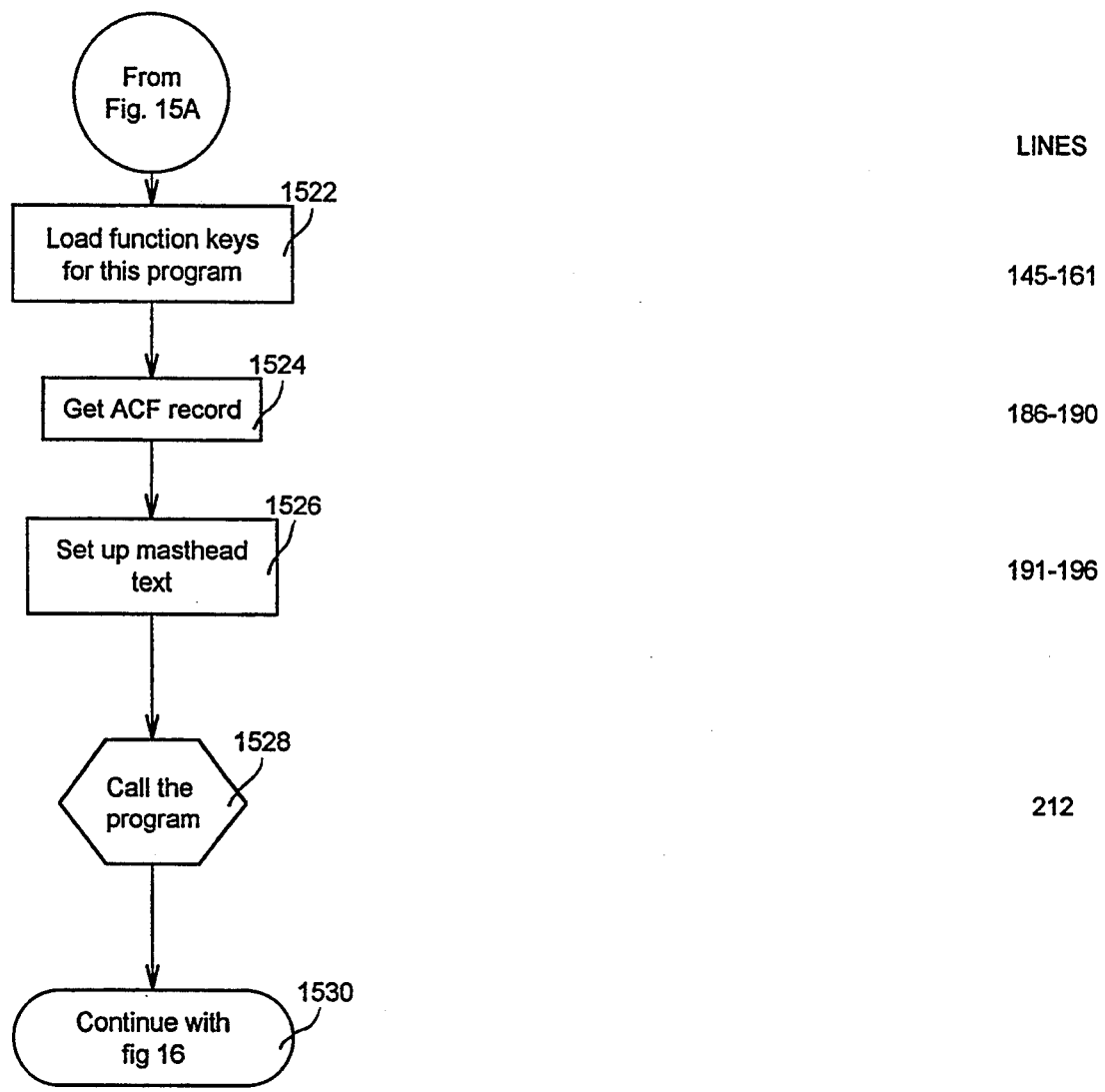

Refer to FIGS. 15A and 15B. PROGRAM.MAIN (before the program call)

This program is used to run all applications programs. It will perform those tasks that every program needs to do and open the files that every program needs to open. Once its housekeeping tasks are finished, the applications program is run via the "CALL" statement.

The first thing that is done is that all System Common areas are cleared 1506. System common is a common communications area where data can be passed back and forth between programs that are "CALLED" from one another. There is no common communications area between levels that are "EXECUTED". Next, there are several standard variables that are initialized 1508, and the name of the program to be called (in this case MENU.DRIVER) is retrieved from the system input area via an "INPUT" statement. Next the standard files are opened 1512 and the Terminal file record is read for this port 1514. This record will contain (in Attribute 14) all of the interlevel communications passed by STD.EXECUTE. If the program is running in Level 0 (the primary level that is running when the operator "logs on" in the morning) 1516, then there is no communications to process, and the variables are set to Level 0 values 1518. If this is not level 0, then there are communications variables that need to be stored in the various System Common fields 1520. Each variable is extracted from the communications area and placed into its respective variable, and the appropriate communications variable is removed. In addition, a flag (A.CALL) is set to signify that this level was initiated from another lower level 1520. The function keys are loaded for the program being run 1522, the Account Control File Record (ACF) is read 1524, and the masthead that will be displayed at the top of any screen is built 1526. Finally, the program (MENU.DRIVER) is run via the "CALL" statement 1528.

At this point the operator will see the MENU.DRIVER screen and may make any selection desired. Once the reason for the interruption has been satisfied, the operator will exit from the applications program and find the system displaying the menu once again. If the operator enters (E)xit or (OFF), the program recognizes that the level is not at 0 and automatically returns control to PROGRAM.MAIN to prepare to shut down this level and return to the previous lower level.

Figure 16:
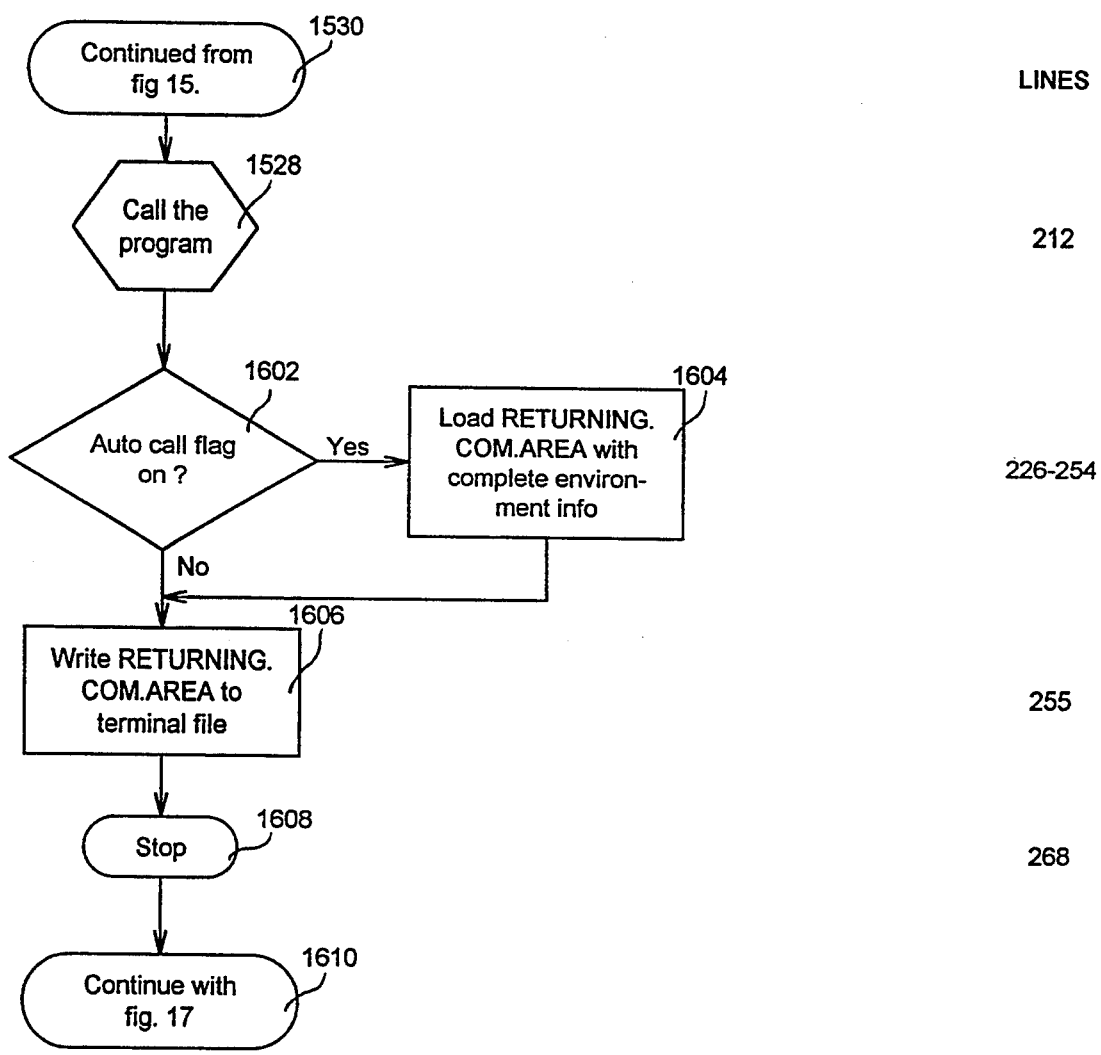
FIG. 16 is a logic flow diagram of how PROGRAM.MAIN closes down the higher level, prepares any communications to be passed back down to the lower level and shuts down the task.

Refer to FIG. 16. PROGRAM.MAIN (after the program call)

If the A.CALL flag is on 1602 then the very same system common variables which define the current environment will be loaded into the RETURNING.COM.AREA 1604 in order to pass them back to the lower level. The communications field is written back to the Terminal File 1606 and the program stops 1608. The operating system recognizes that this task is completed, closes down the task, and returns control to STD.EXECUTE at the lower level.

Figure 17:
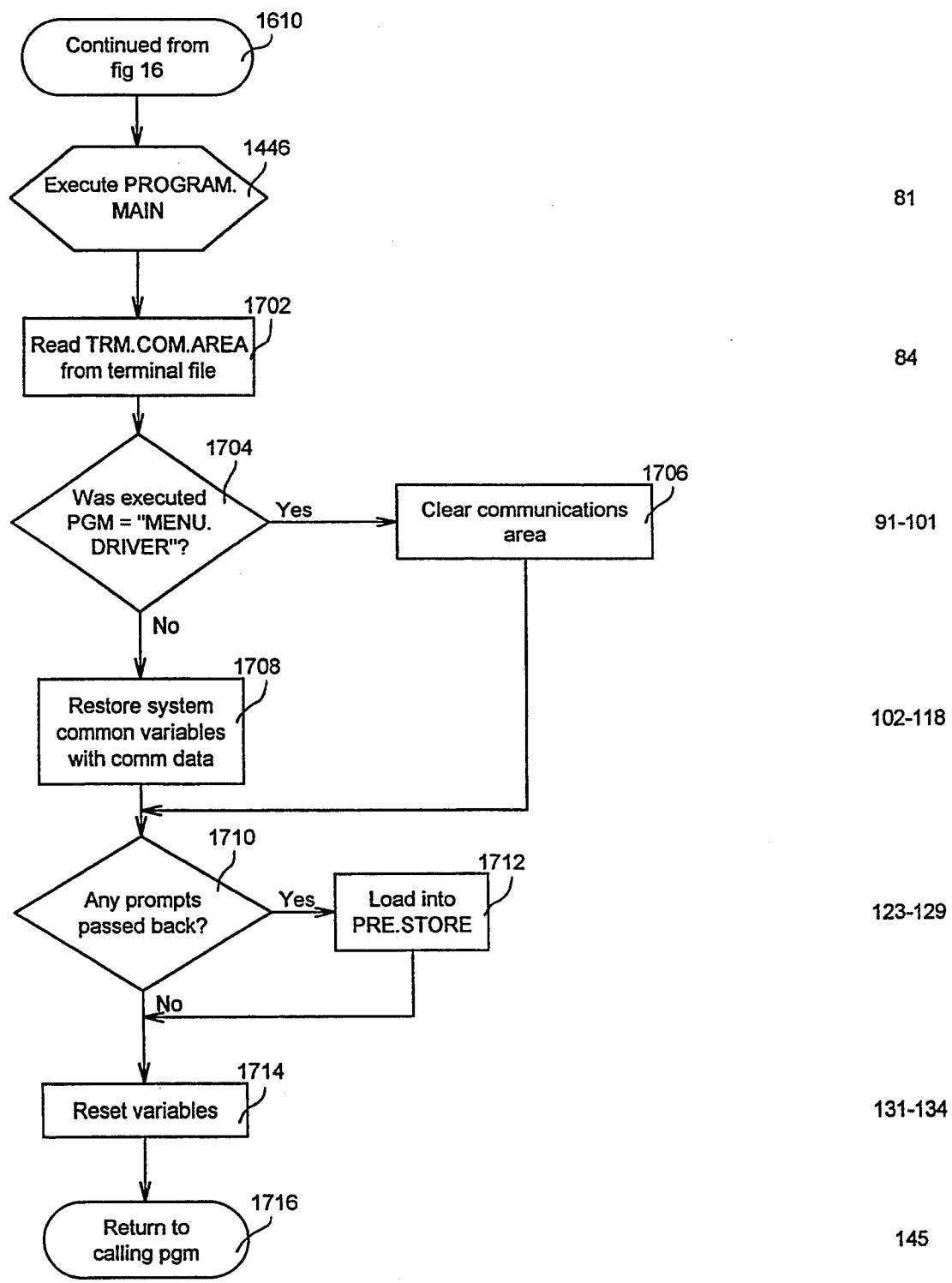
FIG. 17 is a logic flow diagram of how STD.EXECUTE handles the communications passed back from the higher level, reestablishes the calling program's display screens, and concludes the interrupt command.

Refer to FIG. 17. STD.EXECUTE (after the EXECUTE)

Once the operating system closes down an executed task, control is automatically passed to the next lower level. The program that was being executed at the time of the initiation of the higher level task is STD.EXE- CUTE. Once control is returned to this program, the program has access, once again, to System Common. System Common is a portion of the memory work area designed to hold the totality of information that describes the current executing applications environment of each task in effect on the system. Among the information maintained in System Common is:

1. The name of the program currently being executed (PGM. NAME).
2. The currently active Data Base record (HDR.REC).
3. The current coordinates of the cursor (HRZ & VRT).
4. The Attribute (Field) location being processed (AMC).
5. The current help record key (HELP.KEY).

There are approximately 770 individual variables that are include in System Common. STD.EXECUTE will utilize some of these variables to re-establish the screen so that the operator is returned to the exact program, data record, and field that were active at the time of the interruption.

The updated communications data as saved in step 1606 is read from the Terminal file. If the program being run at the higher level is "MENU.DRIVER" 1704, then there is no communications to process and the area is cleared 1706. If any other program was being run at the higher level, then the System Common Variables that describe the current environment are updated into their respective places in System Common 1708. If any data was passed back by the higher level program 1710, it is loaded into PRE.STORE for later processing 1712. Finally, the communications variables are cleared 1714 and STD.EXECUTE returns control to the calling program 1716.

Refer to FIG. 13. Calling program

The calling program will re-display the background and foreground of the program that was running before the interruption 1314, and the operator is placed back into the same field where the original command was issued 1302. The operator may then continue with the original task.

EXAMPLE OF PROGRAM INTERRUPTION

The scenario being illustrated is as follows:
"While making a change to a policy that belongs to Client David M. Murdock, another customer, Joe Jones, arrives at the office and wishes to leave a $100.00 deposit against a new policy."

- - - Earlier - - -

FIG. 18. Screen 1/22/90 - 17:54:05.

This screen depicts the main menu screen that a typical operator would see after first "Logging On" in the morning. The operator selects program number 1 (Client Marketing and Servicing). This is the gateway program to all client/policy transactions.

FIG. 19. Screen 1/22/90 - 17:54:36.

This screen is the Basic Client Information screen. The curser is resting just to the left of the Client Code: text. The operator enters "MURDOCK" to recall the DB record for David M. Murdock. The program accesses the database, retrieves the appropriate database record and displays . . .

FIG. 20. Screen 1/22/90 - 17:55:06.

This screen contains the client information about client David M. Murdock. The operator verifies that this is the client desired and depresses the "POL" Function Key to call up the list of policies for this client. The program performs a planned interruption to call the Policy Selection List program, passes the Client Code so that the operator doesn't have to re-enter it and displays . . .

FIG. 21. Screen 1/22/90 - 17:57:09.

This screen will allow the operator to select which of the policies for the client is to be processed The operator selects a policy "1" enters a Transaction Code "COR" and depresses the "POL" function key again to indicate that an individual policy has been selected for processing. The program performs another planned interruption to call the Basic Policy Information program, passes the Policy Sequence Number so that the operator doesn't have to enter it and displays . . .

FIG. 22. Screen 1/22/90 - 18:01:37.

This screen shows the operator the basic information about a policy. Just as the operator is about to enter the new information about this policy . . .

- - - JOE JONES ARRIVES - - -

The operator now has to satisfy the request of Joe Jones to process the $100.00 deposit immediately (after all he is sitting right there). The operator enters "M" to call the menu program. The program performs an unplanned interruption and displays . . .

FIG. 23. Screen 1/22/90 - 17:58:09.

The main menu screen, The operator selects number 2 (Accounts Receivable Menu), and the program displays . . .

FIG. 24. Screen 1/22/90 - 17:58:24.

The A/R menu where the operator selects number 4 (Case Receipts Entry Screen). The menu program calls: the Cash Receipts program which displays . . .

Screen 1/22/90 - 18:00:45. The operator enters the necessary information to record the fact that Joe Jones is leaving $100.00 (Check number 12345) and files the screen. The program terminates and returns control to the menu program which displays the last menu processed . . . FIG. 26.

- - - JOE JONES LEAVES - - -

After a cheerful goodby, the operator must now finish up the interrupted task of correcting David M. Murdock's policy. So the operator enters (E)xit which causes the menu program to re-display . . .

FIG. 27. Screen 1/22/90 - 18:01:17.

The main menu screen. The operator enters (E)xit again, and the program terminates this task and returns to the lower level. The original screen is redisplayed.

FIG. 28. Screen 1/22/90 - 18:01:37.

The operator is now back where he started in the same field where he entered the (M)enu command just moments ago. The correction is now completed. The Policy record is filed, and the rest is history.

OPERATING ENVIRONMENT

The operating environment required for this feature of the present invention is any operating system that allows for the execution of system level commands from within a program. The environment must also be capable of assigning to each port (terminal/user/operator) a task automatically as the port "Logs On" to the system. In addition, the environment must be able to assign multiple tasks to any active port. The Pick Operating System and most (if not all) of its derivatives have this capability. UNIX and most (if not all) of its variations also have this capability. While these two are listed specifically, there are other operating systems/environments that support the execution of system level commands from within programs and automatically manage one or more tasks for each port/user.

Forms Builder

FILES REQUIRED

There are two files required to support the Forms Generator.

| | |
|---|---|
| Source Parameter File | This file will contain the image information as entered by the developer. All modifications to the form are affected by changing the contents of this file. This file becomes the "Source" code for the Forms Generation program. |
| Object Command File | This file will contain the image information once it has been translated into printer-understandable commands. Each form will have s separate record in this file. |

RECORD FORMATS

Source File—The following fields are required.

| | |
|---|---|
| Key | This is the key to each forms record and must be unique for each form. The key may take any form (Alpha only; Numeric only; or Alpha/Numeric). |
| 2 | Orientation. This field will contain either a "P" or "L" and signifies the orientation of the document. If (P)ortrait is selected, the document will print in a vertical format similar to a letter. If (L)andscape is selected, the document will print in a horizontal format similar to a check. |
| 3 | Description of the form. |

The following fields all relate to any lines, boxes, shaded areas, and pattern fills that the form is to contain. The following fields are all entered and maintained in hundredths of a character (horizontally) and in hundredths of a line (vertically) in the format NNN.NN.

| | |
|---|---|
| 4 | Horizontal Starting Point. |
| 5 | Vertical Starting Point. |
| 6 | Height. Used in conjunction with Width as follows: If the Height is 1 and the Width is greater than 1, then a horizontal line is drawn. If the Height is greater than 1 and the Width is 1, a vertical line is drawn. If both Height and Width are greater than 1, a box is drawn. |
| 7 | Width. Used in conjunction with height (see above). |
| 8 | Weight. How wide is the line. Specified in dots, with 300 dots to the inch. |
| 9 | Type of graphics as follows:<br>0 = Solid line<br>1 = Dashed line<br>2 = Shaded area<br>3 = Pattern fill |
| 10 | Pattern. Valid only if Type is 2 (Shaded area) or 3 (Pattern fill). This field will specify any one of 8 shades (Type = 2) or 6 patterns (Type = 3) |
| 23 | Comments. These comments are for the convenience of the developer and are used to hold notes about any line, box, shade, or pattern. |

The next set of fields refer to check-off boxes. These small 1 character by 1 character boxes are often sprinkled 15 around the form.

| | |
|---|---|
| 11 | Horizontal character position. |
| 12 | Vertical character position. |

The next set of fields specify where on the form all text is to be located.

| | |
|---|---|
| 13 | Horizontal Starting Position. |
| 14 | Vertical Starting Position. |
| 16 | Text orientation (Vertically or Horizontally). |
| 17 | The Point Size of the text to be printed. Based on how many font sizes are contained in the printer. In the present office Automation System, the following sizes are supported: 18, 16, 14, 12, 10, 9, 8, 7, 6, and 4. |
| 18 | Weight. This refers to whether the text will be printed in medium strike weight or bold strike weight. |
| 15 | The text to be printed. |

The following fields are printer offset fields which allow the entire background or foreground to be shifted around without having to adjust hundreds of horizontal and vertical entries.

| | |
|---|---|
| 19 | Horizontal background offset. |
| 20 | Vertical background offset. |
| 21 | Horizontal foreground offset. |
| 22 | Vertical foreground offset. |

Object File—The following fields are generated.

| | |
|---|---|
| Key | The same key is used to identify this record as was entered by the developer in the Source file. |
| 1 | The date that this form was last generated. |
| 3 | The description of the form as entered by the developer. |
| 4 | The horizontal background offset. |
| 5 | The vertical background offset. |
| 6 | The horizontal foreground offset. |
| 7 | The vertical foreground offset. |
| 8-n | The rest of the fields contain the printer compatible commands that will generate the document. n will vary depending on the complexity of the form. |

IMAGE ENTRY PROGRAM NARRATIVE

Figure 29A:
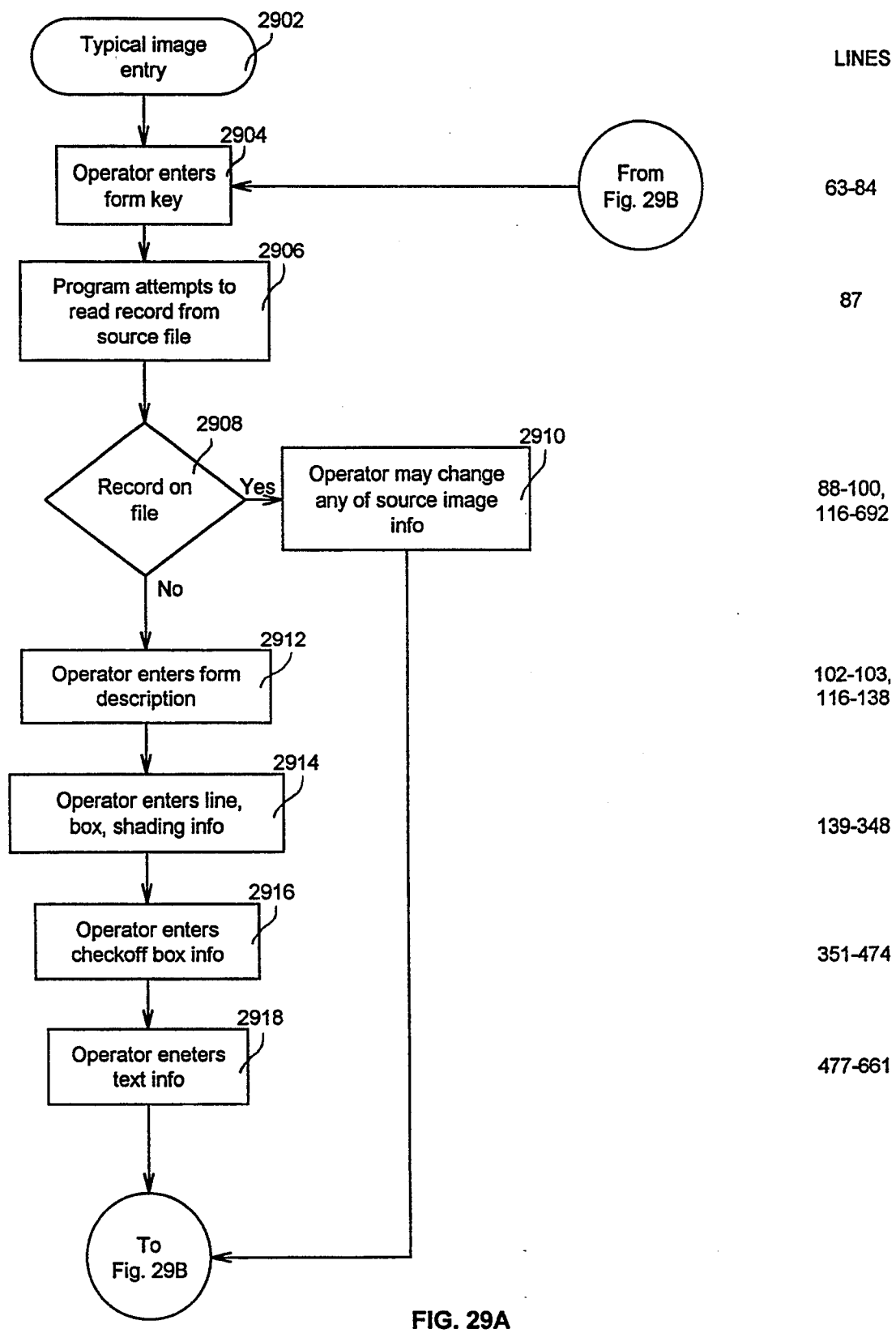
FIGS. 29A and 29B are a block logic diagram of a typical Forms Generation Parameter entry program.
Figure 29B:
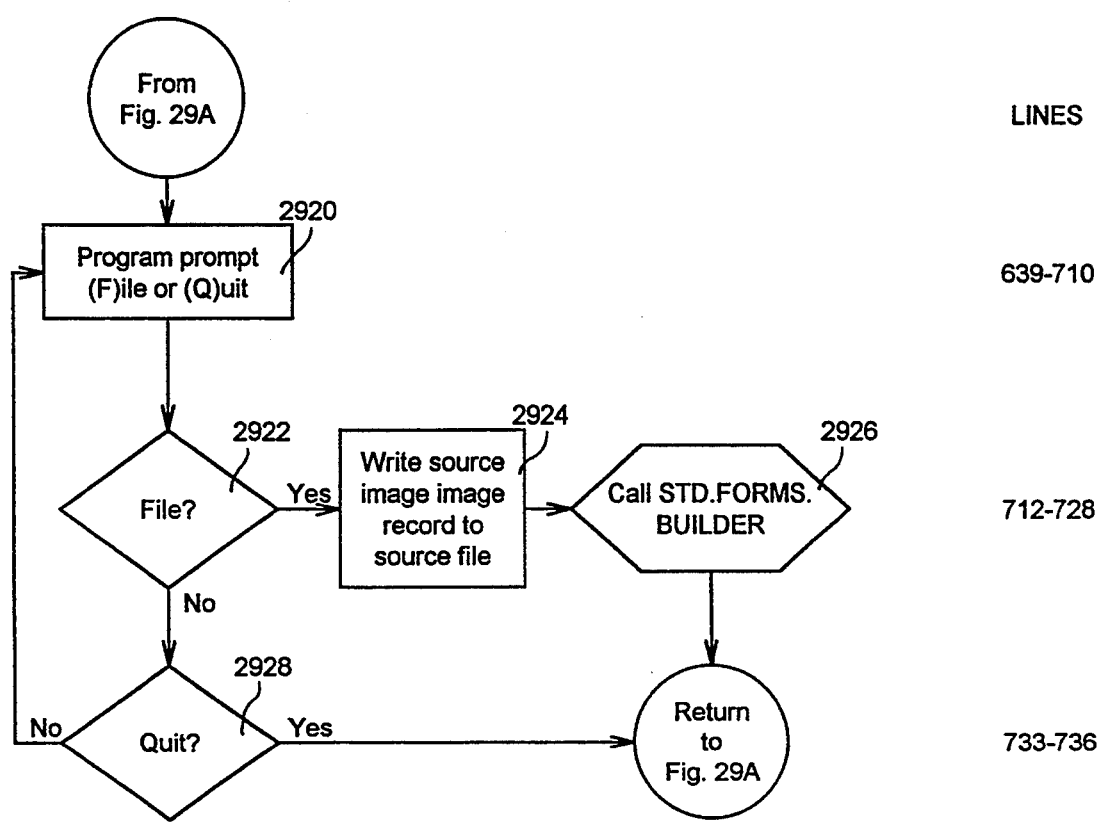
Figure 30A:
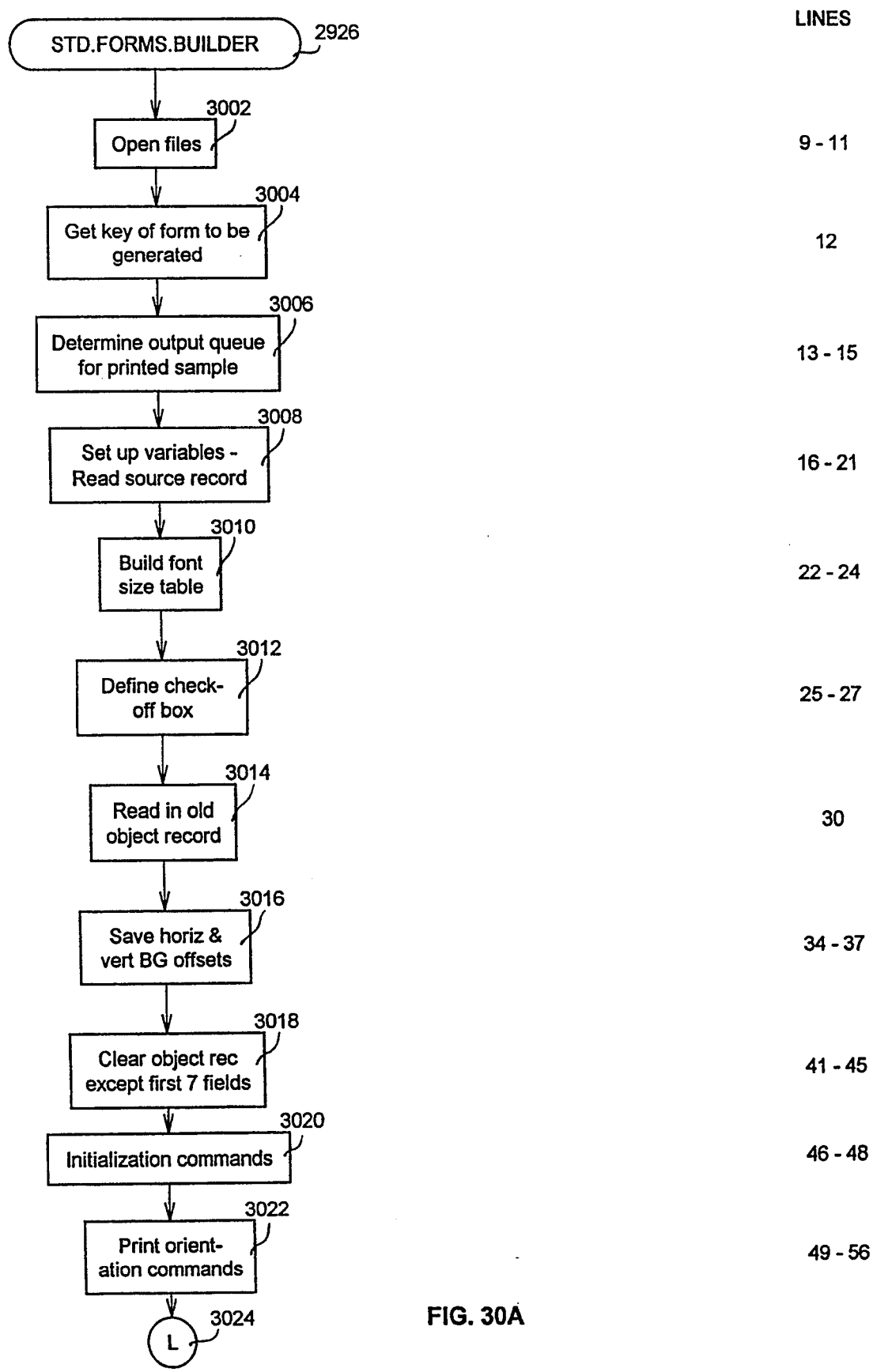
FIGS. 30A and 30B are the main program logic flow diagram of the STD.FORMS.BUILDER.
Figure 30B:
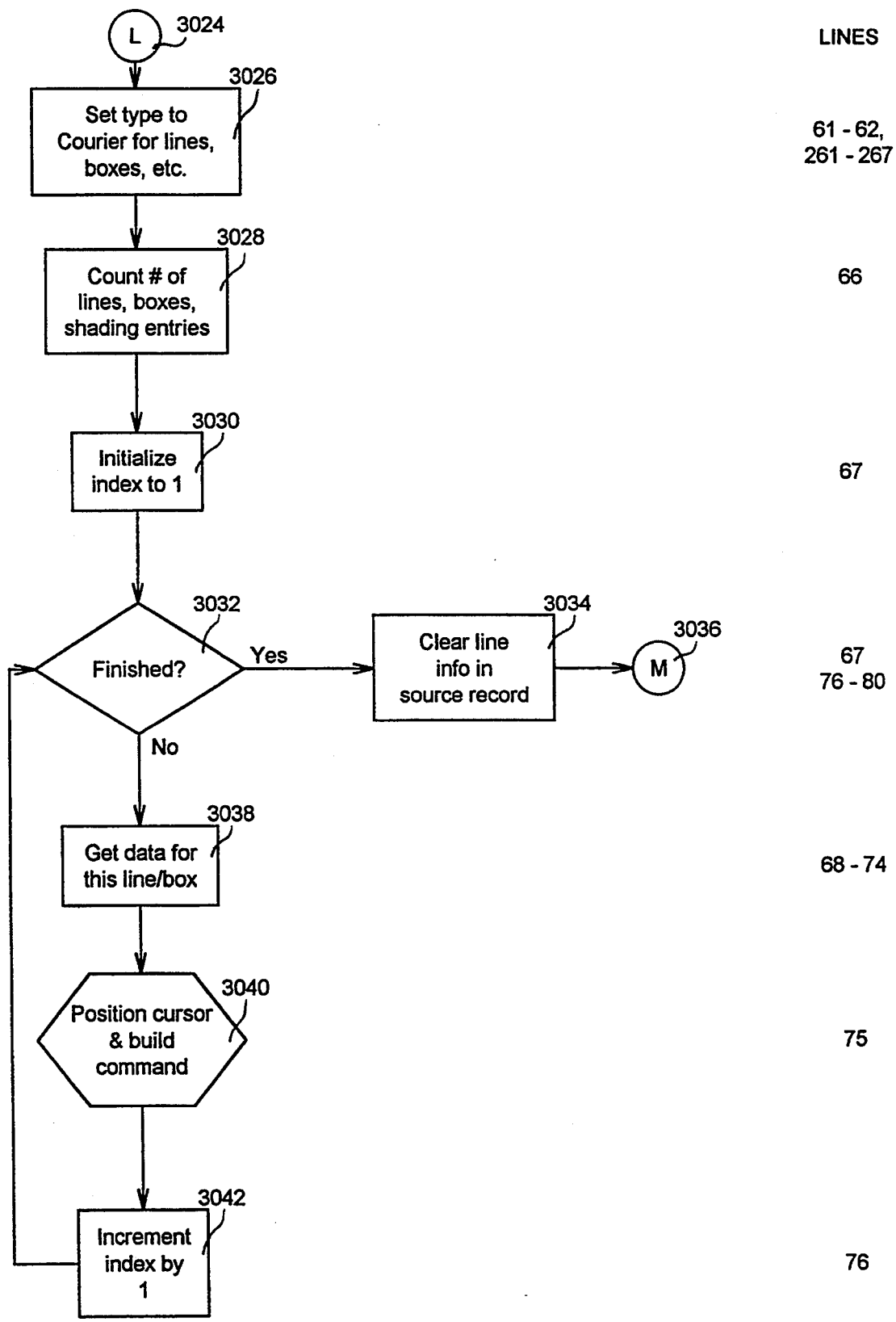

Refer to FIGS. 29A and 29B. Typical Image Entry Program

The program used to enter the document image information is any standard data capture program. This program will display a prompt to the operator for the document key 2904, attempt to read the record from the Source file 2906, and if found 2908, allow the operator to modify the contents of the image information 2910. If the record is not found, then the operator may enter the information necessary to compose a document. This information would include the description of the document being created 2912; the line, box, shading, and pattern data 2914; the check-off box data 2916, and the text to be printed on the document 2918. As a guide, the developer would have taken an original of the form and laid out guide markings using a forms ruler.

For ease of entry, all data entered is in the format NNN.NN or hundredth of a character. Since there are 10 characters to each inch, this equates to being able to specify the position of any line, box, shading, pattern, check-off box, or text to the thousandths of an inch horizontally. Vertically, all positioning is in hundredths of a line and with 6 lines per inch, so the developer may position anything to 1/600th of an inch.

Some examples:

To generate a horizontal line with the following statistics:

| Horiz. character | 6 |
|---|---|
| Vertical line | 3 |
| Length | 2.5 inches |
| Weight | 5 dots |

The following information would be entered:

```
Horiz  Vert  Height  Width   Wt  T  Patt   Comments
6.00   3.00  1.00    25.00   5   0
                                     |_____ Optional Comments
                                  |_____ No Pattern for lines
                               |_____ Type 0 (line)
                           |_____ Weight 5 (dots)
                    |_____ Width 25 characters (2.5")
              |_____ Height 1 (horizontal line)
        |_____ Vertical Position Line 3
  |_____ Horizontal Pos'n Char. 6
```

The developer would continue to enter in the image, periodically printing out the document to check on the exact placement of the graphics. Once all of the information has been entered, the system displays a prompt asking whether to (F)ile or (Q)uit 2920. If the operator enters (F)ile 2922, then the system will write the Source file data to the Source file 2924, and call the STD.FORMS.BUILDER program 2926 to generate the object (printer-understandable) commands.

STD.FORMS.BUILDER PROGRAM NARRATIVE

This program will create the object commands based on the image information entered by the operator, and write the resulting series of commands to the Object file.

The first step in this process is the housekeeping chore necessary to perform the generation. Open the files 3002, get the key of the Source file record to be compiled 3004, set up the Spooler output queue to print the sample form 3006, set up some standard variables and then read in the Source Image record 3008, build a temporary font size table 3010, define the checkoff box as a series of printer commands 3012, read in the old object record 3014, save the horizontal and vertical offsets from that old table 3016, clear the old object record to prepare it for the new commands 3018, and, last but not least, save the new printer initialization commands in the Object record.

All line drawing is performed while the printer is set up to print Courier Type Font, so the necessary commands are issued 3026. The program causes the system to count the number of line, box, shading, and pattern entries there are 3028, and then starts to loop through each entry 3032–3042, looking at each entry in turn 3038, and calling the Curser Positioning and Command Generation routine (Tag 9000 in the program code). Once finished generating all of the lines, boxes, etc. the program continues with the Check-Off boxes (See FIG. 32.)

Figure 31:
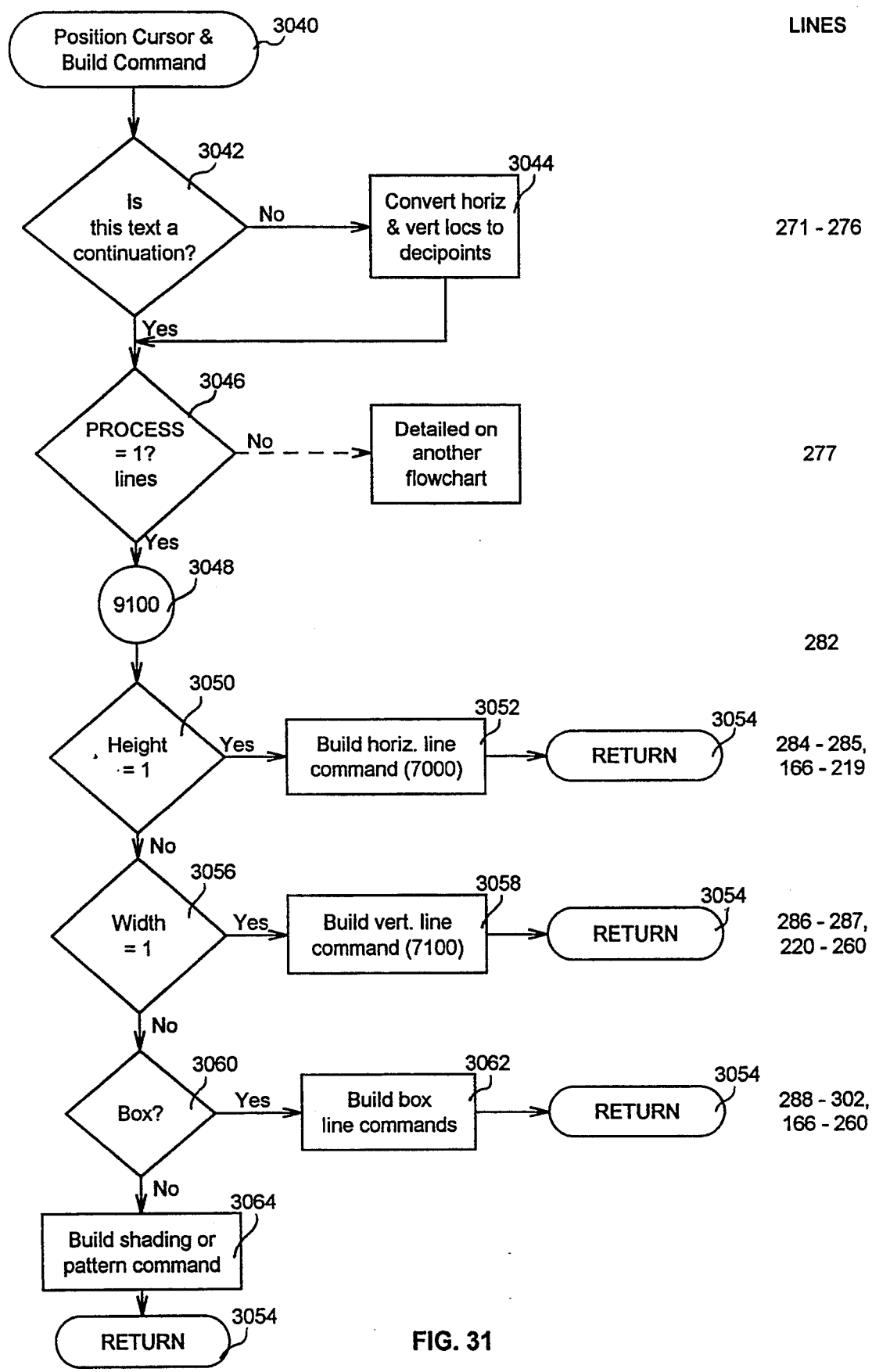
FIG. 31 is a program logic diagram of the Line, Box, Shading, and Pattern Fill commands routine.

Refer to FIG. 31. Lines, Boxes, Shading, and Patterns

If there is no horizontal position, that means that the system is concatenating two or more strings of text and there would not be any new curser placement command 3042. If there is a horizontal position, then the Horizontal and Vertical positions are converted into decipoints (720 decipoints to the inch) 3044. Because decipoints are not a unit of measure that people readily work with, the Forms Builder is designed so that all positional data entered is in characters and lines. To convert characters to decipoints, the program multiplies by 72 (i.e. 720 divided by 10 characters to the inch). To convert the lines to decipoints, the program multiplies by 120 (6 lines to the inch). Now the system is ready to generate the actual graphic command that will perform the action defined in the entry.

If the Height entered for this entry is one (1) 3050, then the program will build a horizontal line command 3052 and then return to process the next entry 3054. The same routine that builds solid horizontal will also build a dashed line as a series of short lines separated by a space that is two-thirds of the length of the short line.

If the Width entered is one (1) 3056, then the program will build a vertical line command 3058, and then return 3054.

If both the Height and Width have data 3060, then the program will build a box that has the height and width specified 062 and then return 3054.

If the type indicates that this is a pattern fill or shading, then the program will build the shading/pattern fill command 3064 and return 3054.

Figure 32:
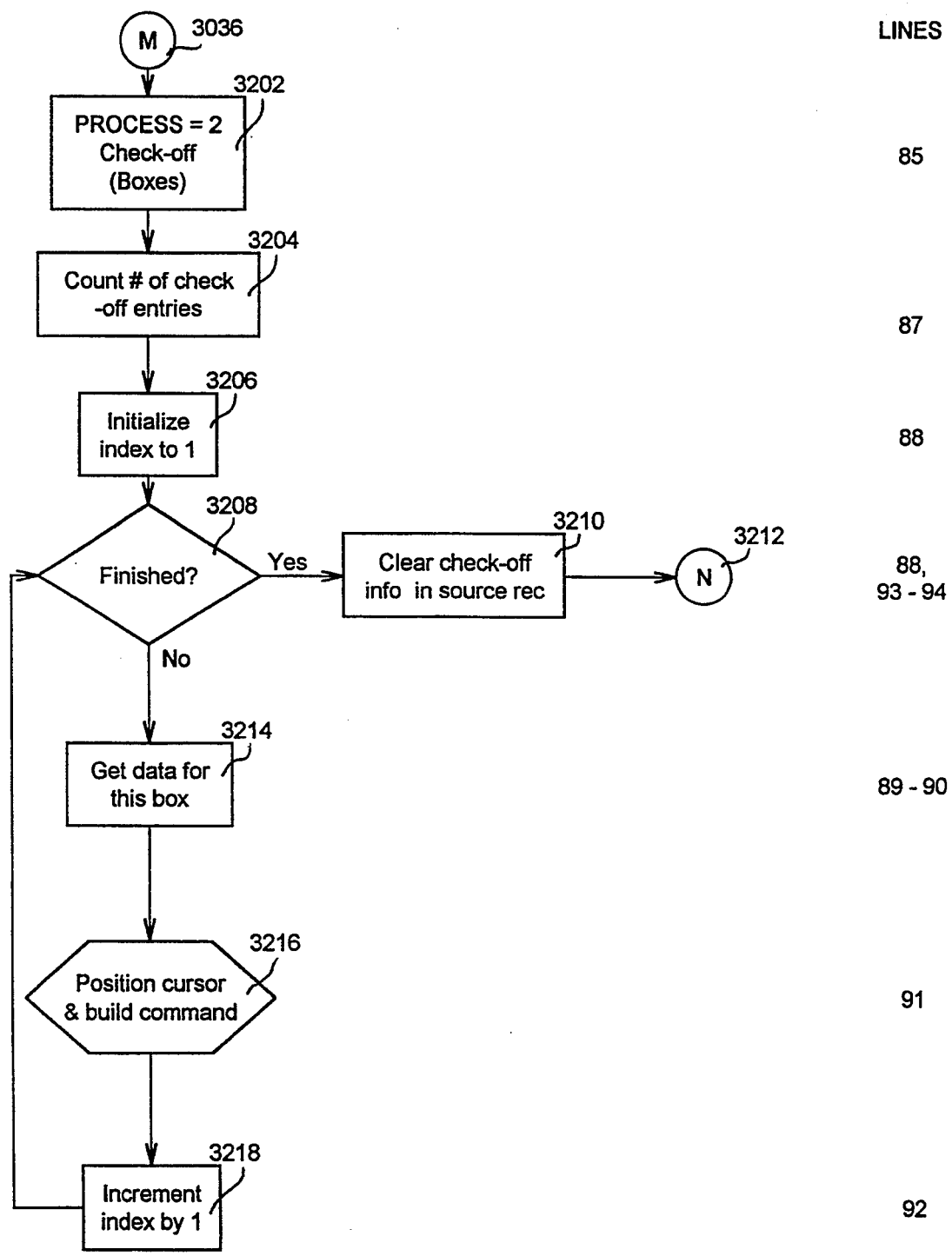
FIG. 32 is a continuation of FIGS. 30A and 30B (main logic flow).
Figure 33:
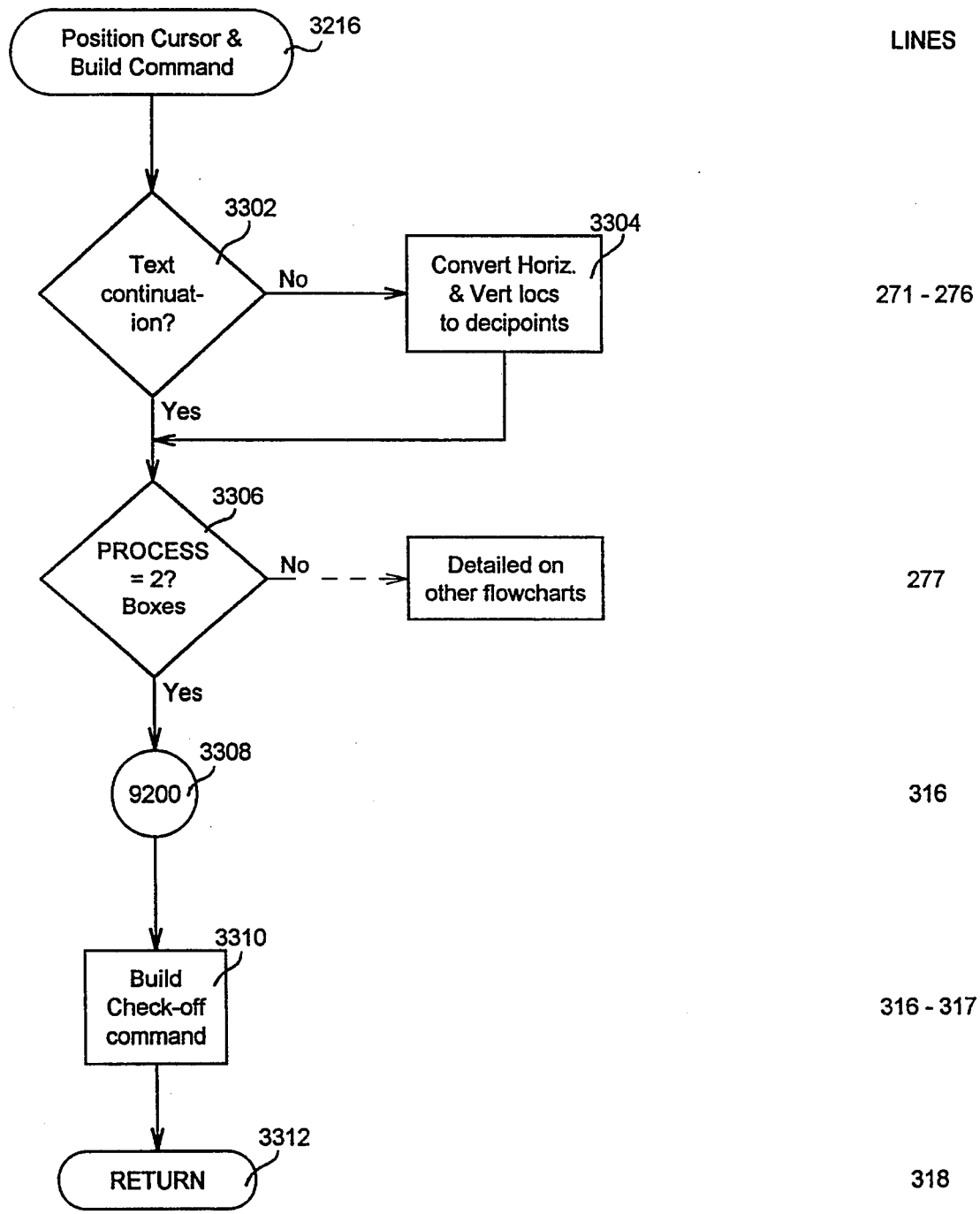
FIG. 33 is a logic diagram showing the Check-Off Box command routine.

Refer to FIG. 32. STD.FORMS.BUILDER Main Logic Flow (Cont.)

Once all lines, boxes, shading, and pattern fills are completed, the program will then set the PROCESS flag to two (2) 3202 to signify that the check-off boxes are being processed. The program counts the number of check-off box entries 3204, and then examines each entry in turn 3206–3218. Once finished 3288, the program clears the check-off data in the source record 3210, and continues 3212 (refer to FIG. 34). As each entry is processed, the data is identified 3214, and the Curser Position and Command Building routine is called 3218. After each entry is processed, the index is incremented 3218 to examine the next check-off box entry.

Once again in the Curser Position and Command Building routine (Tag 9000) 3216, the program checks the horizontal position field to see if it is null 3202, and if so, converts the positions (both horizontal and vertical) to decipoints 3304. The routine continues to Tag 9200 (based on the PROCESS flag) 3308, builds the command 3310 which is composed of the positioning command and the box command built at the beginning of the program 3012, and then returns 3312 to examine the next check-off box entry.

Figure 34A:
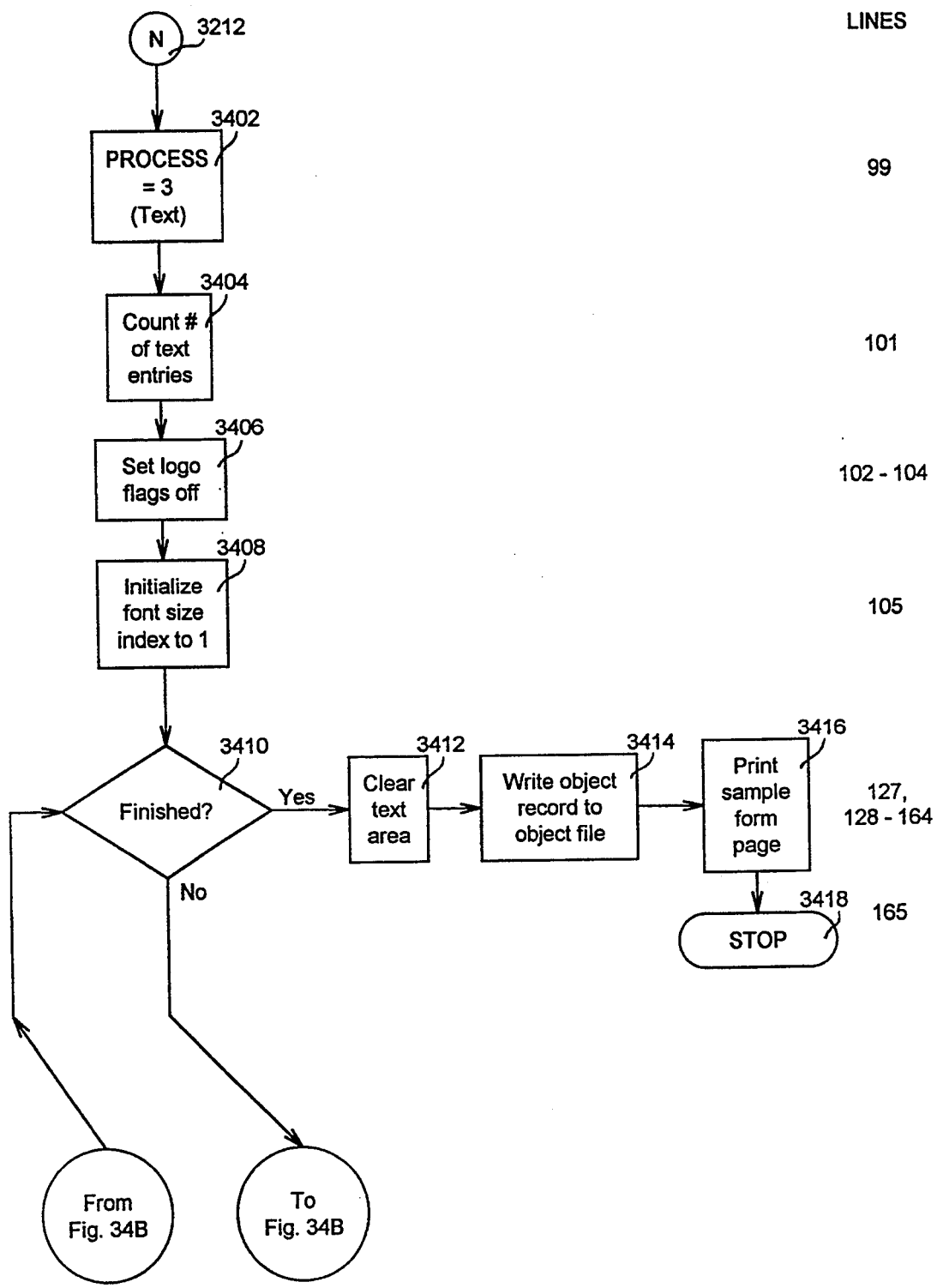
FIGS. 34A and 34B is a continuation of FIGS. 30A and 30B and FIG. 32 completing the main logic diagram and a portion of the Text command routine
Figure 34B:
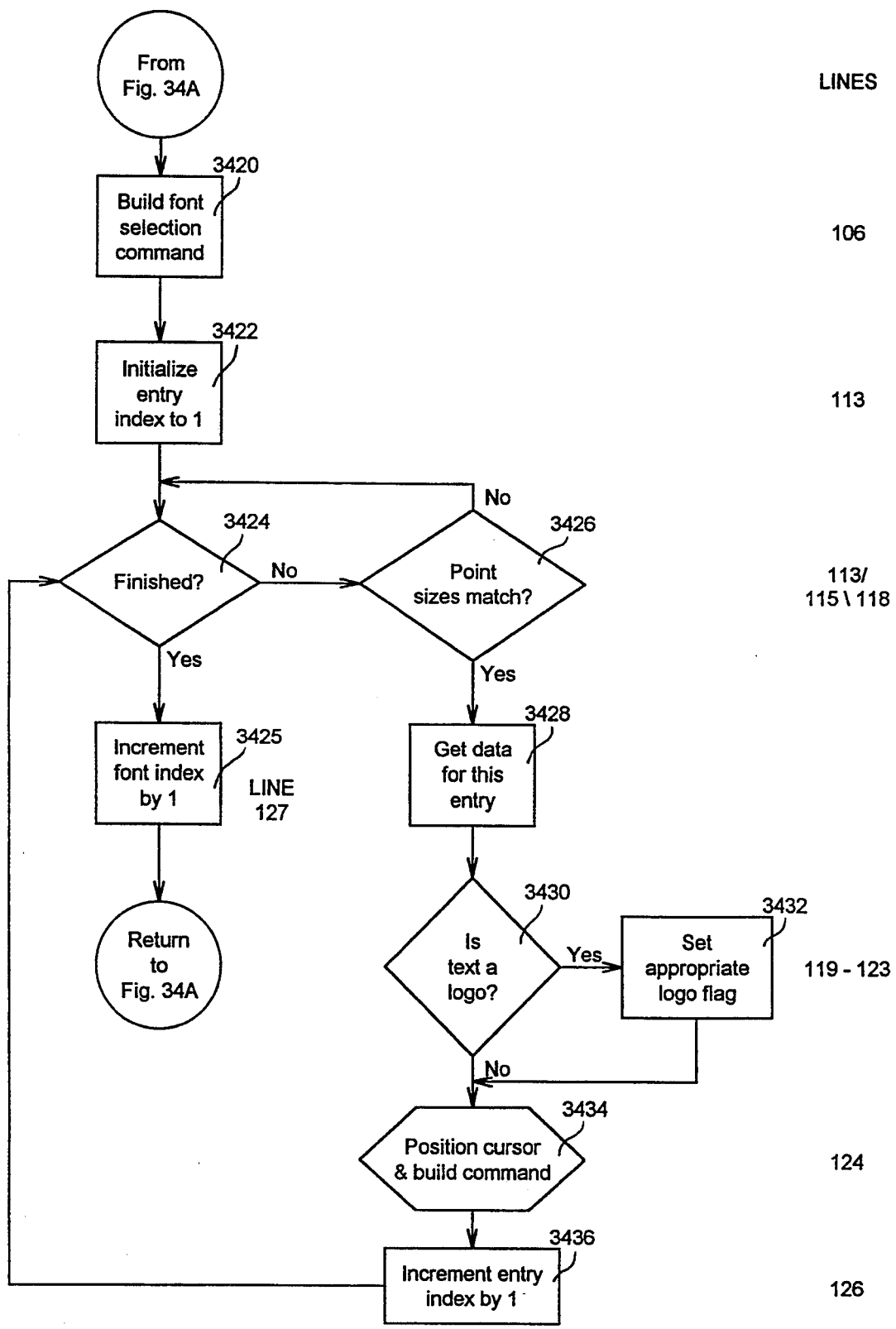

Refer to FIGS. 34A and 34B. STD.FORMS.BUILDER Main Logic Flow (Cont.)

Once all check-off boxes are processed, the program sets the PROCESS flag to three (3) 3402 to indicate the third and final step in the document generation process, Text. After counting the number of text entries 3404, and setting the three logo flags off 3406, the program examines each font size in turn 3408-3425, searching all of the text entries to group all text for each of the allowable size together. This prevents the program from jumping back and forth between differing font commands since the text is not entered in any font size order. As each font size is processed 3408-3425, each text entry is searched for a match 3422-3436. If the font size matches as to both font point size and strike weight, the data for this entry is identified 3428. If the text for this entry is one of the following words: "CISCO", "ACORD", or "AETNA" 3430, the program sets a specific logo flag 3432 to permit building a special command to print the digitized logos later on. (See below for further description of digitized logos.) The Curser Position and Command Building routine is called 3434 (again), and then the entry index is incremented to check the next text entry 3436.

Figure 35A:
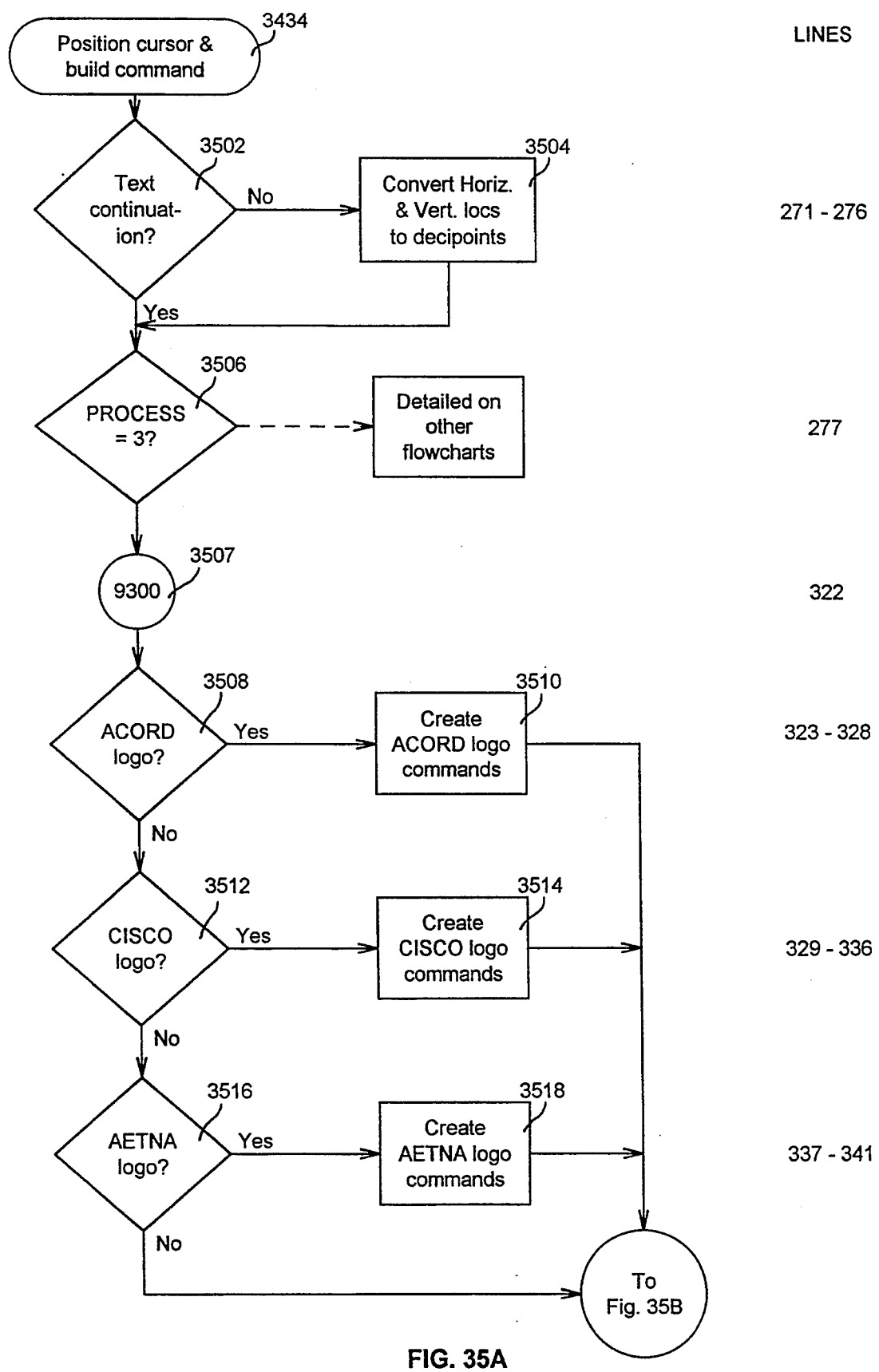
FIGS. 35A and 35B is a logic diagram of the Text command routine.
Figure 35B:
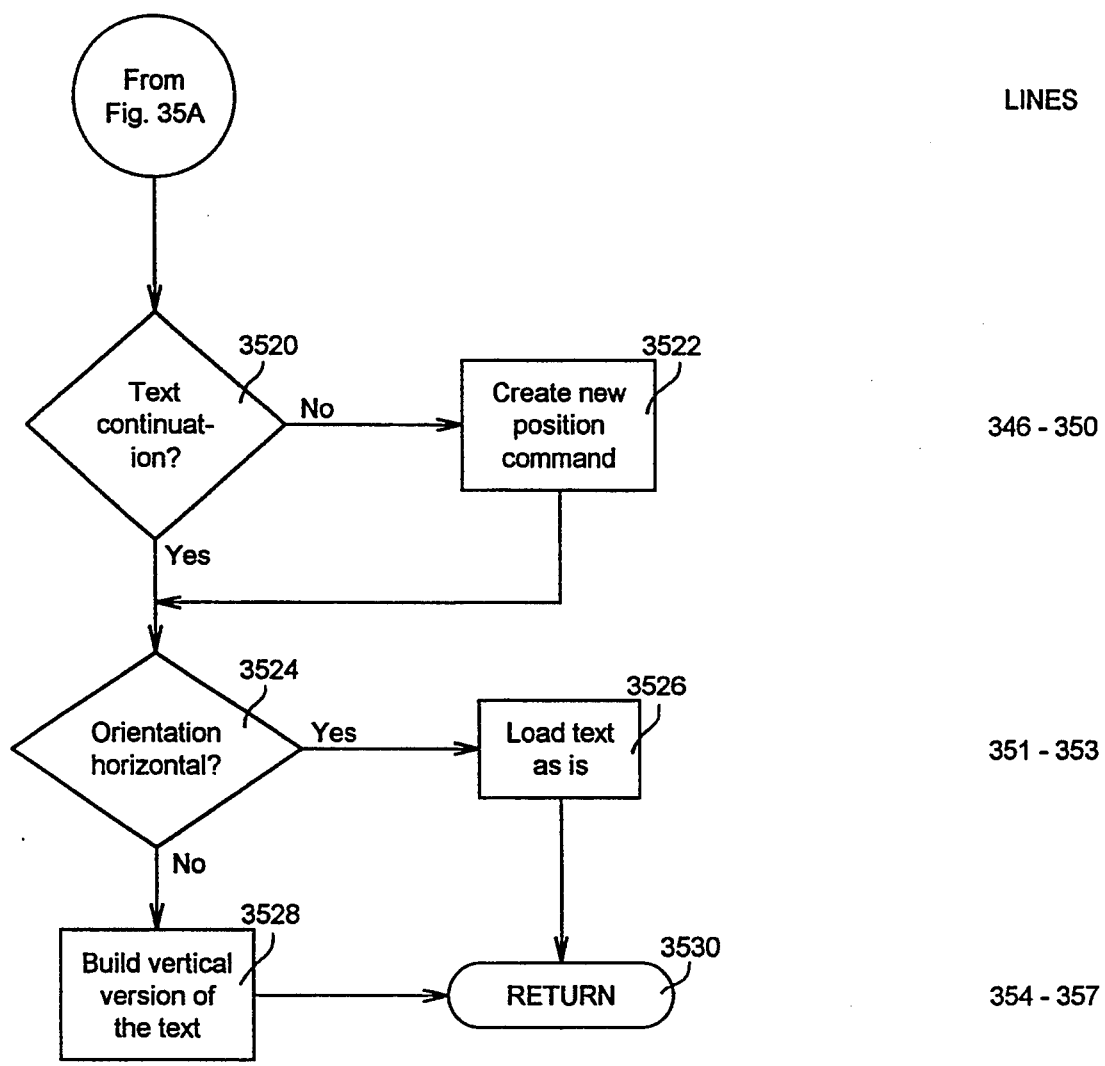

Refer to FIGS. 35A and 35B. STD.FORMS.-BUILDER Text Command

Text continuation 3042, 3302, and 3502. This test has been encountered three times—the Curser Position and Command Building routine is used by all sections of the program: Lines, Check-Off Boxes, and Text. Here is why this test is here. The entry program used to enter all of the image data permits the developer (operator) to enter 53 characters of text. Usually, this is sufficient since in most cases the text is used to label sections of the form. There are places on some forms, however, where large amounts of text (more than 53 characters worth) are required. So, if the operator is entering a second (or third, or fourth, etc) block of fifty-three (53) characters that is a continuation of another block of text, she simply leaves the Horizontal position blank. This will indicate to this program that no new curser position is to be generated, and this additional text will be concatenated to the previous text. So, once again the program tests to see if this is a text continuation 3502, and if not, it converts the positions to decipoints 3504. If is it, then no position conversion is necessary since no positioning command will be issued. The program continues to Tag 9300 3507 to process the text.

The use of digitized logos was mentioned above in connection with the logo flags. The laser printers that are in general use today have the capability to print a digitized graphic image. In the preferred embodiment of the invention, three digitized logos have been created by conventional technique for inclusion on any of the forms generated. These logos are invoked by entering a specific word in the text entry. The program will generate the custom command required to print the logo.

The program tests for the custom logo text 3508, 3512, and 3516. If the flag is set, the appropriate logo command is generated 3210, 3514, or 3518. Once again the text continuation test is executed 3520, and if not, the actual curser positioning command is built. If the text orientation is (H)orizontal 3524, the text (or logo command) is combined with the curser command and placed into the Object record. If the orientation is (V)ertical 3524, then the system will build a series of commands that will print the text l
i
k
e
t -continued h
i
s

3528, and load it into the Object record. In either case, the program returns 3530 to process the next text entry. Refer to FIG. 34. STD.FORMS BUILDER Text Command Once all of the text has been processed 3410, the program will clear the text area 3412, write the Object record to the Object file (ACORD.FORMS) 3414, print the generated form 3416 so that the developer can verify that all is well, and stop 3418.

Once the Object file image records are created, they are stored on disk until needed. When an operator requests that a specific document is to be printed, a program will be executed that reads up the Object image record for the desired form, and starting with Attribute 8, loops through all of the commands and outputs them to the printer. Once all of the commands have been processed, a complete background image of the document now resides in the printer. See FIG. 37 for an example of an ACORD Property Loss Notice printed in accordance herewith.

The program will then send the variable information to complete the process. The result is a completed document ready for submission, as shown in FIG. 38.

Both the Audit History and Forms Generation features of the present invention involve printed output. In the case of Audit History, the operator may wish to print images of the historical images for reference. All of the results of the Form Generator are printed by the laser printer. To support the modern office environment, the system of the present invention supports distributed printing as opposed to centralized printing. Because of the myriad of documents generated, centralized printing with one fast line printer is not feasible or practicable. The problem that arises with distributed printing is how to direct the spooler output to the correct printer based on the following guidelines:

1. Most printed output needs to be printed on the printer closest to the operator that generated the print request.

2. Print requests that require that the output be printed on a specific printer (checks, for example) need to be routed to the appropriate printer.

In the preferred embodiment of the Office Automation System, the management of the printers is controlled by a hierarchical decision table utilizing the following information:

| | |
|---|---|
| FORMS file | This file contains one record for each document printed. Among the information in the record is the specific spooler Queue that is assigned to this output. If the Queue number is null, then the printed output will be sent to the spooler Queue as specified by . . . |
| TERMINAL file | This file contains one record for each port that has an ASCII terminal attached to it. The port number identifies the physical location of the terminal since all terminals are hard-wired to the host. One field in this record is the Default Spooler Queue for this port. This Queue number will direct the printer scheduler to . . . |
| QUEUE file | This file contain one record for each spooler Queue required by the system. Many queues are permitted (in some systems 256), and each queue |

| | |
|---|---|
| | can be thought of as a logical printing device. This logical printing device record has a field that points to a physical printing device in the ... |
| DEVICE file | This file contains one record for each physical printing device attached to the computer. Each device record contains the name of the printer assigned to this device number. The printer field in the device then points to ... |
| PRINTER file | This file contains one record for each printer supported by the Office Automation System. Information in this record is used to send the correct commands (they differ from printer to printer) to the correct device as specified by the queue assigned to this form or operator. |

Whenever printed output is generated, a program is called that examines the current status of the above files and directs the printed output to the correct spooler queue, and insures that the correct printer commands are issued to the correct printer.

While but one embodiment of the present invention has been extensively described and illustrated, it will be apparent to those skilled in the art that changes and modifications may be made therein, which changes and modifications nevertheless will not depart from the spirit and scope of the invention as claimed in the various claims appended hereto.

What is claimed is:

1. An office automation system comprising:
   (a) a computer;
   (b) an entry device and a display device, each in communication with the computer;
   (c) means for storing, updating and displaying the contents of a database, each of said functions of storing, updating and displaying comprising all or part of a task that the system is capable of performing in response to entries from the entry device, and
   (d) means for maintaining an audit history of the database comprising:
      (1) means for generating an audit history of a plurality of records of said database wherein said means for generating an audit history comprises:
      (i) means for retrieving the original active record and delta records associated with a record;
      (ii) means for applying to the original active record, the corresponding delta record to create a first chronologically-ordered displayable historical data image record stored in a third temporary memory storage location, said historical data image record comprising data associated with the record after data in the original active record was updated and stored in memory in the first session;
      (iii) means for applying each subsequent delta record to the previously created historical data image record until all delta records associated with the record have been applied, whereupon, each sequential displayable historical data image record represents data corresponding to the record each time the record was sequentially stored into the database, and
      (2) wherein each of said plurality of records has associated therewith:
      (i) an original active record stored in a first temporary memory storage location;
      (ii) at least one delta record stored in a second temporary memory storage location comprising an identification of each location within the record of data that was changed at a session and a copy of the data changed at said session, and
      (3) means for displaying said displayable historical data image records.

2. The office automation system of claim 1 wherein each of said records of (d)(i) further comprises an original visual image record stored in a fourth temporary memory storage location, and means (d)(1)(iii) further comprises means for creating a visual image record for each corresponding historical data image record, each visual image record having associated therewith:
   (a) means for highlighting the changed data in each of said displayable historical data images, and
   (b) means for displaying each visual image record in conjunction with its corresponding historical image record, thus creating a historical image, whereby the changed data is highlighted in each of said historical images.

3. The office automation system of claim 2 wherein said display device is a video display device and wherein each of said visual image records further comprises means for separately highlighting the data changed in the session associated with the historical data image over other changed data, whereby the data changed in each session is highlighted in bright reverse video and the other changed data is highlighted in reverse video in each of said displayable historical images.

4. The office automation system of claim 1 further comprising means for generating the original active record and at least one delta record from a record, wherein said means for generating the original active record comprises:
   (a) means for retrieving the current active record into a temporary memory storage location identified as an active record;
   (b) means for applying to the active record previous data stored in memory and associated with a location in the audit history record having the highest change number, for creating:
      (1) a resulting active record comprising the previous data associated with the location in the audit history record at the beginning of the session associated with said highest change number, and
      (2) a delta record of changes within the active record made at the session associated with said highest change number, said delta record comprising an identification of each location within the active record at which said changes during said session were made and a copy of the changes made at said session and at said location within the active record,
   wherein said means for applying to the active record previous data stored in memory further comprises applying the audit history record having the next highest change number to the resulting active record until each subsequent audit history record associated with the database record has been applied to each subsequent corresponding resulting active record, whereupon the information created is that associated with the original active record and a delta record created for the application of each audit history record;
   and where said delta record comprises:

(a) a current active record stored in memory, wherein the current active record contains current information, and (b) an audit history record stored in memory, wherein the audit history record is generated at each session at which data in the current information in the current active record has been changed and entered into memory, comprising:

(1) a change number associated with said each session, and (2) an identification of each location within the current active record at which the data in the current information was changed during said each session and a copy of the data previously contained at that location.

5. The office automation system of claim 4 further comprising means for applying audit history records, associated with the record and generated by other application programs, to the database record comprising:

(a) means for determining if other application programs have generated audit history records associated with the record, and (b) means for retrieving the audit history records generated by other application programs and applying said historical audit records to the corresponding active record.

6. An office automation system comprising:

(a) a computer;

(b) an entry device and a display device, each in communication with the computer;

(c) means for storing, updating and displaying the contents of a database, each of said functions of storing, updating and displaying comprising all or part of a task that the system is capable of performing in response to entries from the entry device, and (d) means for generating an audit history record of a database record for each session data changes to the database record are saved in memory, wherein each database record comprises a current active record stored in memory which records current information, said means for generating an audit history record comprising:

(1) means for prompting an operator to select a database record to change existing information in the current active record;

(2) means for retrieving the current active record of the selected database record from memory into a location identified as an old record;

(3) means for storing in a temporary storage location said current active record and data changes made to said current active record in a session in response to the operator's inputs to change data in the current active record;

(4) means for comparing the data contents of the old record comprising comparing the current active record of the selected database record with the data contents of the temporary storage location to select for storage said data changes made to said current active record during said session;

said means for generating an audit history record further comprising:

(5) a change number associated with said session, said change number incremented by one over the change number of the previous session;

(6) an identification of each location within the old record that has different data than in the temporary storage location and a copy of the data contained in the old record at that location;

(7) means for storing in memory said different data at each said location having said identification within the old record as said audit history record associated with said session, and (8) means for reading the contents of the temporary storage location back into memory as the new current active record;

whereby an audit history record is created and stored in memory for each session during which the data in the current active record is changed by the operator.

7. The office automation system of claim 6 wherein the audit history record further comprises the date and time of posting corresponding to the session data changes that were made to the current active record.

8. The office automation system of claim 7 further comprising means for displaying the historical images in chronological order of posting comprising:

(a) means for generating a sorted key table sorted by posting date and change number;

(b) means for prompting an operator to select a starting date for which the first history image is to be displayed, and (c) means for retrieving and displaying the historical data image as designated by the sorted key table corresponding to the starting date selected.

9. The office automation system of claim 6 wherein the audit history record further comprises additional history information of an alternate display sequence.

10. The office automation system of claim 9 further comprising means for displaying the historical images in some alternative order corresponding to the additional history information comprising:

(a) means for generating a sorted key table sorted by the additional history information;

(b) means for prompting an operator to select a starting date for which the first historical data image is to be displayed, and (c) means for retrieving and displaying the historical data image as designated by the sorted key table corresponding to the starting date selected.

11. The office automation system of claim 10 further comprising means for displaying the historical data image prior to or after the historical data image corresponding to the starting date comprising:

(a) means for prompting the operator for the next display command, and (b) means for displaying the next historical data image in the alternative order as designated by the sorted key table corresponding to the operator's regressive or progressive command.

12. The office automation system of claim 11 further comprising means of displaying historical data images in any increment, regressive or progressive, of the historical data image corresponding to the starting date.

13. The office automation system of claim 9 wherein the additional data history is the effective date of the data changes made to the current active record.

14. A method for maintaining an audit history of a plurality of active records of a database residing in memory of a computer, said method comprising:

(a) the operation of the computer to perform the following steps:

(1) retrieving the original active record and delta records associated with a record;
(2) applying to the original active record the corresponding delta record to create a first chronologically-ordered displayable historical data image record stored in a third temporary memory storage location, said historical data image record comprising data associated with the record after data in the original active record was updated and stored in memory in the first session;
(3) applying each subsequent delta record to the previously created historical data image record until all delta records associated with the record have been applied, whereupon, each sequential displayable historical data image record represents data corresponding to the record each time the record was sequentially stored into the database, and
(4) displaying said displayable historical data images, and (b) each of said plurality of records having associated therewith:
(1) an original active record stored in a first temporary memory storage location, and
(2) at least one delta record stored in a second temporary memory storage location comprising an identification of each location within the record of data that was changed at a session and a copy of the data changed at said session;

15. The method of claim 14 further comprising the steps of generating the original active record and at least one delta record from a record comprising:
(a) a current active record stored in memory, wherein the current active record contains current information;
(b) an audit history record stored in memory, wherein the audit history record is generated at each session at which data in the current information in the current active record has been changed and entered into memory, comprising:
(1) a change number associated with said each session, and
(2) an identification of each location within the current active record at which the data in the current information was changed during said each session and a copy of the data previously contained at that location;
(3) retrieving the current active record into a temporary memory storage location identified as an active record;
(4) applying to the active record changed data recorded in memory and associated with a location in the audit history record having the highest change number, for creating:
(i) a resulting active record comprising previous data stored in memory and associated with the location in the audit history record at the beginning of the session associated with said highest change number, and
(ii) a delta record of changes within the active record made at the session associated with said highest change number, said delta record comprising an identification of each location within the active record at which said changes during said session were made and a copy of the changes made at said session and at said location within the active record;

whereby applying the next audit history record having the next highest change number to the resulting active record until ,each subsequent audit history record associated with the database record has been applied to each subsequent corresponding resulting active record, whereupon the information created is that associated with the original active record and a delta record created for the application of each audit history record.

16. A method for maintaining an audit history of a plurality of active records of a database residing in memory of a computer, wherein each said active record comprises a current active record stored in memory which records current information, said method comprising the operation of the computer to perform the following steps:
(a) prompting an operator to select a database record to change existing information in the current active record;
(b) retrieving the current active record of the selected database record from memory into a location identified as an old record;
(c) storing in a temporary storage location said current active record and data changes made in response to the operator's inputs to change data in the current active record;
(d) comparing the data contents of the old record comprising the selected database record with the data contents of the temporary storage location to select for storage said data changes made to said current active record;
(e) generating an audit history record comprising:
(1) a change number associated with said session, said change number incremented by one over the change number of the previous session, and
(2) an identification of each location within the old record that has different data than in the temporary storage location and a copy of the data contained in the old record at that location;
(3) storing in memory said different data at each said location having said identification within the old record as said audit history record associated with said session, and
(4) reading the contents of the temporary storage location back into memory as the new current active record;

whereby an audit history record is created and stored in memory for each session during which the data in the current active record is changed by the operator.

17. An office automation system comprising:
(a) a computer;
(b) an entry device and a display device, each in communication with the computer;
(c) means for storing, updating and displaying the contents of a database, each of said functions of storing, updating and displaying comprising all or part of a task that the system is capable of performing in response to entries from the entry device;
(d) means for generating an audit history of a plurality of records of said database, each of said plurality of records having associated therewith:
(1) an original active record stored in a first temporary memory storage location, and
(2) at least one delta record stored in a second temporary memory storage location comprising an identification of each location within the record of data that was changed at a session and a copy of the data changed at said session;

(3) means for retrieving the original active record and delta records associated with the record;

(4) means for applying to the original active record, the corresponding delta record to create a first chronologically-ordered displayable historical data image record stored in a third temporary memory storage location, said historical data image record comprising said copy of the data associated with the record after data in the original active record was updated and stored in memory in the first session;

wherein said means for generating an audit history further comprises:

(1) means for applying each subsequent delta record to the previously created historical data image record until all delta records associated with the record have been applied, whereupon, each sequential displayable historical data image record represents data corresponding to the record each time the record was sequentially updated into the database, and (2) means for displaying said displayable historical data image records.

18. The office automation system of claim 17 wherein the original active record is a filled-in form and the delta record comprises changes made in said filled-in form.

19. The office auto,nation system of claim 18 wherein the filled-in form is a form used in an insurance agency.

20. An office automation system comprising:

(a) a computer;

(b) an entry device and a display device, each in communication with the computer;

(c) means for storing, updating and displaying the contents of a database, each of said functions of storing, updating and displaying comprising all or part of a task that the system is capable of performing in response to entries from the entry device, said database comprising a plurality of active records, where each of said plurality of said active records comprises a current active record and at least one of audit history record associated with said active record;

(d) means for generating audit history of said active record comprising:

(1) means for retrieving said current active record from said database, (2) means for storing said current active record in a first temporary storage location, and (3) means for retrieving and storing in a second temporary storage location at least one said audit history record associated with said active record as a delta record, said delta record comprising:

(i) an audit history change number;

(ii) changed data associated with said audit history change number, and (iii) an identifying location in said active record of said changed data;

(e) means for applying to said current active record the corresponding delta record to create a first chronologically-ordered displayable historical data image record stored in a third temporary storage location, where said historical data image record comprises said changed data associated with said corresponding delta record, wherein said generating means further comprise applying each previous delta record to the subsequently created displayable historical data image record until all delta records in said audit history record have been applied, whereupon, each sequential displayable historical data image record represents changed data corresponding to each time said active record was sequentially stored in the database; and (f) means for displaying said displayable historical data image records.

* * * * *